(12) United States Patent
Wu et al.

(10) Patent No.: US 11,422,302 B1
(45) Date of Patent: Aug. 23, 2022

(54) MULTI-CHANNEL OPTICAL TRANSMISSION DEVICE, MANUFACTURING AND METHOD FOR USING MULTI-CHANNEL OPTICAL TRANSMISSION DEVICE

(71) Applicant: BROWAVE CORPORATION, Hsinchu County (TW)

(72) Inventors: Wei-Hsuan Wu, Zhubei (TW); Feng-Chiang Chao, Taichung (TW); Chia-Hua Yang, Taoyuan (TW); Pao-Shan Hsu, Hsinchu (TW)

(73) Assignee: BROWAVE CORPORATION, Hsinchu County (TW)

( * ) Notice: Subject to any disclaimer, the term of this patent is extended or adjusted under 35 U.S.C. 154(b) by 0 days.

(21) Appl. No.: 17/581,372

(22) Filed: Jan. 21, 2022

(51) Int. Cl.
   *G02B 6/04* (2006.01)
   *G02B 6/293* (2006.01)
   *G02B 6/32* (2006.01)

(52) U.S. Cl.
   CPC ............ *G02B 6/04* (2013.01); *G02B 6/2938* (2013.01); *G02B 6/32* (2013.01)

(58) Field of Classification Search
   CPC .......... G02B 6/32; G02B 6/04; G02B 6/2938
   See application file for complete search history.

(56) References Cited

U.S. PATENT DOCUMENTS

| | | | |
|---|---|---|---|
| 7,702,229 B2 | 4/2010 | Schilling-Benz et al. |
| 8,488,244 B1 | 7/2013 | Li et al. |
| 9,485,046 B1 | 11/2016 | Tang et al. |
| 10,514,507 B1 | 12/2019 | Zhang et al. |
| 2020/0159034 A1 | 5/2020 | Du et al. |

FOREIGN PATENT DOCUMENTS

| | | |
|---|---|---|
| CN | 209858779 U | 12/2019 |
| CN | 212379610 U | 1/2021 |
| CN | 112882158 A | 6/2021 |
| CN | 208477158 U | 2/2022 |
| WO | 2020253534 A1 | 12/2020 |

*Primary Examiner* — Joseph L Williams
(74) *Attorney, Agent, or Firm* — Muncy, Geissler, Olds & Lowe, P.C.

(57) ABSTRACT

The present disclosure provides an optical assembly and a method of using an optical assembly. The optical assembly includes a carrier, a filter module on a primary surface of the carrier and disposed on a predetermined optical path, wherein the filter module includes a plurality of filter elements corresponding to a plurality of beams of different channels, a focal length adjuster disposed on the predetermined optical path, wherein at least a focal length of one of the plurality of beams is altered by the focal length adjuster, and a receiver extension configured to receive the plurality of beams via a plurality of sensing areas respectively at a receiving surface, wherein a beam size of each beams at the receiving surface is less than an area of each of the corresponding sensing areas.

20 Claims, 49 Drawing Sheets

MULTI-CHANNEL OPTICAL TRANSMISSION DEVICE, MANUFACTURING AND METHOD FOR USING MULTI-CHANNEL OPTICAL TRANSMISSION DEVICE

BACKGROUND

Fiber optic networks are becoming popular for data transmission. Multi-channel optical transmission device can be utilized to improve the capability of data transmission.

However, multi-channel optical transmission device often faces the issue of insertion loss, which is the loss of signal power resulting from the insertion of a device in optical fiber(s) or transmission line(s). Insertion loss is a key performance parameter for transmission applications, and is often measured in decibels (dB). Furthermore, calibration may be time-consuming since the signal carried by each channel possess different characteristics. Therefore, improved configuration for multi-channel optical transmission device is highly demanded.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A' is a schematic view showing focal lengths of optical signals in FIG. 1A and sensing areas of a receiver extension, in accordance with some comparative embodiments of the present disclosure.

FIG. 4A' is a schematic view showing focal lengths of optical signals in FIG. 4A and sensing areas of a receiver extension, in accordance with some embodiments of the present disclosure.

FIG. 4A"-1 is a schematic diagram showing dimensions of a beam, according to some embodiments of the present disclosure.

FIG. 4A"-2 is a schematic diagram showing a relation between beam diameter and a distance from a focal point of a beam, according to some embodiments of the present disclosure.

FIG. 13A' is an enlarged cross sectional view of a receiver extension of FIG. 13A and focal lengths of each optical signal, according to some comparative embodiments of the present disclosure.

FIG. 13W is an enlarged cross sectional view of a receiver extension of FIG. 13B and focal lengths of each optical signal, in accordance with some embodiments of the present disclosure.

FIG. 14' is an enlarged cross sectional view of a receiver extension of FIG. 14 and focal lengths of each optical signal, in accordance with some embodiments of the present disclosure.

FIG. 15A' is an enlarged cross sectional view of a receiver extension of FIG. 15A and focal lengths of each optical signal, in accordance with some embodiments of the present disclosure.

DETAILED DESCRIPTION

Figure 1A:
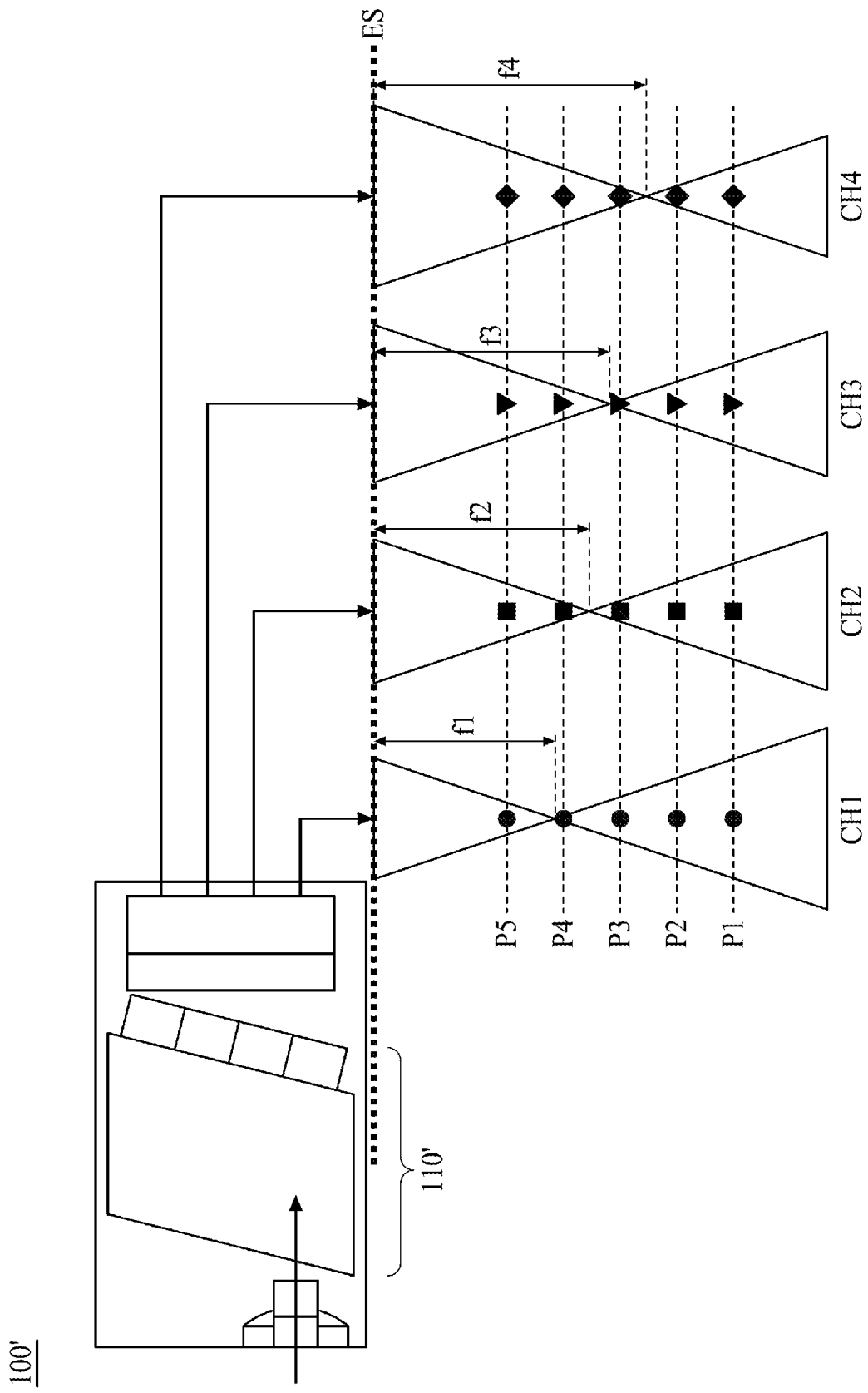
FIG. 1A is a schematic diagram showing an optical device and focal lengths of optical signals of each channel, according to some comparative embodiments of the present disclosure.
Figure 1A:
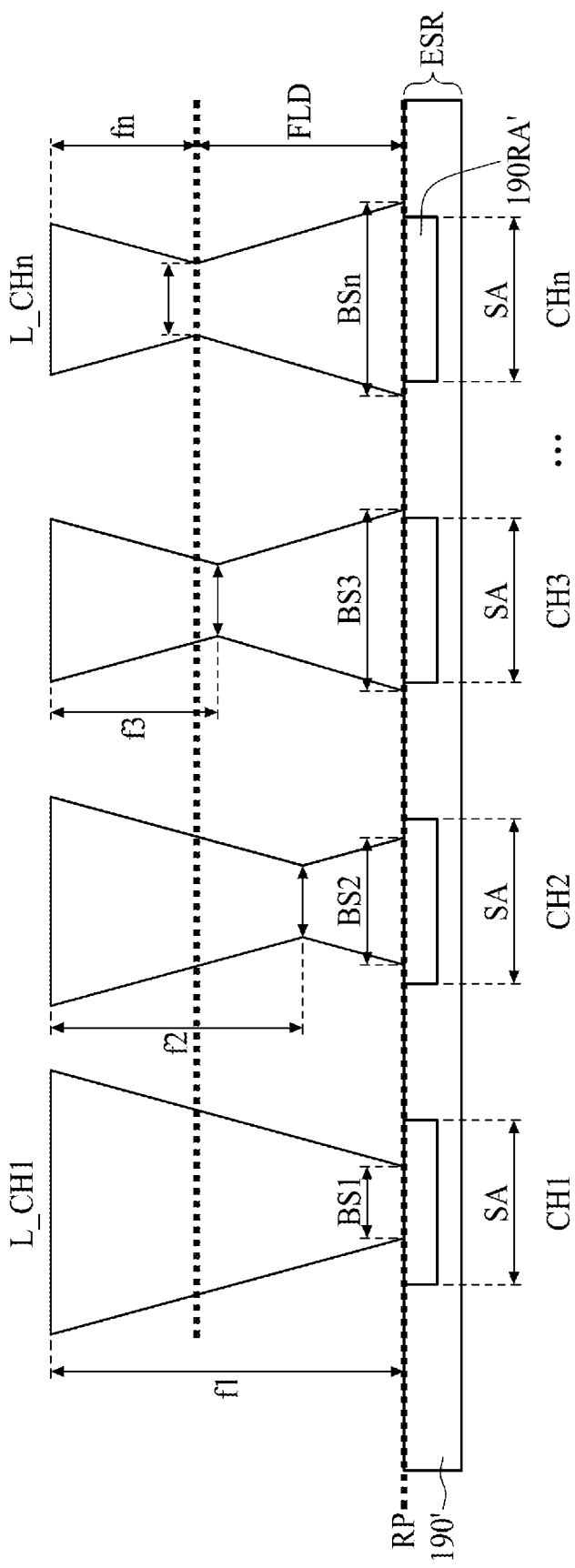

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately," or "about" generally means within a value or range which can be contemplated by people having ordinary skill in the art. Alternatively, the terms "substantially," "approximately," or "about" means within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately," or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A wavelength division multiplexing multiplexer (MUX) is utilized to combine a number of optical signals carried by light having different wavelengths into an optical fiber (or other suitable transmission waveguide). Combined light exiting from an optical fiber (or other suitable transmission waveguide) can be decomposed into its components having different wavelengths using a demultiplexer (DeMUX). Alternatively stated, a device that multiplexes different wavelength channels or groups of channels into one fiber (or other suitable transmission waveguide) is a multiplexer, and a device that divides the multiplexed channels or groups of channels into individual or subgroups of channels is a demultiplexer. Specifically, a multiplexer combines several channels of optical signals into a single signal, or in reverse a demultiplexer separates a signal into several individual channel signals, such multiplexer device and demultiplexer device are respectively referred to a multiplexing and demultiplexing module, or simply multiplexer or demultiplexer.

Demultiplexer and multiplexer can be utilized in various types of optical devices, optical transmission device or semiconductor structures in order to convey signal in specific ways. However, since some of the demultiplexer and multiplexer has multi-channel configuration, multi-channel optical transmission device often faces the issue of insertion loss due to different characteristics of signal in each channel, such as wavelength, focal length, et cetera. Particularly, conventional optical transmission device assembly faces greater degree of insertion loss when receiving signal or light from demultiplexer or multiplexer. The details of insertion loss issues in comparative embodiments will be subsequently discussed in FIG. 1A to FIG. 1C, FIG. 9A to FIG. 9B, and FIG. 13A.

FIG. 1A to FIG. 11E discuses various embodiments of optical device that utilizes a demultiplexer, and FIG. 12 to FIG. 16 discusses various embodiments of optical device that utilizes a multiplexer. Identical numerals marked in the present disclosure refer to identical or substantially identical components and these components would not be repeated again for brevity.

The term "focal length adjuster" in the present disclosure may be referred to one or more optical elements that have the ability to adjust the focal length of a plurality of beam(s) and/or the position(s) of the focal point(s) of said plurality of beam(s). In some embodiments, the focal length adjuster can be composed of materials transparent or translucent to the optical beams and hence allowing optical beams to enter, propagate, and exit the body of the focal length adjuster. In some embodiments, the focal length adjuster can be a prism, a lens array, or combinations thereof.

The term "focal point" in the present disclosure may include embodiments wherein "focal point" is referred to a point where a beam converges at, and embodiments wherein "focal point" is referred to a specific area on a focal plane (a plane with minimal beam diameter) where a beam converges at.

Referring to FIG. 1A, FIG. 1A is a schematic diagram showing an optical device and focal lengths of optical signals of each channel, according to some comparative embodiments of the present disclosure. A demultiplexer 100' is utilized to separate a single multichannel signal into several individual channels. In this comparative embodiment, the demultiplexer 100' has a filter module 110' (which can also be referred to as Z-block or thin film filter block) having four channels (e.g. first channel CH1, second channel CH2, third channel CH3 and fourth channel CH4.) that separates a signal into four individual channel signals. Each of the signal (such as light, radiation or optical signal) exits from each channel CH1 to CH4 has different wavelength and focal length (e.g. f1, f2, f3, and f4 respectively). Alternatively stated, the signal exits from each channel CH1 to CH4 converges at different position distanced from an exit surface ES of the demultiplexer 100'. Herein the exit surface ES may be a surface of an optical component at an upstream location with respect to a signal receiver (not shown).

Referring to FIG. 1A, and FIG. 1A', FIG. 1A' is a schematic view showing focal lengths of optical signals in FIG. 1A and sensing areas of a receiver extension, according to some comparative embodiments of the present disclosure. As shown in FIG. 1A', the signal L_CH1 from the first channel CH1 has a longest focal length f1 among signals to be detected, and the signal L_CHn from the Nth channel (for example, the fourth channel) has a shortest focal length fn among signals to be detected (for example, f4 in the case as shown in FIG. 1A). The focal length f1 is greater than the focal length fn by a focal length difference FLD, in some cases, the focal length difference FLD may be as much as 150 μm. A receiver extension 190' is configured to receive signals from each channel, and each has a receiving area 190RA' having an effective sensing area SA. Generally speaking, in order to have a greater sensing efficiency and lower insertion loss, it is more ideal to have a beam size BS1, BS2, BS3 . . . to BSn (which is the cross sectional area of the beam signal at the receiving surface RP of the receiver extension 190') of each signal being less than the effective sensing area SA (BS<SA) at the receiving surface RP. However, due to the focal length difference FLD being greater than desirable value, the insertion loss of the signal L_CHn may be greater than acceptable range since the focal point thereof does not be within a thin band corresponding to an effective sensible range ESR of the receiving area 190RA', thereby a portion of the signal is out of the range of the effective sensing area SA of the effective sensible range ESR. For example, a focal point (or focal plane) of one signal may be at a position that is too far away from the receiving surface RP, thus the beam size (such as BS3 or BSn as shown in FIG. 1A') has a cross section area at the receiving surface RP greater than the effective sensing area SA.

Figure 1C:
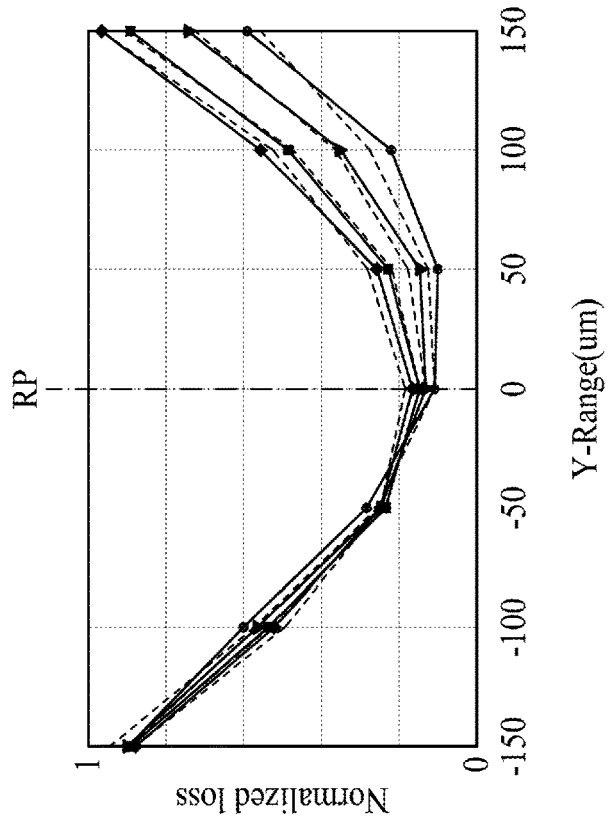
FIG. 1C is a diagram showing comparison of insertion loss of each channels at different position as shown in FIG. 1A as well as insertion loss of each channel at a reference position, according to some comparative embodiments of the present disclosure.
Figure 1B:
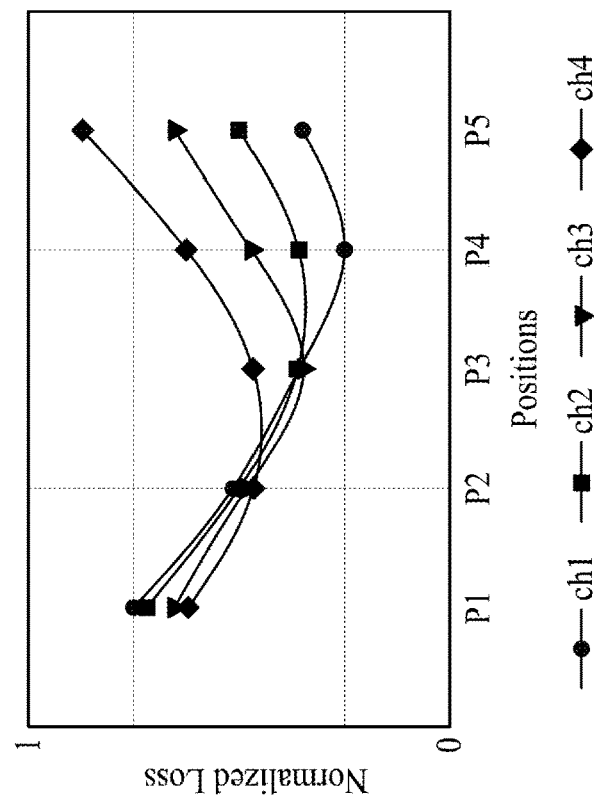
FIG. 1B is a diagram showing comparison of insertion loss of each channels at different position as shown in FIG. 1A, according to some comparative embodiments of the present disclosure.

Referring to FIG. 1A and FIG. 1B, FIG. 1B is a diagram showing comparison of insertion loss of each channels at different position as shown in FIG. 1A, according to some comparative embodiments of the present disclosure. FIG. 1B is a diagram showing comparison of insertion loss of each channels at five vastly different position (P1 to P5, wherein P5 is relatively proximal to exit surface ES and P1 is relatively distal to exit surface ES) of FIG. 1A. In this example, it can be seen that the minimal insertion loss of the fourth channel CH4 is proximal to the fourth position P4, minimal insertion loss of the third channel CH3 is at a position between the third position P3 and the fourth position P4, minimal insertion loss of the second channel CH2 is proximal to the third position P3, and minimal insertion loss of the first channel CH1 is at a position between the second position P2 and the third position P3. Alternatively stated, the minimal insertion loss of each channels are at vastly different distance from exit surface ES as shown in FIG. 1A.

Referring to FIG. 1A and FIG. 1C, FIG. 1C is a diagram showing comparison of insertion loss of each channels at different position as shown in FIG. 1A as well as insertion loss of each channel at a reference position, according to some comparative embodiments of the present disclosure. A receiver can be utilized to receive signals that exit from the demultiplexer 100' as shown in FIG. 1A. However, since the focal length f1 to f4 are not uniform and has greater difference between the longest and shortest focal lengths (in some cases may be as much as 150 μm), each signal from channel CH1 to CH4 may not converge within a thin band corresponding to an effective sensible range of the receiving area. As discussed in FIG. 1A', some of the focal point of the signals may not converge within a thin band corresponding to an effective sensible range of the receiving area, thereby the insertion loss of the signal(s) exit from some of channels may increase. For example, if a receiver has a receiving surface RP within the range of the first position P1 to fifth position P5 in this comparative configuration, not every signal from channel CH1 to CH4 has minimum insertion loss at such position. Thereby, the overall insertion loss and the insertion loss of certain signal may be greater than tolerable value, thus lowers the performance of the demultiplexer 100'.

As discussed above, the comparable embodiment in the conventional approach as discussed above fails to address the issue caused by greater focal length difference across several channels and a portion of the beam is out of the area of effective sensing area SA (i.e. beam size at the receiving greater than effective sensing area SA), wherein the focal points of some signals to be detected may not converge within a thin band corresponding to the effective sensible range of the receiver extension 190'.

Figure 2:
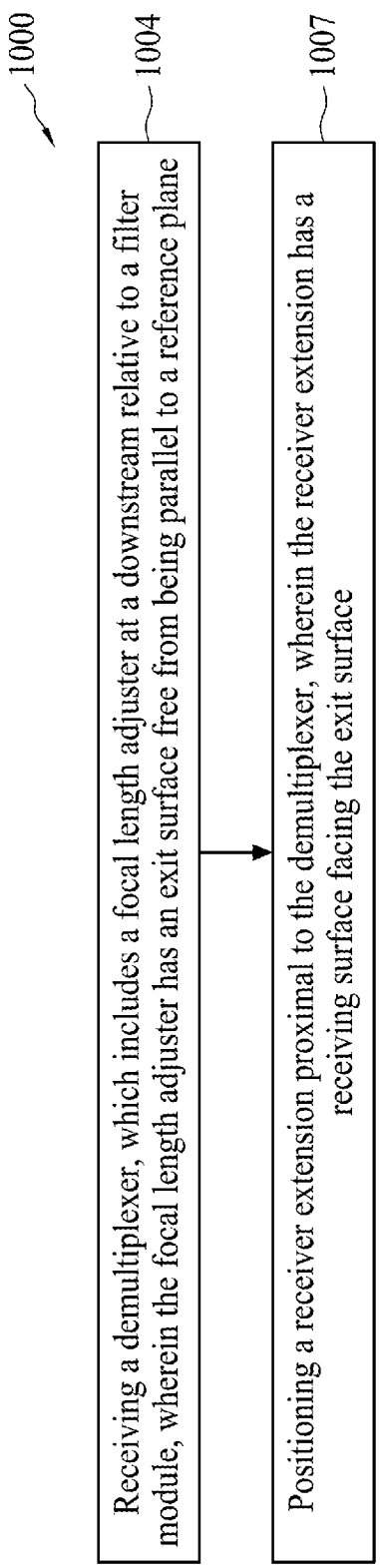
FIG. 2 shows a flow chart representing a method of using an optical device, in accordance with some embodiments of the present disclosure.

Referring to FIG. 2, FIG. 2 shows a flow chart representing a method of using an optical device, in accordance with some embodiments of the present disclosure. The method 1000 for using an optical device includes receiving a demultiplexer, which includes receiving a focal length adjuster at a downstream relative to a filter module, wherein the focal length adjuster has an exit surface free from being parallel to a reference plane (operation 1004, which can be referred to FIG. 3A to FIG. 3D or FIG. 8H), and positioning a receiver proximal to the demultiplexer, wherein the receiver has a receiving surface facing the exit surface (operation 1007, which can be referred to FIG. 3E or FIG. 8H).

Figure 3A:
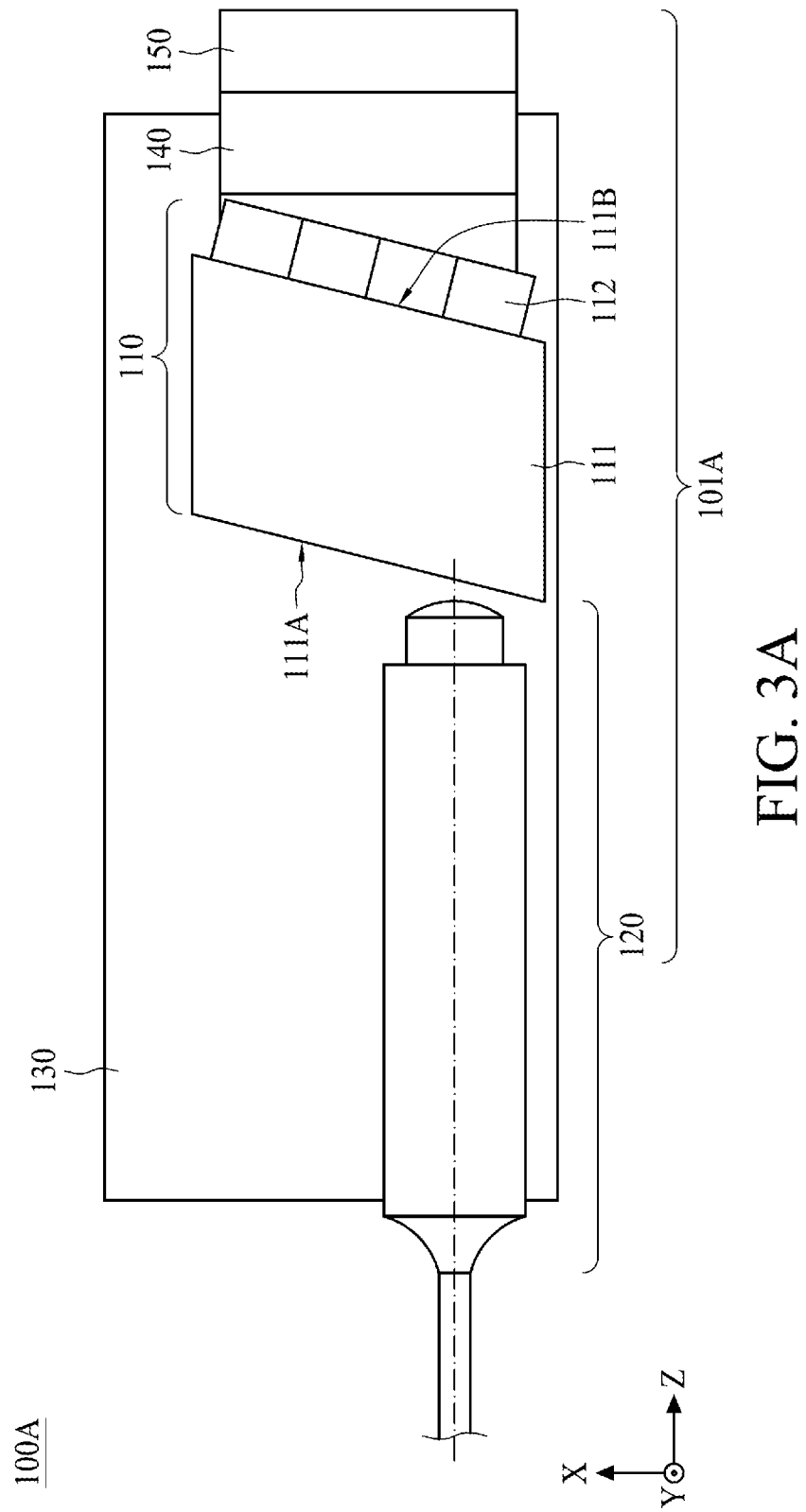
FIG. 3A is a top view perspective of an optical device, according to some embodiments of the present disclosure.
Figure 3B:
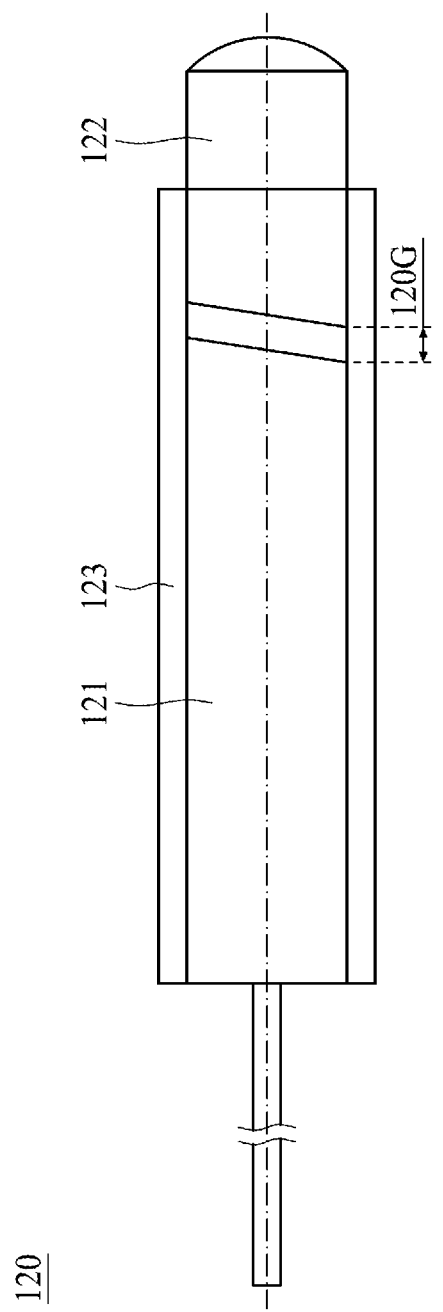
FIG. 3B is an enlarged cross sectional view of a collimator of FIG. 3A, according to some embodiments of the present disclosure.
Figure 3C:
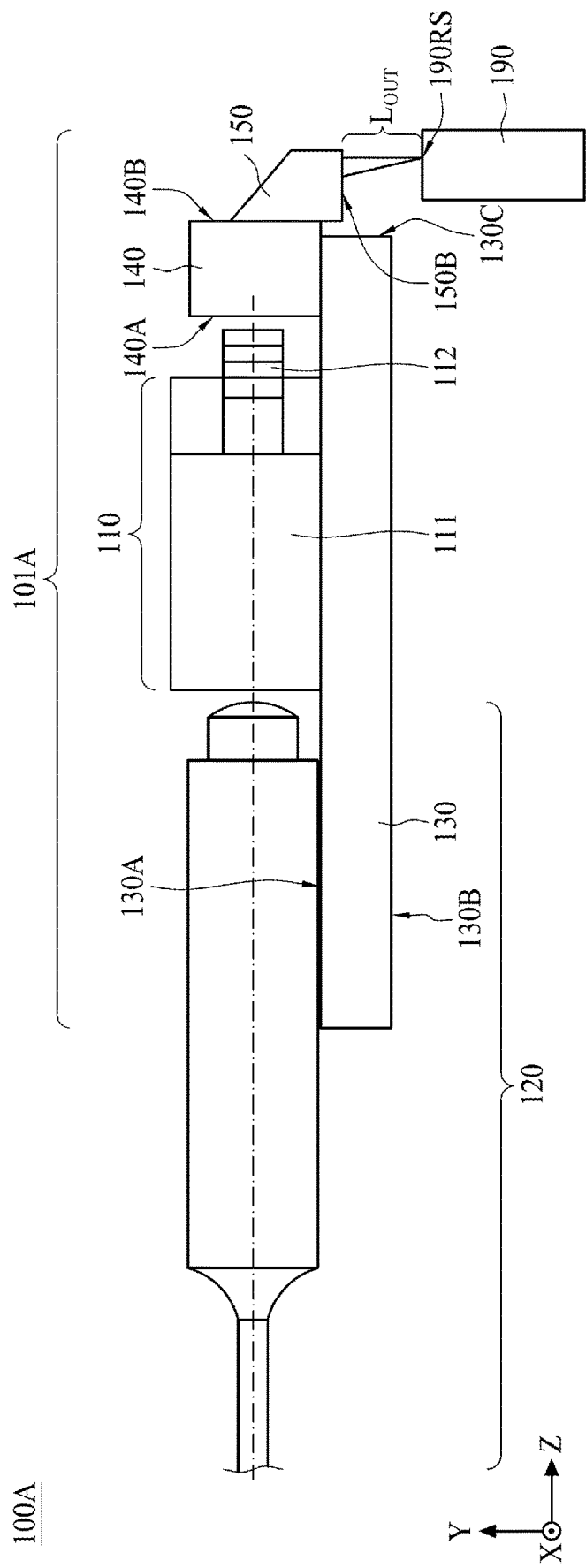
FIG. 3C is a side view perspective of an optical device of FIG. 3A, according to some embodiments of the present disclosure.
Figure 3D:
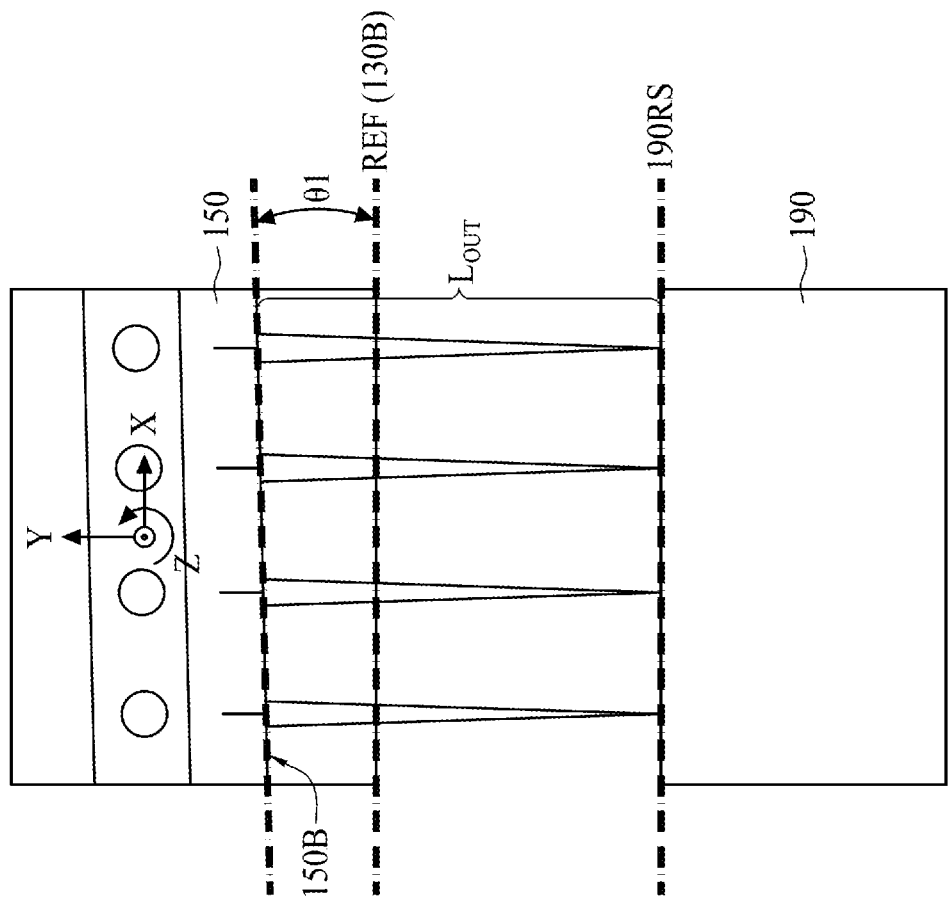
FIG. 3D is a front view perspective of an optical device of FIG. 3A, according to some embodiments of the present disclosure.
Figure 3E:
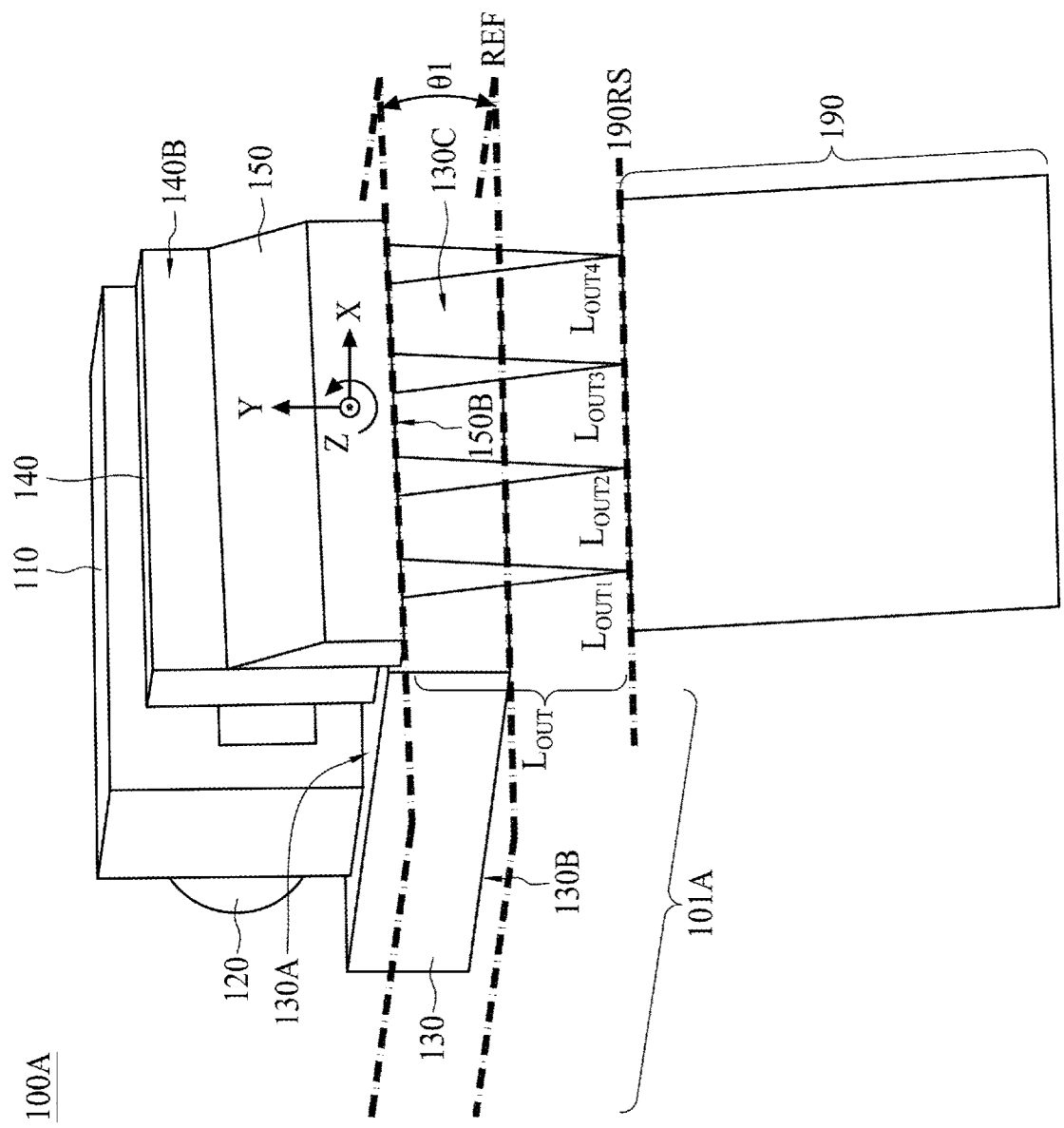
FIG. 3E is a perspective view showing an optical device of FIG. 3A, according to some embodiments of the present disclosure.

Referring to FIG. 3A to FIG. 3E, FIG. 3A is a top view perspective of an optical device, FIG. 3B is an enlarged cross sectional view of a collimator of FIG. 3A, FIG. 3C is a side view perspective of an optical device of FIG. 3A, FIG. 3D is a front view perspective of an optical device of FIG. 3A, and FIG. 3E is a perspective view showing an optical device of FIG. 3A, according to some embodiments of the present disclosure. In some embodiments, an optical device 100A may include a carrier 130, a filter module 110 (which can also be referred to as Z-block or thin film filter block) having multi-channel configuration and disposed on the carrier 130 and on a predetermined optical path, and a collimator 120 on the predetermined optical path. The carrier 130 comprises a primary surface 130A (facing secondary direction Y which is substantially orthogonal to primary direction X), a secondary surface 130B opposite to the primary surface 130A, and a tertiary surface 130C connecting the secondary surface 130B and the primary surface 130A, wherein the tertiary surface 130C faces tertiary direction Z. The filter module 110 includes a body portion 111 and filter elements 112. The body portion has a receiving side 111A faces the collimator 120 and an exit side 111B apart from receiving side 111A, wherein the filter elements 112 are disposed on the exit side 111B of the body portion 111. In some embodiments, the body portion 111 is made of glass or other suitable material that allows light or optical signal to propagate therein. An optical signal coming from collimator 120 may propagate through the through body portion 111 and be de-multiplexed by filter elements 112, thereby turned into multiple (such as four, as shown in FIG. 3A to FIG. 3E) different optical beams based upon their specific wavelengths. A number of filter elements 112 may correspond to a number of channels of the optical device. In some embodiments, an entire filter module 110 and a portion of the collimator 120 may be overlapping with the carrier 130, wherein such configuration may have improved reliability, wherein similar configuration can be applied to other embodiments in the present disclosure.

In some embodiments, the collimator 120 (as shown in FIG. 3B) may include a ferrule 121 configured to secure a fiber, an output lens 122, and a protective layer 123 (which can be a glass tube for securing the fiber and the output lens 122) at least partially surround an outer surface of the ferrule 121 and/or an outer surface of the output lens 122. In some embodiments, the ferrule 121 and output lens 122 is spaced by a gap 120G. In some embodiments, the gap 120G is filled with air. In some alternative embodiments, adhesive glue, glass, transmissive medium, or other medium having suitable refractive indices, may be filled in the gap 120G. It should be noted that the configuration of the collimator 120 is not limited thereto. The collimator 120 shown in FIG. 3B can also be substituted by various types of optical device that modifies or adjust the properties and/or direction of the emission of light/optical signal.

In some embodiments, the optical device 100A may further include lens module 140. In some embodiments, the lens module 140 may be mounted on primary surface 130A and has a receiving surface 140A facing the filter module 110 and an exit surface 140B opposite to the receiving surface 140A. The lens module 140 may be utilized to adjust propagation direction of light or optical signal, or adapted to provide focusing function, which may alter focal length of one or more beams propagated therein. In some embodiments, the propagation direction of light/optical signal can be adjusted by rotating the lens module 140 around secondary direction Y.

In some embodiments, the optical device 100A may further include focal length adjuster 150. Herein the filter module 110, the carrier 130, the lens module 140, and the focal length adjuster 150 are collectively referred to as a demultiplexer 101A. The focal length adjuster 150 alters the direction of received light or optical signal, for example, from a direction substantially parallel to X-Z plane to a direction unparalleled to X-Z plane. In some embodiments, the focal length adjuster 150 can be a prism, such as a right-angle prism, which has a surface substantially orthogonal to another surface. In some embodiments, the focal length adjuster 150 is attached to the exit surface 140B of the lens module 140. In some alternative embodiments, the focal length adjuster 150 and the lens module 140 can be integrated as an optical device. In some of the optional embodiments, the focal length adjuster 150 is free from being in direct contact with the carrier 130. In some of the optional embodiments, the focal length adjuster 150 is free from vertically overlapping the carrier 130. In the example of the filter module 110 being a four-channel (CH1 to CH4) configuration, an incoming signal is de-multiplexed into four separate beams $L_{OUT1}$, $L_{OUT2}$, $L_{OUT3}$, $L_{OUT4}$, respectively corresponding to CH1, CH2, CH3, CH4, and exit from an exit surface 150B of the focal length adjuster 150. Focal lengths of each of $L_{OUT1}$, $L_{OUT2}$, $L_{OUT3}$, $L_{OUT4}$ are respectively designated as f1, f2, f3, and f4. In some embodiments, each of beams $L_{OUT1}$, $L_{OUT2}$, $L_{OUT3}$, $L_{OUT4}$ have different wavelengths, and focal lengths f1, f2, f3, and f4 are different from each other.

Figure 4A:
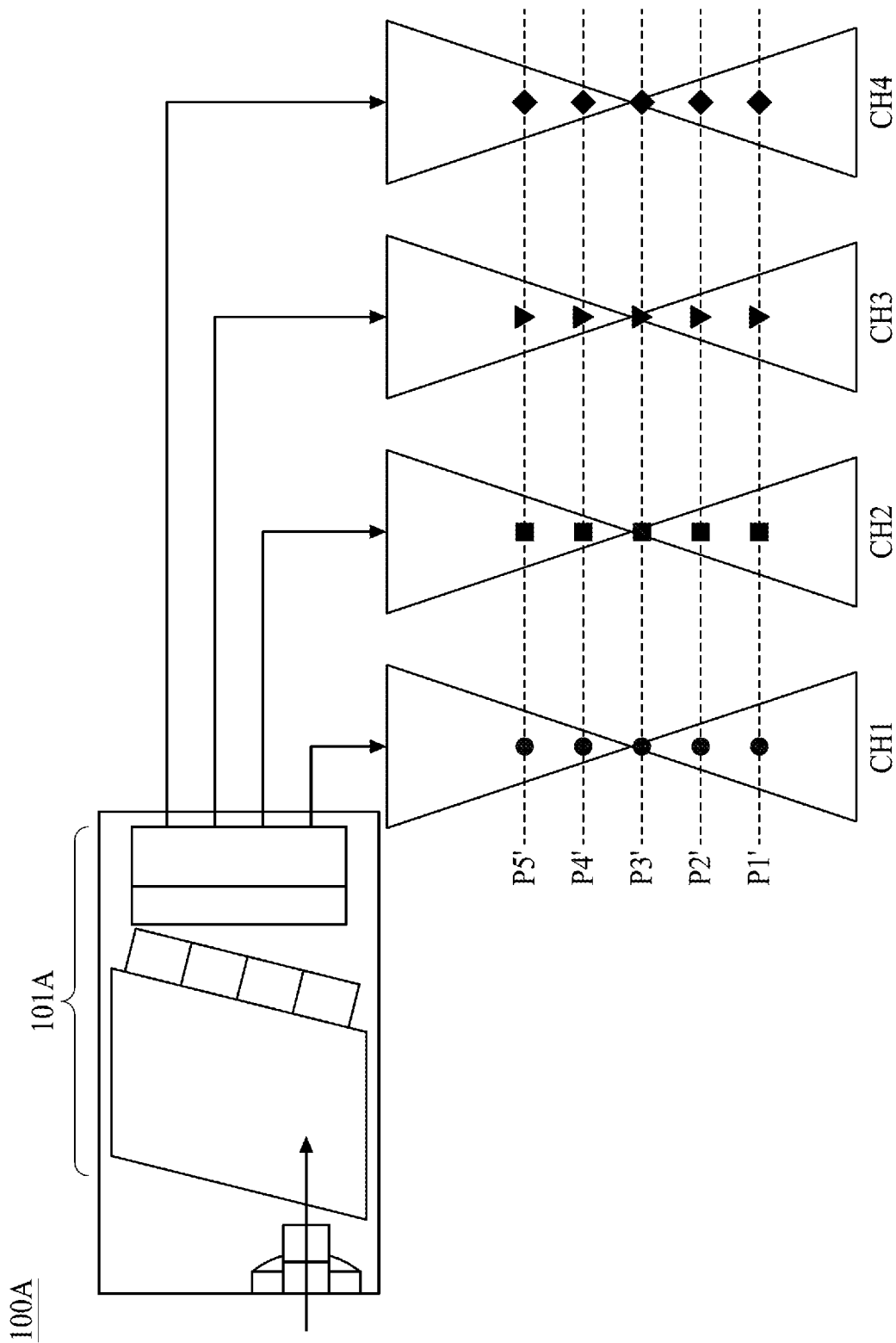
FIG. 4A is a schematic diagram showing an optical device and focal lengths of optical signals of each channel, according to some embodiments of the present disclosure.
Figure 4A:
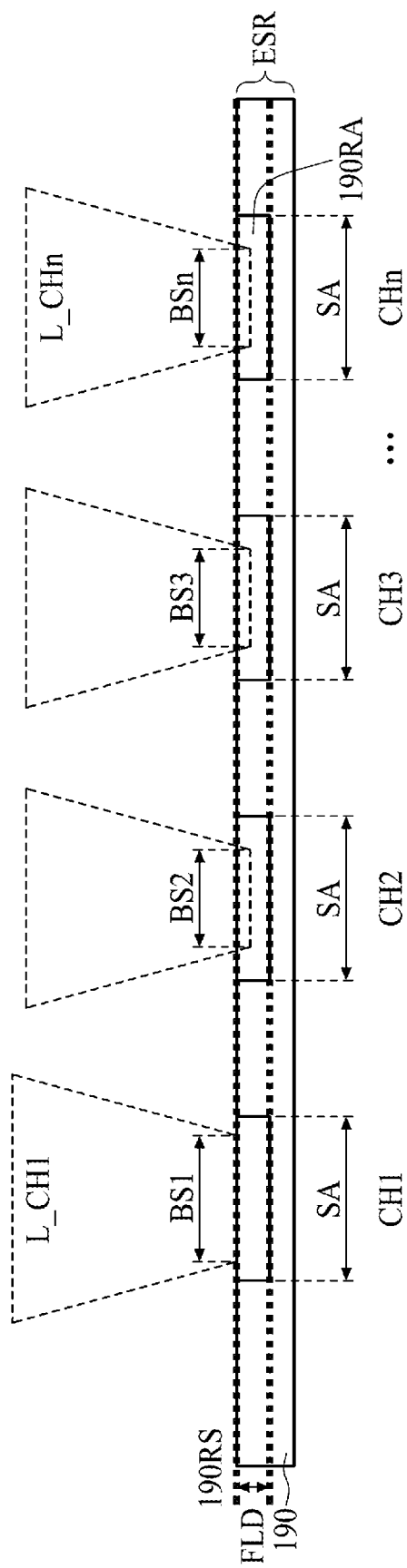
Figure 4A:
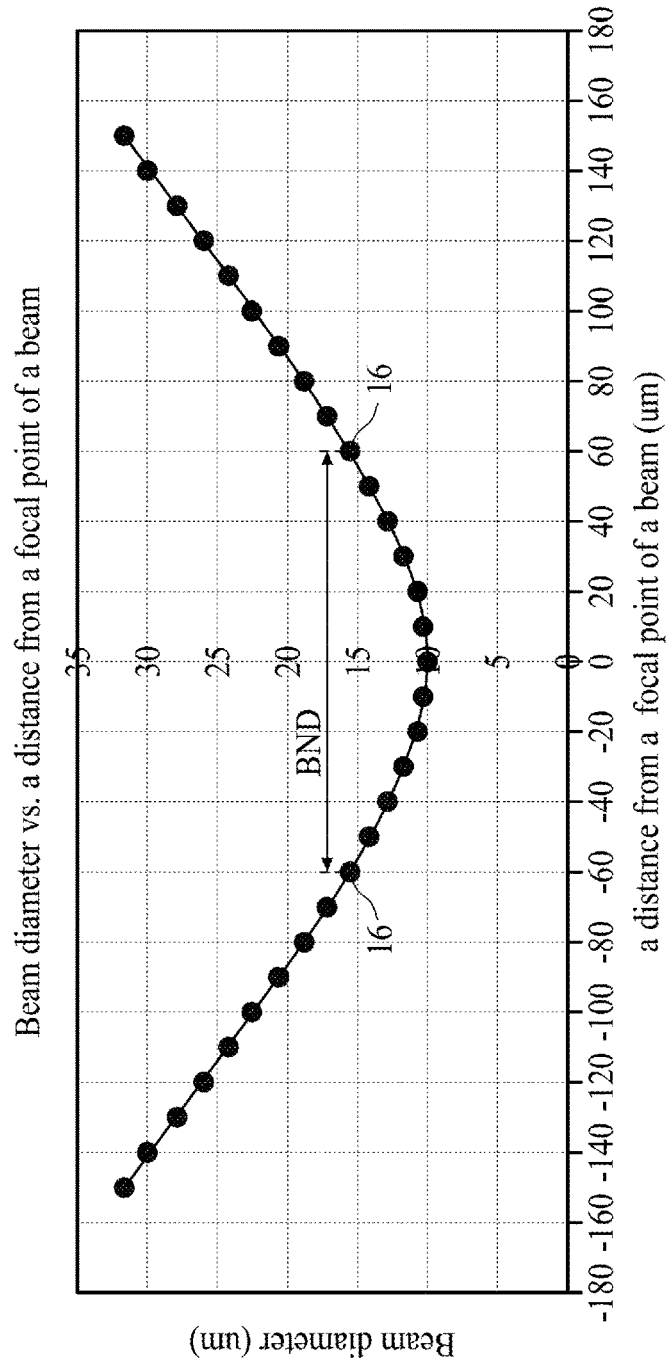
Figure 4A:
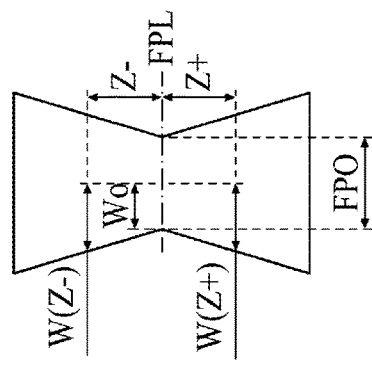

In some embodiments, the optical device 100A further comprises a receiver extension 190, which has a receiving surface 190RS facing the exit surface 150B of the focal length adjuster 150. In some embodiments, the receiver extension 190 can be one or more photodiodes, grating couplers, optical fiber arrays, optical absorber arrays, or other suitable optical receiving elements. In some of the embodiments, the receiving surface 190RS of the receiver extension 190 may be a flat surface and may be substantially parallel to a reference plane REF, as shown on FIG. 3E or FIG. 3D. In some of the embodiments, a number of photodiode or a number of optical fiber is corresponding to a number of channels. The receiver extension 190 is configured to receive the plurality of beams via a plurality of sensing areas (SA as shown in FIG. 4A') respectively at the receiving surface 190RS. In some embodiments, the secondary surface 130B of the carrier 130 can be utilized as the reference plane REF. In some alternative embodiments, a plane parallel to the primary surface 130A of the carrier 130, a plane perpendicular to the secondary direction Y, or the like, can be deemed as the reference plane REF.

Since focal lengths of each beams (e.g. f1, f2, f3, and f4, where f1<f2<f3<f4) are different from each other, an angle θ1, defined as an inclined angle between the exit surface 150B of the focal length adjuster 150 and the reference plane REF, can be configured in a manner such that the focal point of each beams (such as $L_{OUT1}$, $L_{OUT2}$, $L_{OUT3}$, $L_{OUT4}$) can converge at positions within a thin band (which will be subsequently discussed in FIG. 4A to FIG. 4C) corresponding to an effective sensible range of the receiver extension 190. Alternatively stated, the exit surface 150B of the focal length adjuster 150 is free from being parallel to the receiving surface 190RS of the receiver extension 190 or the reference surface REF. The angle θ1 is less than 90 degree. Herein the focal length adjuster 150 allows focal points of multiple beams with different wavelengths to land at positions within a thin band corresponding to an effective sensible range of the receiver extension 190.

In some embodiments, the angle θ1 is related to the difference of maximum focal length of a beam from a channel and a minimum focal length of another beam from another channel. For example, in some embodiments as shown in FIG. 3A to FIG. 3E, when a difference between the focal length f4 of the beam $L_{OUT4}$ from fourth channel CH4 and the focal length f1 of the beam $L_{OUT1}$ from first channel CH1 is less than about 150 μm, the angle θ1 can be in a range from about 0.5 degree to about 3 degree. If the angle θ1 is greater than or less than the aforesaid range under the condition of difference between the focal length f4 (or the shortest among all) and focal length f1 (or the longest among all) is less than 150 μm, the position adjustment of each of the focal points may be difficult to be achieved due to the situations where the focal points of some signals may be out of the thin band corresponding to an effective sensible range. However it should be noted that when a focal length difference between the longest focal length and the shortest focal length has different value, or when there are specific requirement, an acceptable range of the angle θ1 may also be adjusted.

Referring to FIG. 1A and FIG. 4A, FIG. 4A is a schematic diagram showing an optical device and focal lengths of optical signals of each channel, according to some embodiments of the present disclosure. In the comparative embodiment of FIG. 1A, since each beams have different focal length (e.g. f1<f2<f3<f4), the beams $L_{OUT1}$, $L_{OUT2}$, $L_{OUT3}$, $L_{OUT4}$ exit from each channel CH1 to CH4 converges at vastly different position distanced from an exit surface ES of the demultiplexer 100'. In contrast, in the embodiments of FIG. 4A (corresponding to FIG. 2 to FIG. 3D), the orientation of the exit surface 150B of the focal length adjuster 150 around the axis along tertiary direction Z is configured in a way that the positions where the beams from each channel CH1 to CH4 (e.g. $L_{OUT1}$, $L_{OUT2}$, $L_{OUT3}$, $L_{OUT4}$) converges can be land within a thin band BND (which will be discussed in FIG. 4A"-2) corresponding to an effective sensible range ESR of the receiving extension 190 (which will be discussed in FIG. 4A'), and each beams has a beam size at a receiving surface 190RS within and smaller than an area of corresponding effective sensible area, such that the insertion loss may be mitigated, as will be subsequently discussed in FIG. 4A', FIG. 4A"-1, FIG. 4A"-2, FIG. 4B and FIG. 4C.

Referring to FIG. 4A and FIG. 4A', FIG. 4A' is a schematic view showing focal lengths of optical signals in FIG. 4A and sensing areas of a receiver extension, in accordance with some embodiments of the present disclosure. Comparing to the cases discussed in FIG. 1A', both of a focal point of the signal L_CH1 from the first channel CH1 (having a longest focal length f1 among signals to be detected by a receiving area 190RA of the receiver extension 190), and a focal point of the signal L_CHn from the Nth channel (for example, the fourth channel, having a shortest focal length fn among signals to be detected) land within a thin band corresponding to an effective sensible range of the receiver extension 190. Accordingly, an area of the beam size (BS1 to BSn, which is the cross sectional area of each of the beams at the receiving surface 190RS) of each signals may thereby be less than an area of the effective sensing area SA (BS<SA) at the receiving surface 190RS. Alternatively stated, a cross section area of the beam of each signals at the receiving surface 190RS may be within the effective sensing area SA of the receiver extension 190, and a width of the a cross section area of the beam of each signals at the receiving surface 190RS may be less than a width of the effective sensing area SA of the receiver extension 190.

Referring to FIG. 4A, FIG. 4A"-1 and FIG. 4A"-2, FIG. 4A"-1 is a schematic diagram showing dimensions of a beam, FIG. 4A"-2 is a schematic diagram showing a relation between beam diameter and a distance from a focal point of a beam, in accordance with some embodiments of the present disclosure. FIG. 4A"-1 and FIG. 4A"-2 provide an example of defining a position of thin band BND. In some embodiments, the beams of the signals may be similar to Gaussian beam. In some embodiments, each beam has a radius Wo at the focal plane FPL, wherein the focal point FPO is at the focal plane FPL, and a cross section area of the beam at the focal plane FPL has the smallest cross sectional area among the cross sections of the beam. A tolerable maximum distance z from a focal point of a beam can be derived from the following formula:

$W(z) = Wo[1+(z/Zr)^2]^{1/2}$ – (1), wherein z is a distance from a focal point of a beam, W(z) is a radius of the beam at the plane apart from a focal point FPO of a beam by the distance z, Wo is a radius of beam size at the focal plane FPL (which can be associated with or derived from a size or a diameter of the effective sensing area SA of the receiver extension 190), Zr is the Rayleigh distance of the beam. Herein Rayleigh distance is related to a wavelength of a certain optical beam, for example, in an application of single mode fiber having 1310 nm wavelength, a Rayleigh distance would be around 50 μm in the air. By using the relation between beam size (BS1 to BSn) and effective sensing area SA, a range of the thin band BND can be obtained.

For example, in an application of single mode fiber having 1310 nm wavelength, Wo is around 5 μm, Zr is around 50 μm, and a diameter of photodiode, which is identical to two times of maximum value of W(z) in this case, is around 16 μm. Accordingly, it can be obtained that z is about +60 μm. That is, as shown in FIG. 4A"-2, the thin band BND is within +60 μm from the focal point FPO (or the focal plane FPL) of a specific beam that is utilized as a benchmark (such as the beam L_CH1 from the first channel CH1, as shown in FIG. 4A'). Alternatively stated, the thin band BND is similar to a plane, but has a tolerable range, such as of 60 μm in the example, from each sides of such plane. In some embodiments, the specific beam that is utilized as a benchmark (such as the beam L_CH1 from the first channel CH1) has a focal point or focal plane that is aligned with the receiving surface 190RS of the receiver extension 190. In the previous example, a thickness of the thin band BND is 120 µm (ranging from W(Z+) to W(Z−)), wherein when a focal point of a beam is out of the thin band BND, an insertion loss of such beam may be substantially increased. It should be noted that the tolerable range may vary according to specific application. In some embodiments of present disclosure, a range of thin band may be obtained based on the formula (1) above for a benchmark beam, and by adjusting a position of focal point/focal plane of other beams, the insertion loss can be mitigated.

In some embodiments of the receiver extension 190 includes optical fiber array, a diameter of each of the sensing areas of the optical fiber array is associated with a type of the fiber. For example, for a single mode fiber utilized as the receiver extension 190, a diameter of a sensing area thereof may be around 10 µm. For a multi-mode fiber utilized as the receiver extension 190, a diameter a sensing area thereof may be in a range from about 20 µm to about 62 µm. In some cases, a fiber a core with a diameter around 3 µm can also be utilized. However it should be noted that the aforesaid values and ranges may be adjusted in accordance with specific requirement of certain application. Due to the trend of miniaturization in optical assembly industry, a maximum size of the sensing areas of the optical fiber array may be limited in order to comply with specific requirement.

Figure 4C:
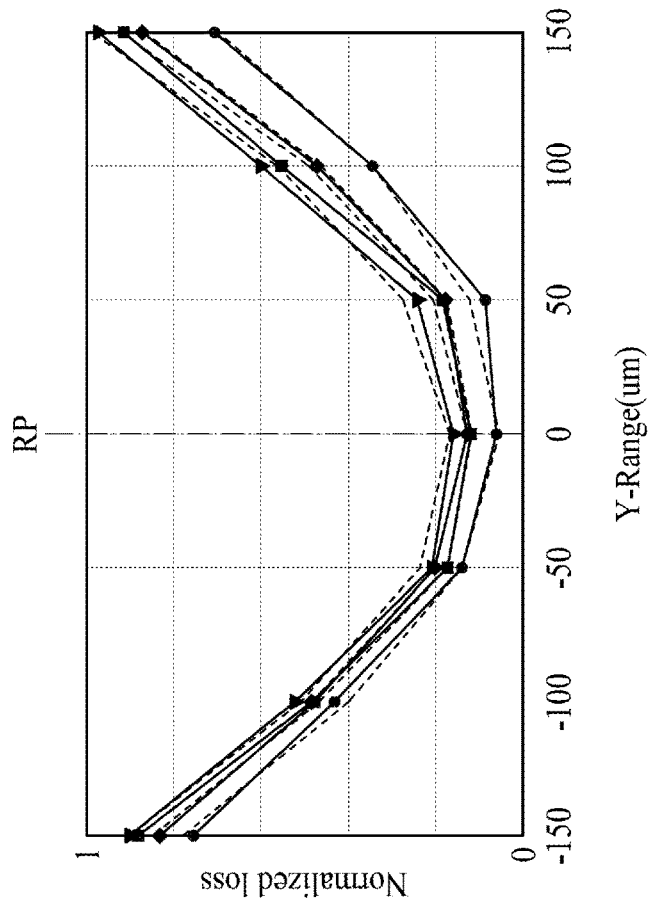
FIG. 4C is a diagram showing comparison of insertion loss of each channels of the optical device in FIG. 4A at different position as well as insertion loss of each channel at a reference position, according to some embodiments of the present disclosure.
Figure 4B:
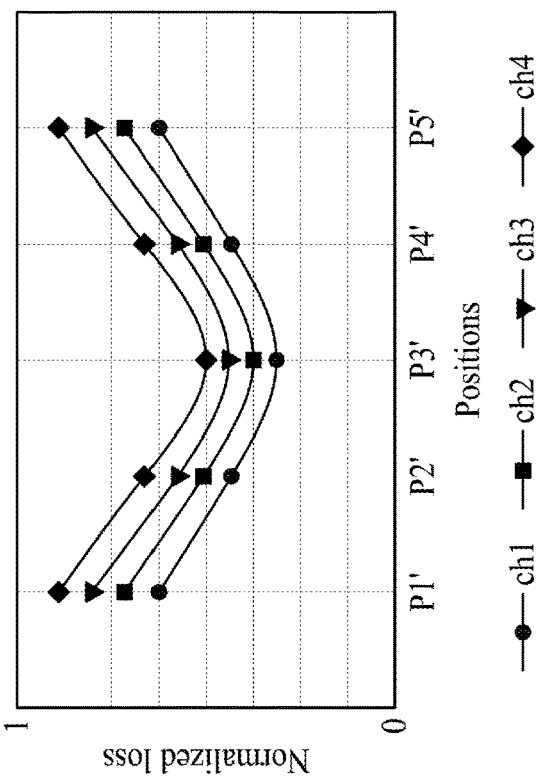
FIG. 4B is a diagram showing comparison of insertion loss of each channels of the optical device in FIG. 4A at different position, according to some embodiments of the present disclosure.

Referring to FIG. 4B to FIG. 4C, FIG. 4B is a diagram showing comparison of insertion loss of each channels of the optical device in FIG. 4A at different position, FIG. 4C is a diagram showing comparison of insertion loss of each channels of the optical device in FIG. 4A at different position as well as insertion loss of each channel at a reference position, according to some embodiments of the present disclosure. FIG. 4B is a diagram showing comparison of insertion loss of each channels at five different position (P1' to P5', wherein P5' is relatively proximal to the exit surface 150B of the focal length adjuster 150 and P1' is relatively distal to the exit surface 150B of the focal length adjuster 150) of FIG. 4A. In some embodiments, it can be seen that the minimal insertion loss of the first to fourth channel CH1 to CH4 may be much closer to the third position P3'. Therefore, the insertion loss of the signal(s) exit from some of channels may be decreased, especially when the receiving surface 190RS of the receiver extension 190 is positioned proximal to the third position P3', where the positions of minimum insertion loss of each channels CH1 to CH4 are substantially closer. Thereby, the overall insertion loss and the insertion loss of certain signal may be mitigated, as the difference can be observed by comparing the graphs in FIG. 4B to FIG. 4C and FIG. 1B to FIG. 1C.

Referring back to FIG. 2 and FIG. 3A to FIG. 3E, in operation 1004, the demultiplexer 101A of the optical device 100A as discussed in FIG. 3A to FIG. 3E is received. In operation 1007, the demultiplexer 101A of the optical device 100A is coupled to the receiver extension 190 so that the separated beams exit from the demultiplexer 101A can be received. In conventional assembling operation, it may be needed to analysis the position of where the receiving side of the receiver extension 190 should be by measuring the insertion loss of each channels at various positions and attempt to find a compromised receiving position so that insertion loss of some of the channels could be decreased, but at the cost of sacrificing the performance of other channels. Such conventional adjustment operation of calibrating the receiving side of the receiver extension can be time-consuming and plagued by insertion loss issue. By using the configuration of the embodiments of the optical device 100A as discussed in FIG. 3A to FIG. 3E, in some embodiments, it may be sufficient to obtain the position of receiving surface 190RS of the receiver extension 190 based on a position of substantially minimal insertion loss of a beam from one channel along with an adjustment of the angle θ1, since each of focal points are substantially landed within a thin band (i.e., the difference of focal lengths are compensated).

Figure 5:
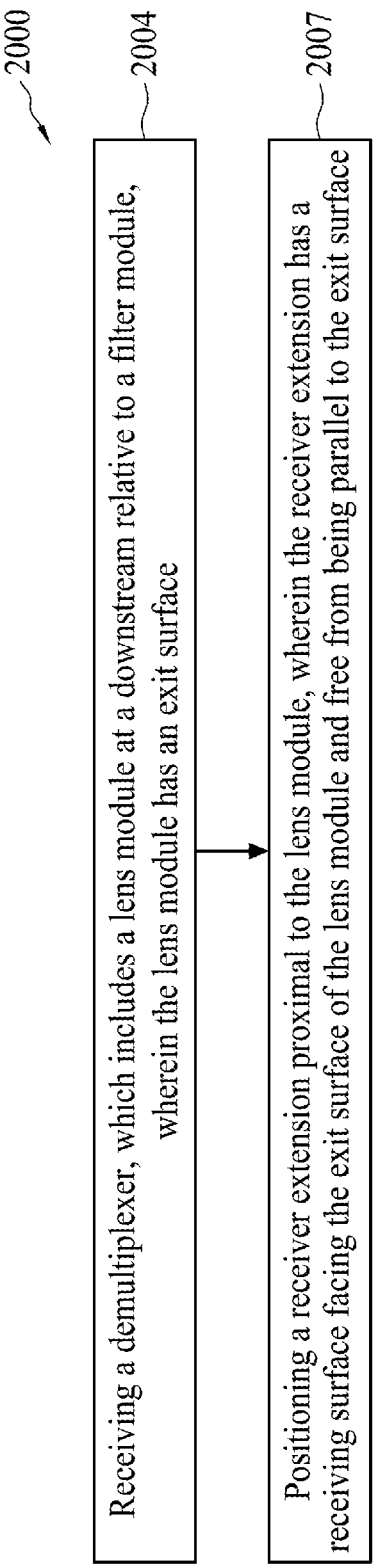
FIG. 5 shows a flow chart representing a method of using an optical device, in accordance with some embodiments of the present disclosure.
Figure 6:
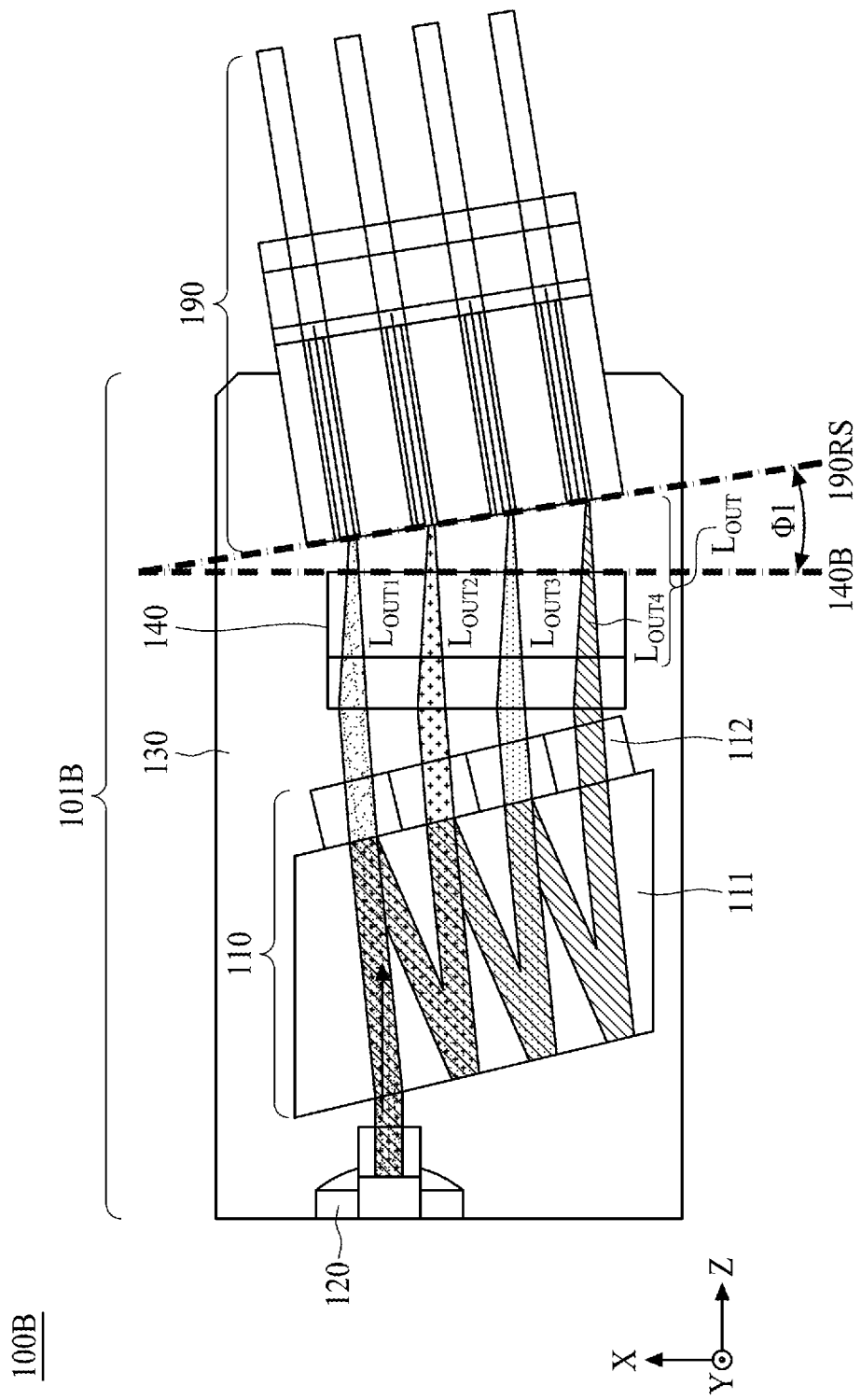
FIG. 6 is a top view perspective of an optical device, according to some embodiments of the present disclosure.

Another group of embodiments of optical device including a demultiplexer is discussed in FIG. 5 to FIG. 6.

Referring to FIG. 5, FIG. 5 shows a flow chart representing a method of using an optical device, in accordance with some embodiments of the present disclosure. The method 2000 for using an optical device includes receiving a demultiplexer, which includes a lens module at a downstream relative to a filter module, wherein the lens module has an exit surface (operation 2004, which can be referred to FIG. 6), and positioning a receiver extension proximal to the lens module, wherein the receiver extension has a receiving surface facing the exit surface of the lens module and free from being parallel to the exit surface (operation 2007, which can be referred to FIG. 6).

Referring to FIG. 6, FIG. 6 is a top view perspective of an optical device, according to some embodiments of the present disclosure. The optical device 100B including a demultiplexer 101B discussed in FIG. 6 is similar to the optical device 100A as discussed in FIG. 2 to FIG. 4C, however, the main differences reside in that the orientation of the receiver extension 190 is different and the receiver extension 190 has a receiving surface 190RS directly facing an exit surface 140B of the lens module 140, wherein the lens module 140 is at a downstream relative to the filter module 110. In some of the embodiments, the optical device 100B does not have a focal length adjuster 150 between the receiver extension 190 and the lens module 140. In some of the embodiments, the space between the receiving surface 190RS of the receiver extension 190 and the exit surface 140B of the lens module 140 is filled with substantially uniform material in terms of optical properties (e.g. refractive index), for example, optical mediums such as glass, glue, silicon containing material, silicon-derivative compositions, air, specific gas or composition, or the like.

The receiving surface 190RS of the receiver extension 190 is not parallel to the exit surface 140B of the lens module 140. In some of the embodiments, the receiving surface 190RS of the receiver extension 190 is substantially orthogonal to X-Z plane. In some of the embodiments, the exit surface 140B of the lens module 140 is substantially orthogonal to X-Z plane. Similar to the previous discussion in FIG. 1A to FIG. 4C, the beams (e.g. $L_{OUT1}$, $L_{OUT2}$, $L_{OUT3}$, $L_{OUT4}$) exit from each channels converges at vastly different positions distanced from an exit surface of the demultiplexer 101B (in some embodiments, the exit surface 140B of the lens module 140). therefore, by adjusting the orientation of the receiving surface 190RS of the receiver extension 190 around the axis along tertiary direction Z, the positions where the beams from each channel (e.g. $L_{OUT1}$, $L_{OUT2}$, $L_{OUT3}$, $L_{OUT4}$) converges can land within a thin band corresponding to an effective sensible range of the receiver extension 190, thereby mitigating the insertion loss.

In some embodiments, the exit surface 140B of the lens module 140 is inclined to a side surface of the carrier 130. In some embodiments, an angle $\Phi 1$ is between the receiving surface 190RS of the receiver extension 190 and the exit surface 140B of the lens module 140, wherein the angle $\Phi 1$ may be less than 90 degree. In some embodiments, the angle $\Phi 1$ can be in a range from about 0.5 degree to about 3 degree when a difference between the focal length f4 of the beam $L_{OUT4}$ from fourth channel CH4 and the focal length f1 of the beam $L_{OUT1}$ from first channel CH1 is less than about 150 μm. If the angle Φ1 is greater than or less than the aforesaid range under the condition of difference between the focal length f4 (or the shortest among all) and focal length f1 (or the longest among all) is less than 150 μm, the position adjustment of each of the focal points may be difficult to be achieved due to the situations where the focal points of some signals may be out of the thin band corresponding to an effective sensible range. However it should be noted that when a focal length difference between the longest focal length and the shortest focal length has different value, or when there are specific requirement, an acceptable range of the angle Φ1 may also be adjusted.

In comparative assembling operation (as discussed in FIG. 1A to FIG. 1C), it may be needed to analysis the position of where the receiving side of the receiver by measuring the insertion loss of each channel at various parallel positions and attempt to find a compromised receiving position so that insertion loss of some of the channels could be decreased at the cost of sacrificing the performance of certain channel. Such conventional adjustment operation of calibrating the receiving side of the receiver can be time-consuming and plagued by insertion loss issue. By using the configuration of the embodiments of the optical device 100B as discussed in FIG. 5 to FIG. 6, in some embodiments, it may be sufficient to adjust the angle Φ1 and measuring the position of substantially minimal insertion loss for a portion of the channels. This configuration helps facilitating the installation operation. In the aforesaid conventional approaches, the optical fiber array may not be configured in a way that is adapted to be positioned in the manner discussed in FIG. 6, where the pitches and the receiving angles may also be taken under consideration. Conventional practice also fails to recognize the effect regarding the adjustment of angle Φ1, and may have design that does not allow a user to adjust angle Φ1.

Another group of embodiments of optical device including a demultiplexer is discussed in FIG. 7 to FIG. 8G and FIG. 8H.

Figure 7:
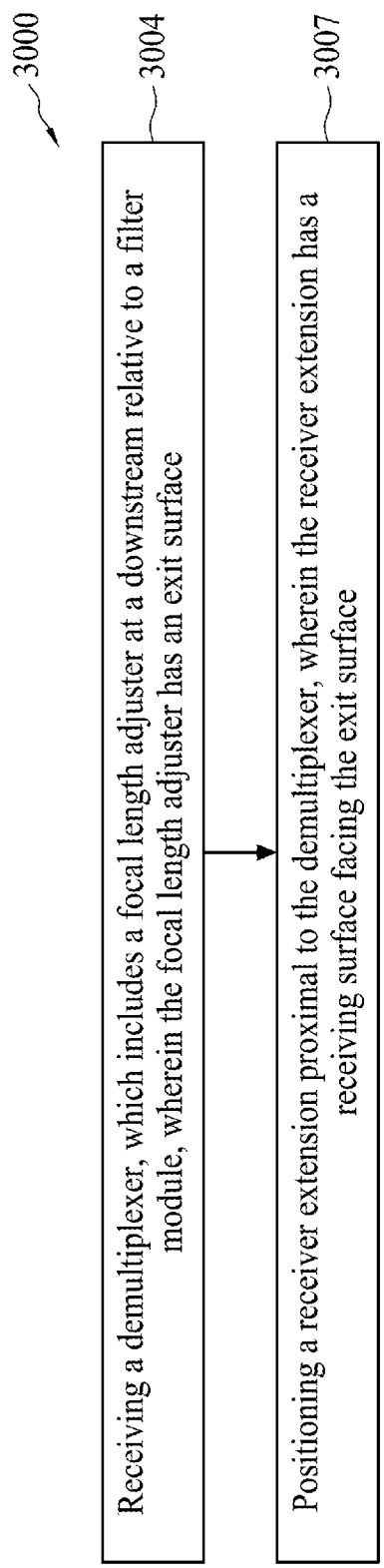
FIG. 7 shows a flow chart representing a method of using an optical device, in accordance with some embodiments of the present disclosure.

Referring to FIG. 7, FIG. 7 shows a flow chart representing a method of using an optical device, in accordance with some embodiments of the present disclosure. The method 3000 for using an optical device includes receiving a demultiplexer, which includes a focal length adjuster at a downstream relative to a filter module, wherein the focal length adjuster has an exit surface (operation 3004, which can be referred to FIG. 8A to FIG. 8G or FIG. 8H), and positioning a receiver extension proximal to the demultiplexer, wherein the receiver extension has a receiving surface facing the exit surface (operation 3007, which can be referred to FIG. 8A to FIG. 8G or FIG. 8H).

The optical devices 100C1 to 10007 subsequently discussed in FIG. 8A to FIG. 8G are similar to the optical device 100B as discussed in FIG. 5 to FIG. 6, however, the main differences reside in that a focal length adjuster (e.g. the focal length adjusters 160-1 to 160-7 discussed in FIG. 8A to FIG. 8G) is disposed between the receiver extension 190 and the lens module 140, as well as an orientation of the receiver extension 190. Particularly, a refractive index n2 of the focal length adjuster (e.g. the focal length adjusters 160-1 to 160-7 discussed in FIG. 8A to FIG. 8G) is different from a refractive index n1 of an optical mediums (such as glass, glue, silicon containing material, silicon-derivative compositions, air, specific gas or composition, or the like) between a lens module 140 and such focal length adjuster. In some embodiments, n2 is greater than n1. In some of the embodiments, the refractive index n1 of the optical mediums between the lens module 140 and the focal length adjuster is in a range from about 1 to about 3.5. In some of the embodiments, the refractive index n2 is in a range from about 1 to about 3.5.

In some embodiments, various types of focal length adjusters 160-1 to 160-7 can be utilized in optical devices 100C1 to 10007 discussed in FIG. 8A to FIG. 8G. The embodiments of focal length adjusters 160-1 to 160-7 discussed in FIG. 8A to FIG. 8G can be utilized to at least adjust a focal length of one beam, and compensate the difference of original focal lengths of beams exit from each channel. The shape of each types of focal length adjusters may be decided based on refractive index n1 and n2, wavelengths and/or focal lengths of beams from each channels. For example, a focal length adjuster may be configured to respectively adjust the optical path of each beams propagated therein, and/or have different beam-focusing capability at different position to respectively adjust the position where each beams propagated therein is converged at. The focal length adjusters 160-1 to 160-7 discussed in FIG. 8A to FIG. 8G comprises a plurality of sections, where each of the plurality of sections (or a section) allows a beam to pass through and provides different amount of focal length adjustment to respective beams. That is, an extent of focal point adjustment is different in each sections. By using the focal length adjuster with specific configuration, the positions of the focal points of the beams from each channels can land within a thin band corresponding to the effective sensible range of the receiver extension 190 of the receiver extension 190, thereby mitigating the insertion loss.

In some of the embodiments, the receiving surface 190RS of the receiver extension 190 is substantially orthogonal to X-Z plane. In some of the embodiments, the receiving surface 190RS of the receiver extension 190 is parallel to the exit surface 140B of the lens module 140. In some alternative embodiments, the receiving surface 190RS of the receiver extension 190 is not parallel to the exit surface 140B of the lens module 140. An orientation of the focal length adjusters 160-1 to 160-7 can be adjusted, for example, rotated around y-axis, to comply with requirement discussed in the present disclosure. It should be noted that the embodiments discussed in the present disclosure can be combined with each other, modified based on similar optic principle, or alternatively, can be disposed in a repeated fashion in order to scale up the capability of optical device.

Figure 8A:
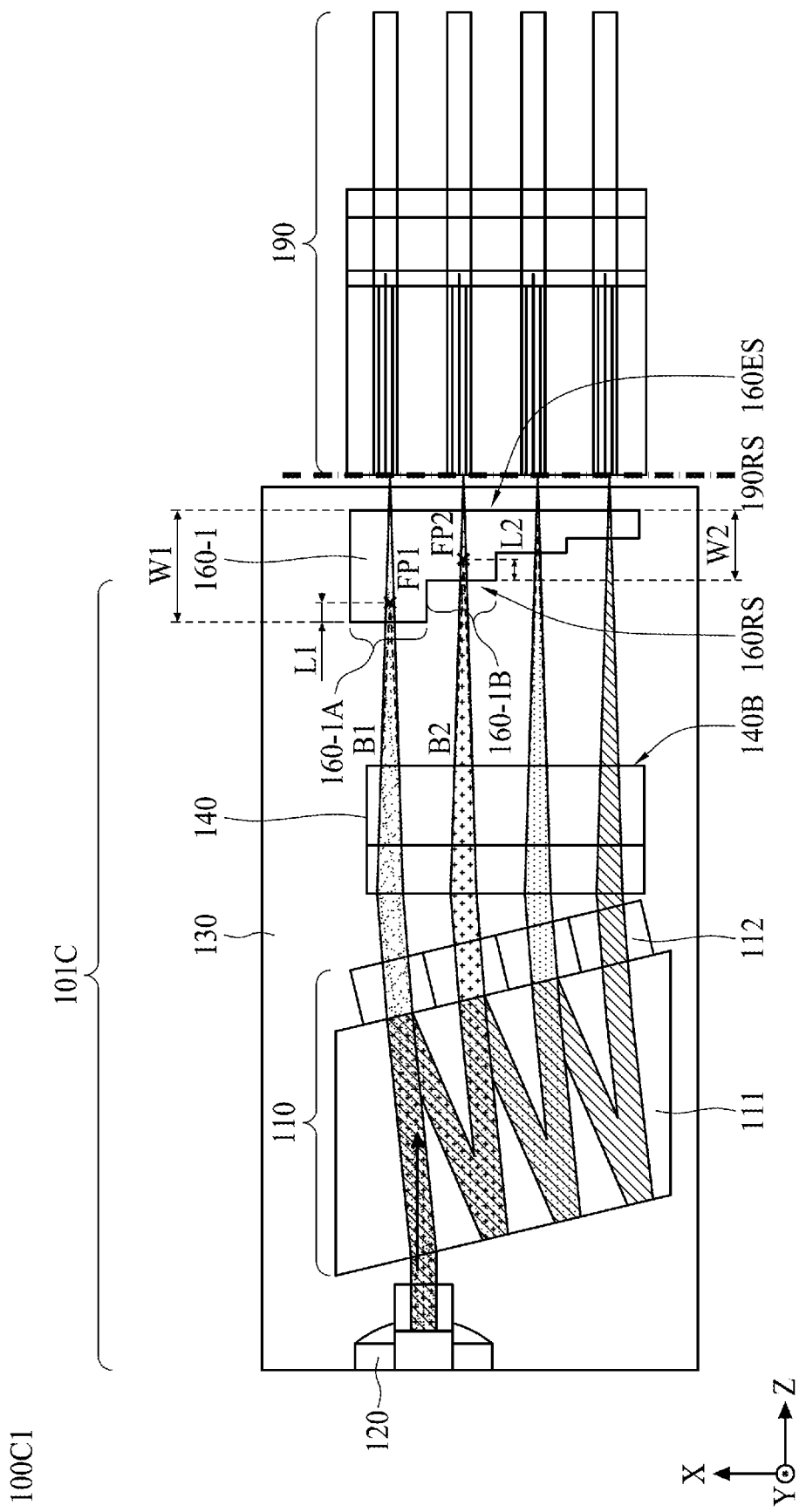
FIG. 8A is a top view perspective of an optical device, according to some embodiments of the present disclosure.

Referring to FIG. 8A, FIG. 8A is a top view perspective of an optical device, according to some embodiments of the present disclosure. The demultiplexer 101C of the optical device 100C1 includes a focal length adjuster 160-1 positioned between the receiving surface 190RS of the receiver extension 190 and the exit surface 140B of the lens module 140. The focal length adjuster 160-1 has a non-uniform thickness profile corresponding to each channels. In some of the embodiments, the profile of the focal length adjuster 160-1 may be similar to staircase shape. In some alternative embodiments, the focal length adjuster 160-1 may include multiple portions having various thickness. The focal length adjuster 160-1 has a receiving surface 160RS facing the exit surface 140B of the lens module 140 and an exit surface 160ES facing the receiving surface 190RS of the receiver extension 190. In some of the embodiments, the exit surface 160ES of the focal length adjuster 160-1 is a substantially flat surface. However, in some alternative embodiments, the exit surface 160ES of the focal length adjuster 160-1 has a non-uniform surface. In some of the embodiments, the receiving surface 160RS of the focal length adjuster 160-1 has a non-uniform profile, which may have a plurality of sections that are parallel to at least a portion of the exit surface 160ES of the focal length adjuster 160-1.

The focal length adjuster 160-1 can be utilized to compensate the difference of original focal lengths of beams exit from each channel, thereby the focal point of the beams from each channel may be within a thin band corresponding to the effective sensible range of the receiver extension 190.

In some embodiments, the thickness of each portions of the focal length adjuster 160-1 corresponding to each channels (i.e. each of the portions of the focal length adjuster 160-1 where each beams propagated therein) can be obtained by the refractive index n2 of the focal length adjuster 160-1 and the focal lengths and/or position of focal points of each beams.

For example, a first beam B1 from one channel has an original focal point positioned at a first position FP1 in the optical medium (the material between the lens module 140 and the focal length adjuster 160-1), and a second beam B2 from another channel has an original focal point positioned at a second position FP2 in the optical medium (the material between the lens module 140 and the focal length adjuster 160-1), wherein the first beam B1 passes through a first portion 160-1A of the focal length adjuster 160-1 and the second beam B2 passes through a second portion 160-1B of the focal length adjuster 160-1. A distance between the receiving surface 160RS of the first portion 160-1A and the first position FP1 is denoted as L1, and a distance between the receiving surface 160RS of the second portion 160-1B and the second position FP2 is denoted as L2. In some embodiments, the width W1 of the first portion 160-1A and the width W2 of the second portion 160-1B is respectively proportional to L1 and L2. In some embodiments, the width W1 may be substantially identical to L1 times by refractive index n2 of the focal length adjuster 160-1 (L1*n2), and the width W2 may be substantially identical to L2 times by refractive index n2 of the focal length adjuster 160-1 (L2*n2). The position and width of each portions of the focal length adjuster 160-1 corresponding to other channel(s) can also be decided by the aforesaid manner. In some embodiments, each of the beams exit from the lens module 140 pass through the focal length adjuster 160-1. In some of the embodiments, one or more of the original focal points of the beams from each channels in the optical medium material is between the receiving surface 160RS and the exit surface 160ES.

Figure 8B:
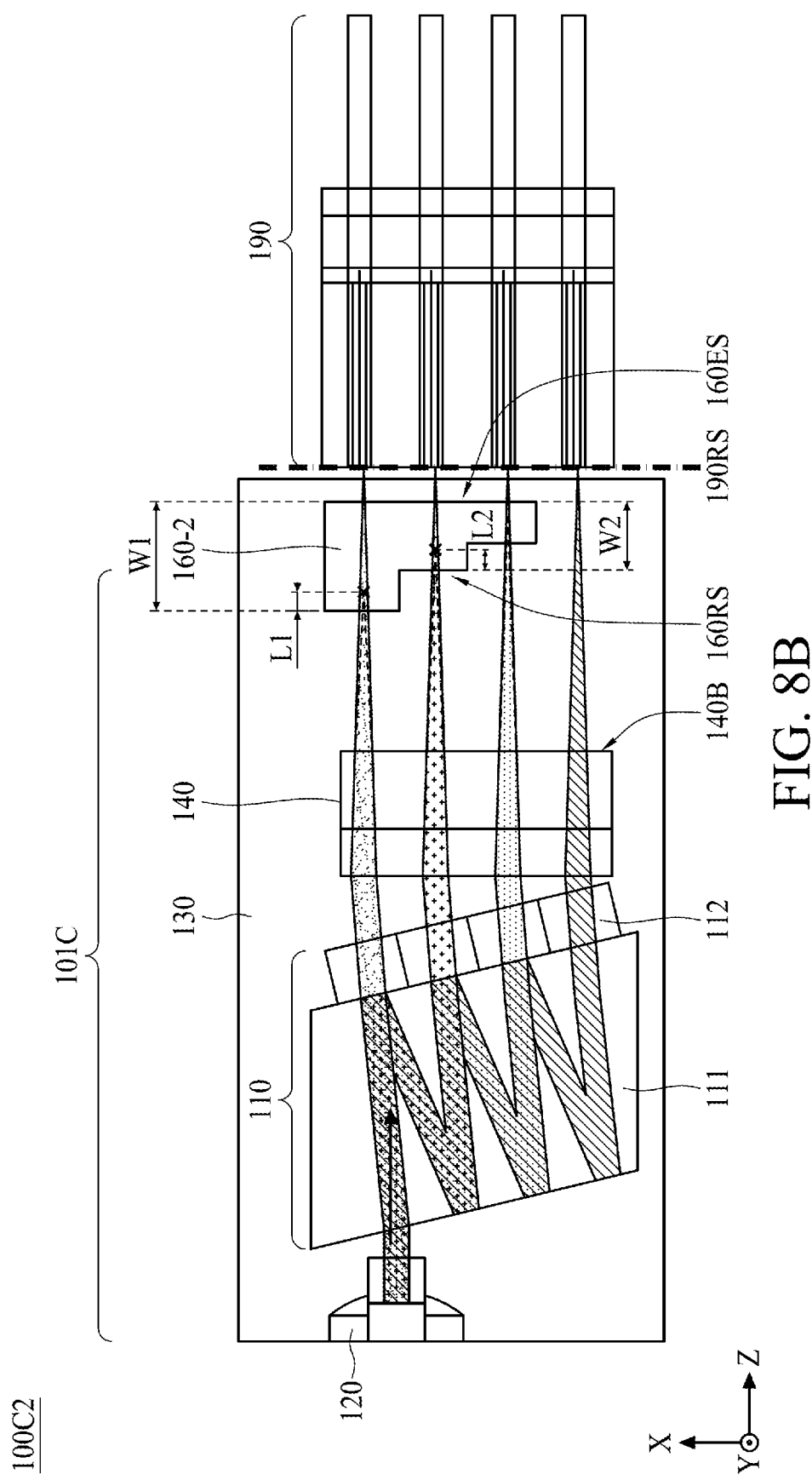
FIG. 8B is a top view perspective of an optical device, according to some embodiments of the present disclosure.

Referring to FIG. 8B, FIG. 8B is a top view perspective of an optical device, according to some embodiments of the present disclosure. The demultiplexer 101C of the optical device 100C2 includes a focal length adjuster 160-2 positioned between the receiving surface 190RS of the receiver extension 190 and the exit surface 140B of the lens module 140. The optical device 100C2 shown in FIG. 8B is similar to the optical device 100C1 discussed in FIG. 8A, wherein the position, profile, thickness of each portions of the focal length adjuster 160-2 can be obtained by the baseline discussed in FIG. 8A. However the difference resides in that one or more of the beams exit from the lens module 140 does not pass through the focal length adjuster 160-2. In some of the embodiments, the focal length adjuster 160-2 can be utilized to compensate the difference of original focal lengths of beams exit from some of the channels, thereby the focal point of the beams from each channel may be within a thin band corresponding to the effective sensible range of the receiver extension 190.

Figure 8C:
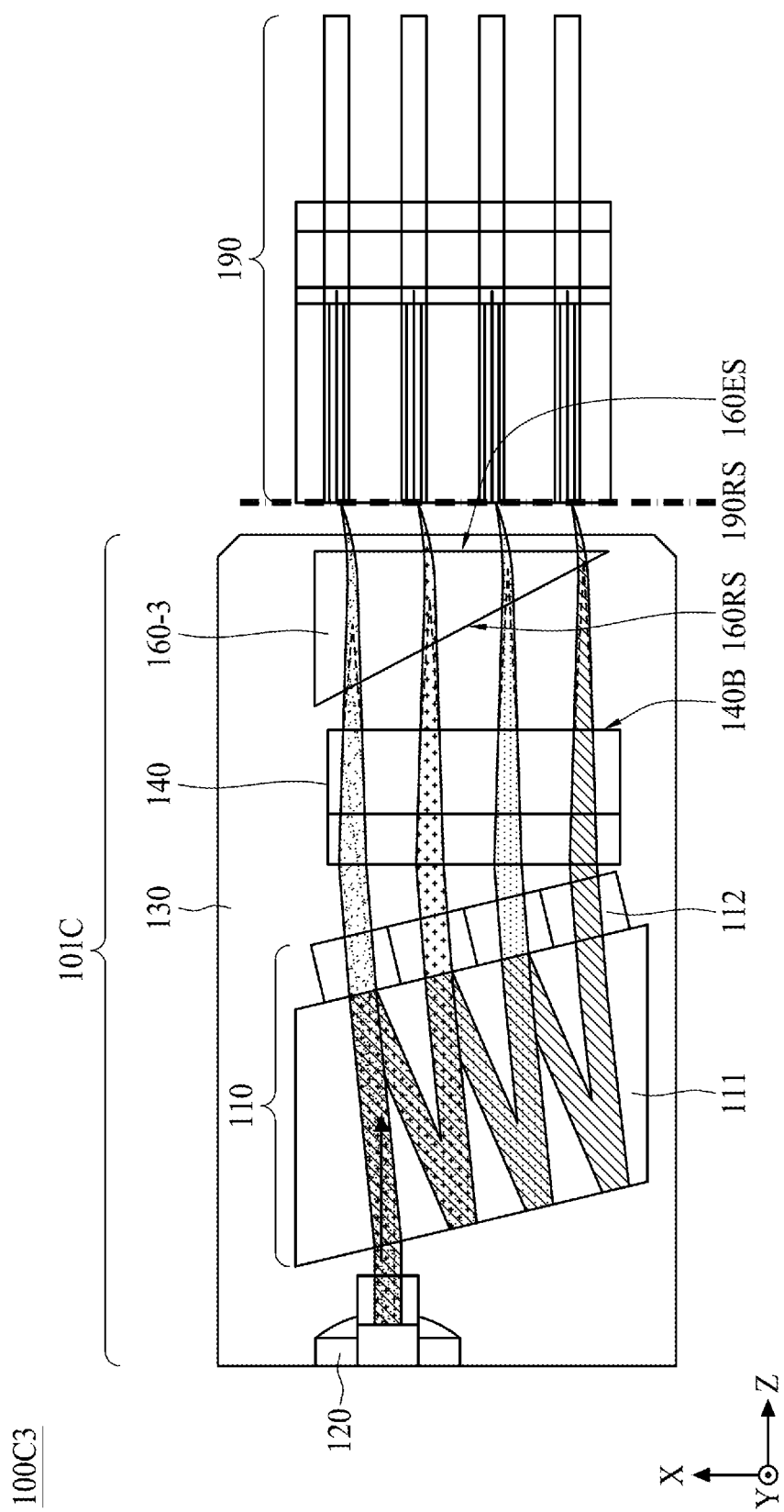
FIG. 8C is a top view perspective of an optical device, according to some embodiments of the present disclosure.

Referring to FIG. 8C, FIG. 8C is a top view perspective of an optical device, according to some embodiments of the present disclosure. The demultiplexer 101C of the optical device 100C3 includes a triangular focal length adjuster 160-3 positioned between the receiving surface 190RS of the receiver extension 190 and the exit surface 140B of the lens module 140. The triangular focal length adjuster 160-3 has a receiving surface 160RS facing the exit surface 140B of the lens module 140 and an exit surface 160ES facing the receiving surface 190RS of the receiver extension 190. In some of the embodiments, the receiving surface 160RS of the triangular focal length adjuster 160-3 is not parallel to the exit surface 140B of the lens module 140. In some of the embodiments, the exit surface 160ES of the triangular focal length adjuster 160-3 is a substantially flat surface. In some embodiments, a surface area of the receiving surface 160RS of the triangular focal length adjuster 160-3 is greater than a surface area of the exit surface 160ES of the triangular focal length adjuster 160-3.

The triangular focal length adjuster 160-3 can be utilized to compensate the difference of original focal lengths of beams exit from each channel, thereby the focal point of the beams from each channel may be within a thin band corresponding to the effective sensible range of the receiver extension 190. In some alternative embodiments, the triangular focal length adjuster 160-3 discussed in FIG. 8A can be substituted with a focal length adjuster that has a first portion that is similar to triangular shape and an additional portion extending from the first portion.

Figure 8D:
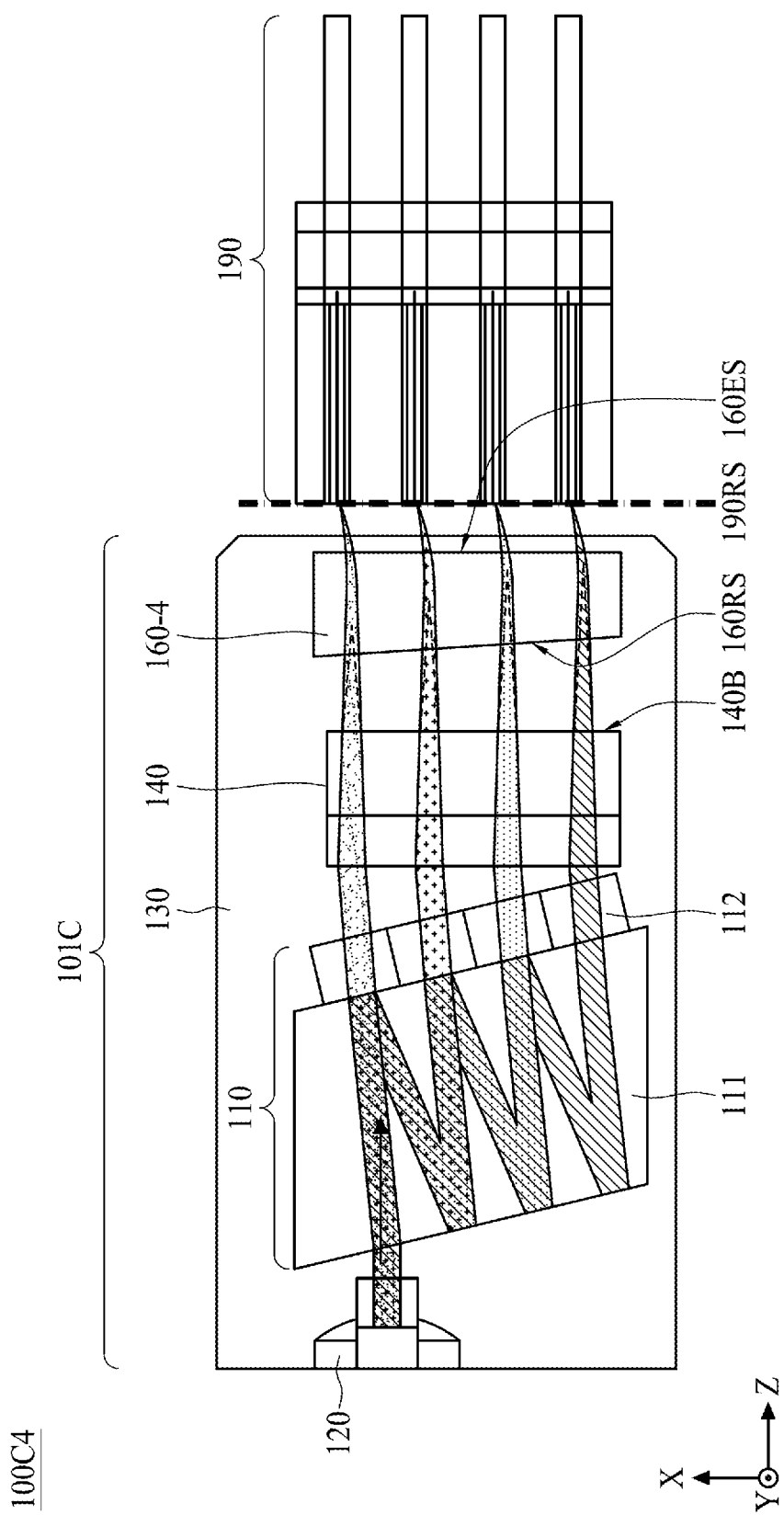
FIG. 8D is a top view perspective of an optical device, according to some embodiments of the present disclosure.

Referring to FIG. 8D, FIG. 8D is a top view perspective of an optical device, according to some embodiments of the present disclosure. The demultiplexer 101C of the optical device 100C4 includes a focal length adjuster 160-4 positioned between the receiving surface 190RS of the receiver extension 190 and the exit surface 140B of the lens module 140. The focal length adjuster 160-4 has a receiving surface 160RS facing the exit surface 140B of the lens module 140 and an exit surface 160ES facing the receiving surface 190RS of the receiver extension 190. In some of the embodiments, the receiving surface 160RS of the focal length adjuster 160-4 is not parallel to the exit surface 140B of the lens module 140. In some of the embodiments, the receiving surface 160RS of the focal length adjuster 160-4 is not parallel to the exit surface 160ES of the focal length adjuster 160-4. In some of the embodiments, the exit surface 160ES of the focal length adjuster 160-4 is a substantially flat surface. In some embodiments, the focal length adjuster 160-4 may have a quadrilateral shape, such as trapezoid.

The focal length adjuster 160-4 can be utilized to compensate the difference of original focal lengths of beams exit from each channel, thereby the focal point of the beams from each channel may be within a thin band corresponding to the effective sensible range of the receiver extension 190.

Figure 8E:
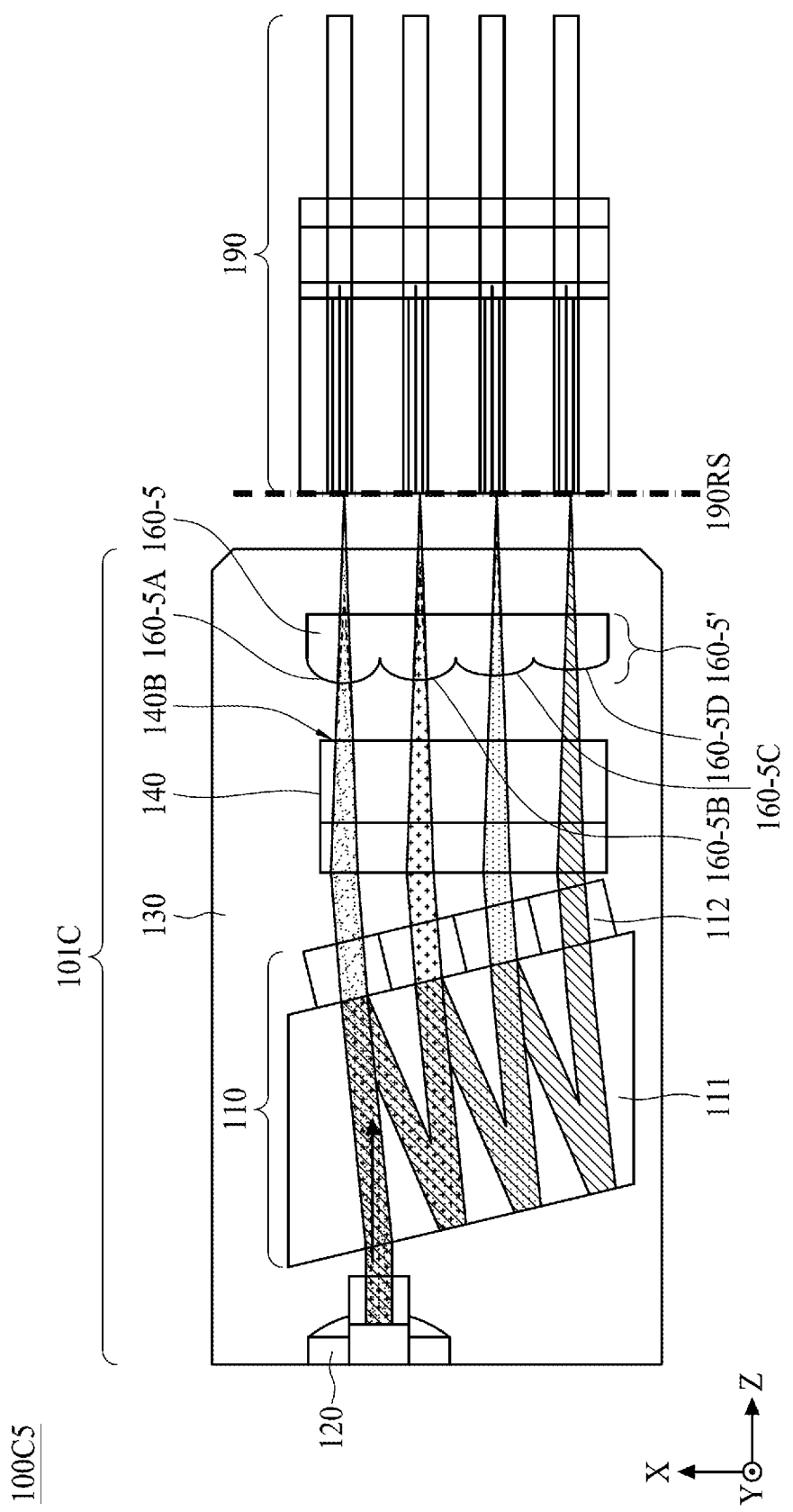
FIG. 8E is a top view perspective of an optical device, according to some embodiments of the present disclosure.
Figure 8E:
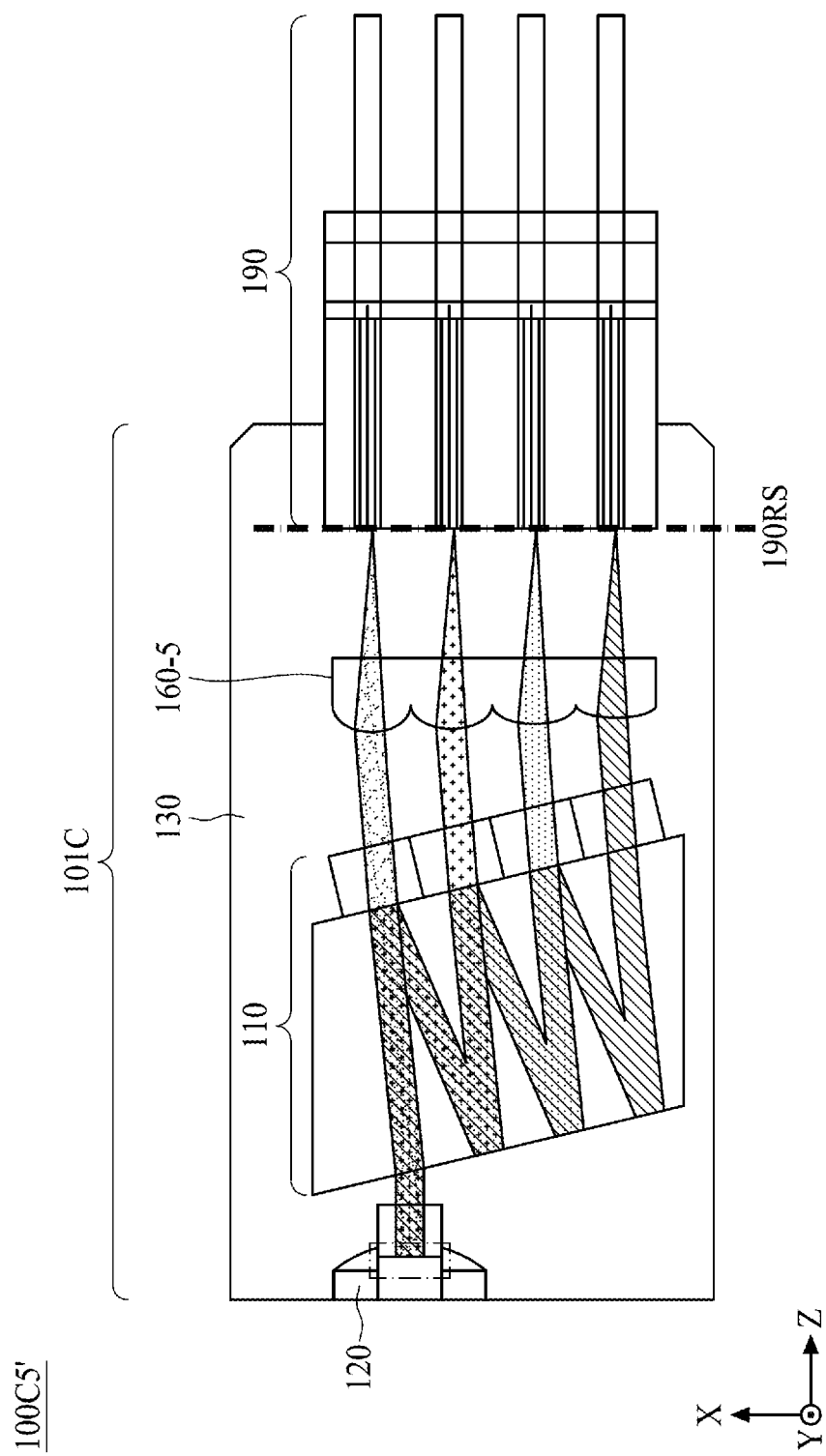

Referring to FIG. 8E, FIG. 8E is a top view perspective of an optical device, according to some embodiments of the present disclosure. The demultiplexer 101C of the optical device 100O5 includes a lens-array focal length adjuster 160-5 positioned between the receiving surface 190RS of the receiver extension 190 and the exit surface 140B of the lens module 140. The lens-array focal length adjuster 160-5 may include a plurality of lens (e.g. 160-5A, 160-5B, 160-5C, 160-5D in FIG. 8E) wherein at least some of the lens have a curved surface. In some of the embodiments, the lens-array focal length adjuster 160-5 may further include an extending portion 160-5' extending from the lens 160-5A, 160-5B, 160-5C, 160-5D, but the present disclosure is not limited thereto.

In some embodiments, the radius of curvature of each of the lens (e.g. 160-5A, 160-5B, 160-5C, 160-5D in FIG. 8E)

may be substantially identical, but each of the lens are not aligned along the primary direction X. In some of the embodiments, such difference of positions of lens of the lens-array focal length adjuster 160-5 can be utilized to compensate the difference of original focal lengths of beams exit from each channel, thereby the focal point of the beams from each channel may be within a thin band corresponding to the effective sensible range of the receiver extension 190. In some embodiments, the extending portion 160-5' may have a different thickness corresponding to each of the lens 160-5A, 160-5B, 160-5C, 160-5D.

Referring to FIG. 8E', FIG. 8E' is a top view perspective of an optical device, according to some embodiments of the present disclosure. The optical device 10005' discussed in FIG. 8E' is similar to the optical device 10005 discussed in FIG. 8E, but the difference resides in that the lens module 140 may be omitted in the optical device 10005'. In some cases, the configuration of the optical device 10005' may be adequate to have the focal point of the beams from each channel may be within a thin band corresponding to the effective sensible range of the receiver extension 190.

Figure 8F:
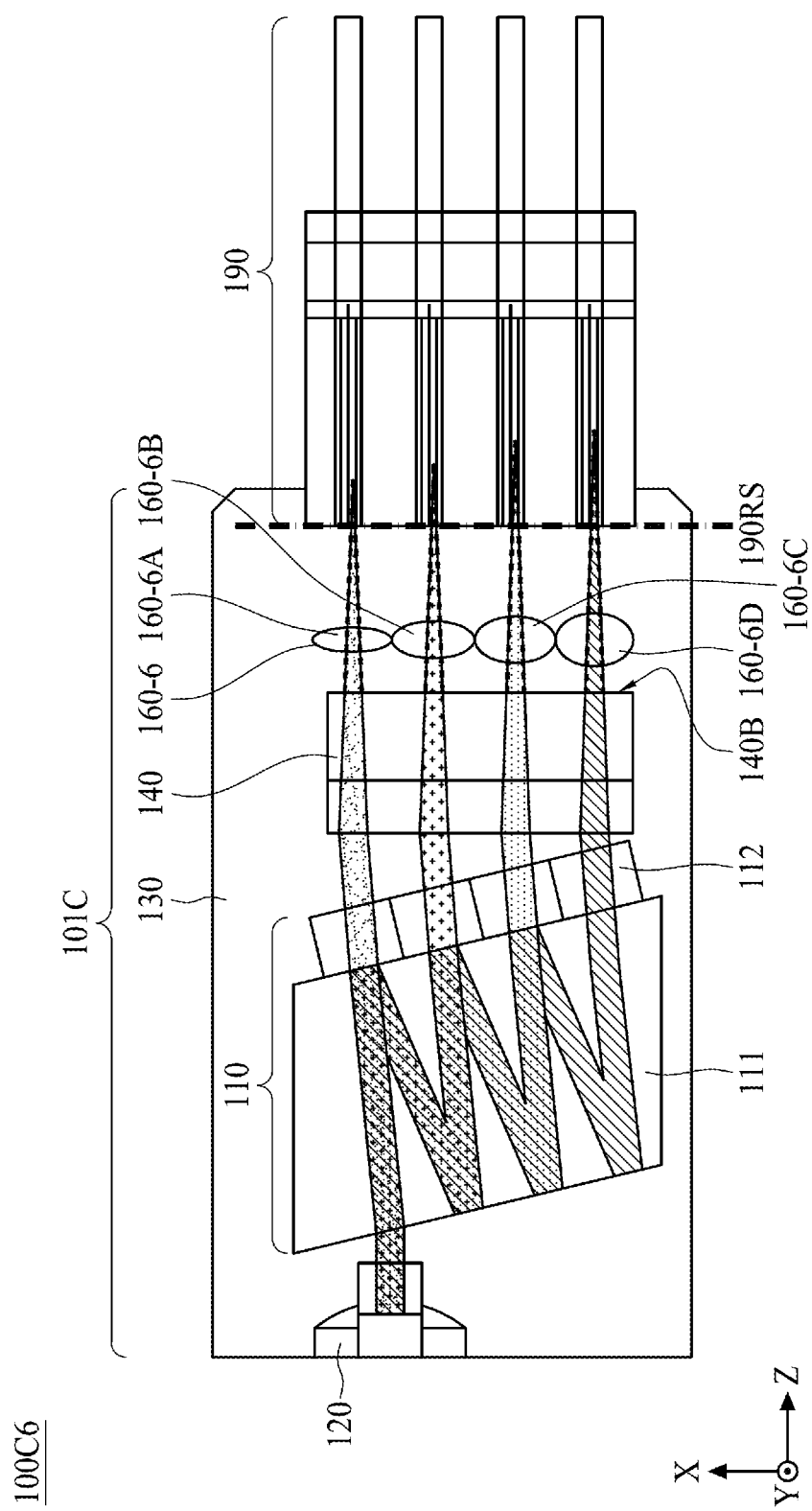
FIG. 8F is a top view perspective of an optical device, according to some embodiments of the present disclosure.
Figure 8F:
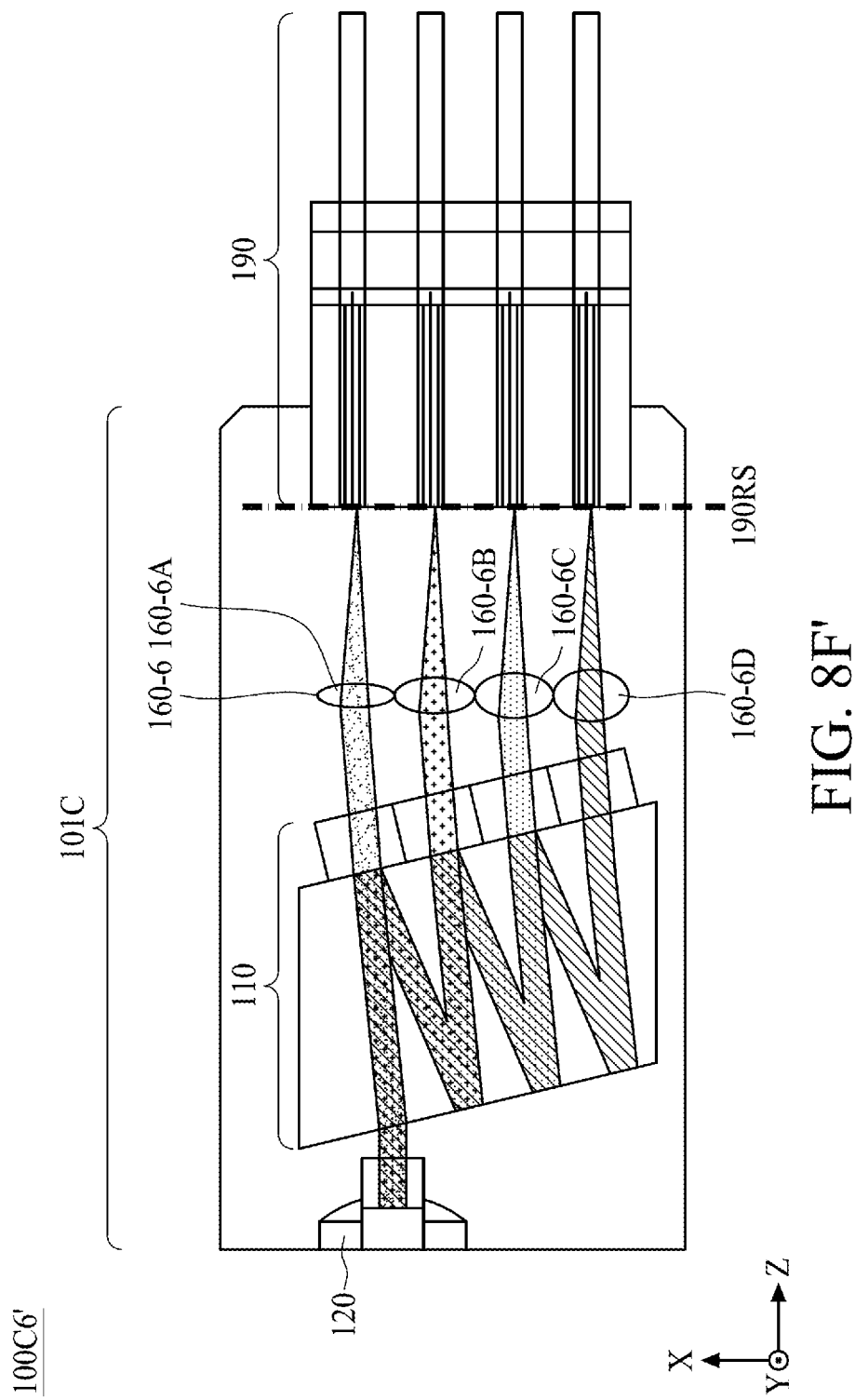

Referring to FIG. 8F, FIG. 8F is a top view perspective of an optical device, according to some embodiments of the present disclosure. The demultiplexer 101C of the optical device 10006 includes a lens-array focal length adjuster 160-6 positioned between the receiving surface 190RS of the receiver extension 190 and the exit surface 140B of the lens module 140. The optical device 10006 shown in FIG. 8F is similar to the optical device 10005 discussed in FIG. 8E, but the difference resides in that each of the lens 160-6A, 160-6B, 160-6C, 160-6D are aligned along the primary direction X (e.g. the center thereof is aligned), whereas the radius of curvature of each of the lens are different. In some of the embodiments, such difference of the radius of curvature of each lens of the lens-array focal length adjuster 160-6 can be utilized to compensate the difference of original focal lengths of beams exit from each channel, thereby the focal points of the beams from each channel may be within a thin band corresponding to the effective sensible range of the receiver extension 190.

In some alternative embodiments, the focal length adjuster 160-6 further includes an extending portion 160-6' connecting the lens 160-6A, 160-6B, 160-6C, 160-6D.

Referring to FIG. 8F', FIG. 8F' is a top view perspective of an optical device, according to some embodiments of the present disclosure. The optical device 10006' discussed in FIG. 8F' is similar to the optical device 10006 discussed in FIG. 8F, but the difference resides in that the lens module 140 may be omitted in the optical device 10006'. In some cases, the configuration of the optical device 10006' may be adequate to have the focal point of the beams from each channel may be within a thin band corresponding to the effective sensible range of the receiver extension 190.

Figure 8G:
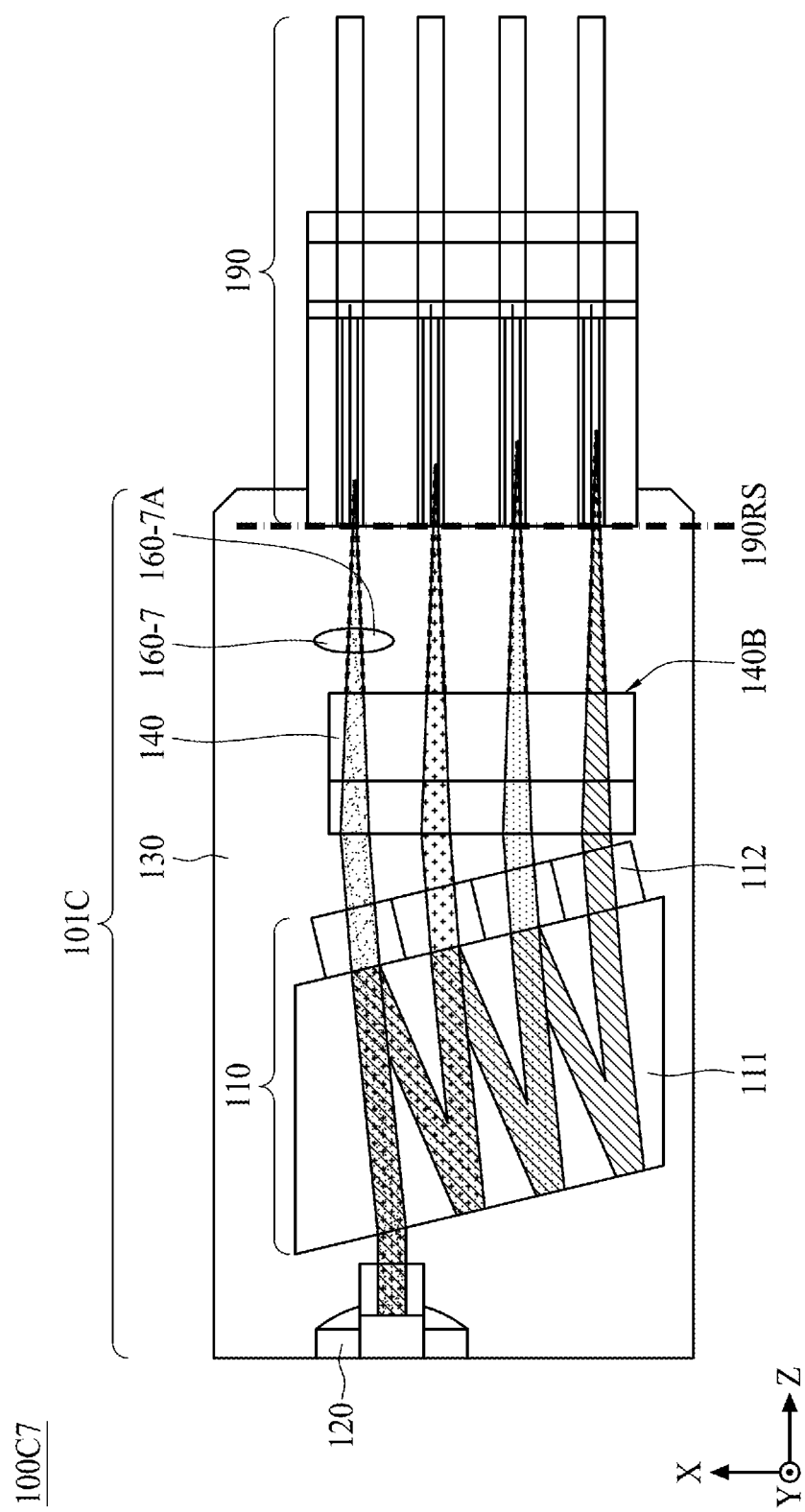
FIG. 8G is a top view perspective of an optical device, according to some embodiments of the present disclosure.

Referring to FIG. 8G, FIG. 8G is a top view perspective of an optical device, according to some embodiments of the present disclosure. The demultiplexer 101C of the optical device 10007 includes a focal length adjuster 160-7 positioned between the receiving surface 190RS of the receiver extension 190 and the exit surface 140B of the lens module 140. The optical device 10007 shown in FIG. 8G is similar to the optical device 10006 discussed in FIG. 8F, but the difference resides in that some of the signals from the channels may not pass through the focal length adjuster 160-7. Alternatively stated, the focal length adjuster 160-7 may only have one lens 160-7A, or in some cases two or more lens. The number of lens in the focal length adjuster 160-7 may be decided based on the focal lengths of each of the signals from the channels. The focal length adjuster 160-7 can be utilized to compensate the difference of original focal lengths of beams, thereby the focal point of the beams from each channel may be within a thin band corresponding to the effective sensible range of the receiver extension 190.

Figure 8H:
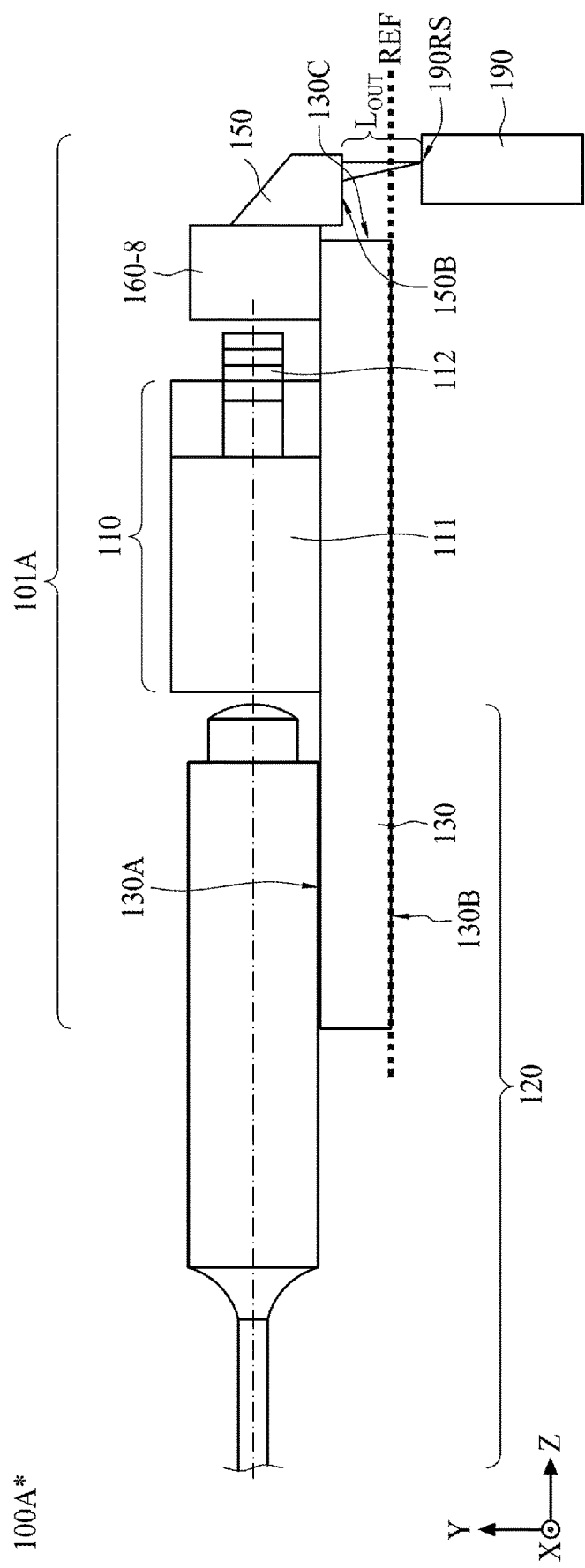
FIG. 8H is a side view perspective of an optical device, according to some embodiments of the present disclosure.

Another group of embodiments of optical device including a demultiplexer is discussed in FIG. 8H. Referring to FIG. 8H, FIG. 8H is a side view perspective of an optical device, according to some embodiments of the present disclosure. The optical device 100A* shown in FIG. 8H is similar to the optical device 100A as shown in FIG. 3A to FIG. 3E, however the difference resides in that the lens module 140 may be substituted with a focal length adjuster 160-8, which can be identical to the focal length adjusters 160-5, 160-6, or 160-7 as discussed in FIG. 8E to FIG. 8G, and the exit surface 150B of the focal length adjuster 150 is parallel to the reference plane REF. In some embodiments, the secondary surface 130B of the carrier 130 can be utilized as the reference plane REF. In some alternative embodiments, a plane parallel to the primary surface 130A of the carrier 130, a plane perpendicular to the secondary direction Y, or the like, can be deemed as the reference plane REF. In this embodiments, the difference of the focal lengths of the beams can be compensated by the focal length adjuster 160-8 (which can be identical to the focal length adjusters 160-5, 160-6, or 160-7) instead of adjusting the orientation of the focal length adjuster 150.

Another group of embodiments of optical device including a demultiplexer is discussed in FIG. 9A to FIG. 11E.

Figure 9A:
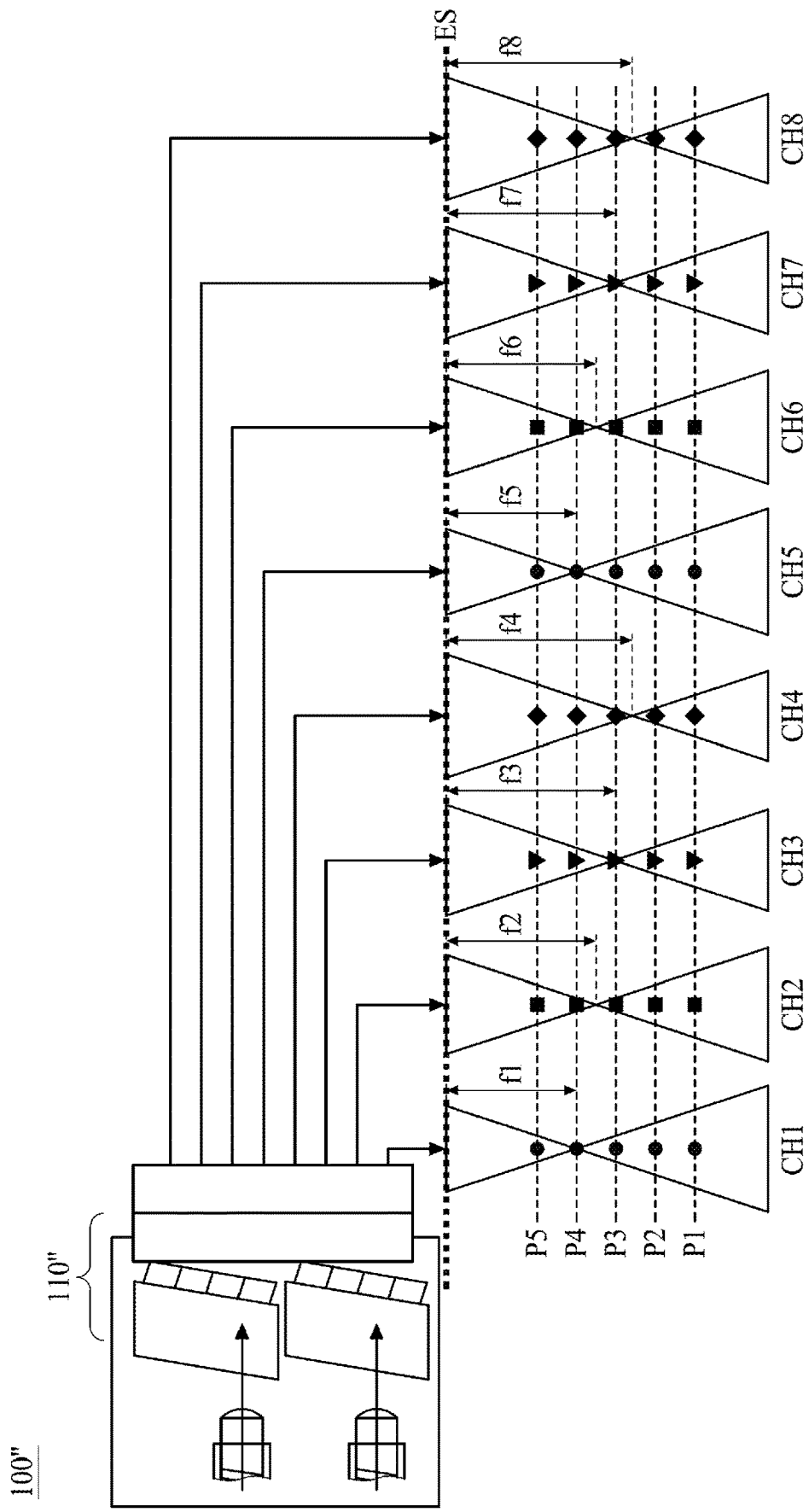
FIG. 9A is a schematic diagram showing an optical device and focal lengths of optical signals of each channel, according to some comparative embodiments of the present disclosure.
Figure 9B:
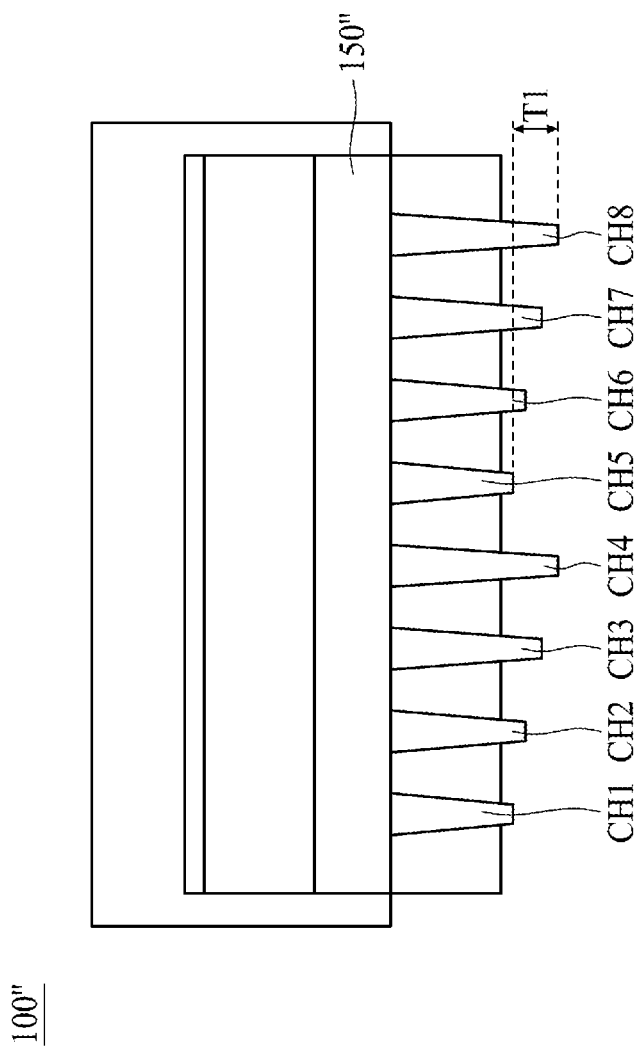
FIG. 9B is a schematic diagram showing a front view of an optical device and focal lengths of optical signals of each channel, according to some comparative embodiments of the present disclosure.

Referring to FIG. 9A and FIG. 9B, FIG. 9A is a schematic diagram showing an optical device and focal lengths of optical signals of each channel, FIG. 9B is a schematic diagram showing a front view of an optical device and focal lengths of optical signals of each channel, according to some comparative embodiments of the present disclosure. Similar to the discussion in FIG. 1A to FIG. 1C, a demultiplexer 100" is utilized to separate a single multichannel signal into several individual channel signals. In some embodiments, a single multichannel signal is usually separated into four channel signals, and in some cases, a common filter module can be utilized to separate multiple multichannel signal into more channel signals. For example, two multichannel signal emitted from two emitter extensions can be separated into eight channels. In a comparative embodiment as shown in FIG. 9A, the demultiplexer 100" has one or more filter module(s) 110" (which can also be referred to as Z-block or thin film filter block) having multiple channels (e.g. first channel CH1 to eighth channel CH8) that separates a signal into multiple individual channel signals. Each of the signal exits from each channel CH1 to CH8 has different wavelength and focal length (e.g. f1, f2, f3, f4 . . . to f8 respectively). Alternatively stated, the signal exits from each channel CH1 to CH8 converges at vastly different positions distanced from an exit surface ES of the demultiplexer 100". Herein the exit surface ES may be a surface of an optical component (such as focal length adjuster 150" shown in FIG. 9B) at an upstream position directly previous to a signal receiver extension (not shown) at downstream position.

In such comparative approach, in the case that has two multichannel signal emitted from two emitter extensions separated into eight channels, each signal from channel CH1 to CH8 may not converge within a thin band since the focal length f1 to f8 are not uniform. Furthermore, the focal length f4 of the beam from channel CH4 and the focal length f5 of the beam from adjacent channel CH5 has greater difference T1. Accordingly, the insertion loss of the signal(s) exit from some of channels may increase, which is related to the discussion in FIG. 1A to FIG. 1C.

Figure 10:
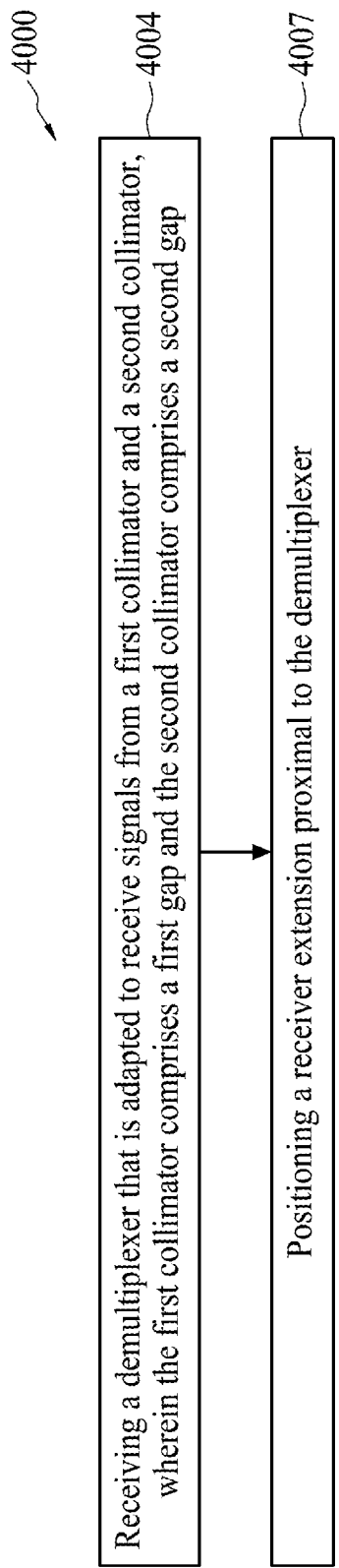
FIG. 10 shows a flow chart representing a method of using an optical device, in accordance with some embodiments of the present disclosure.

Referring to FIG. 10, FIG. 10 shows a flow chart representing a method of using an optical device, in accordance with some embodiments of the present disclosure. The method 4000 for using an optical device includes receiving a demultiplexer that is adapted to receive signals from a first collimator and a second collimator, wherein the first collimator comprises a first gap and the second collimator comprises a second gap (operation 4004, which can be referred to FIG. 11A or FIG. 11D or FIG. 11E), and positioning a receiver extension proximal to the demultiplexer (operation 4007, which can be referred to FIG. 11C or FIG. 11D or FIG. 11E).

Figure 11A:
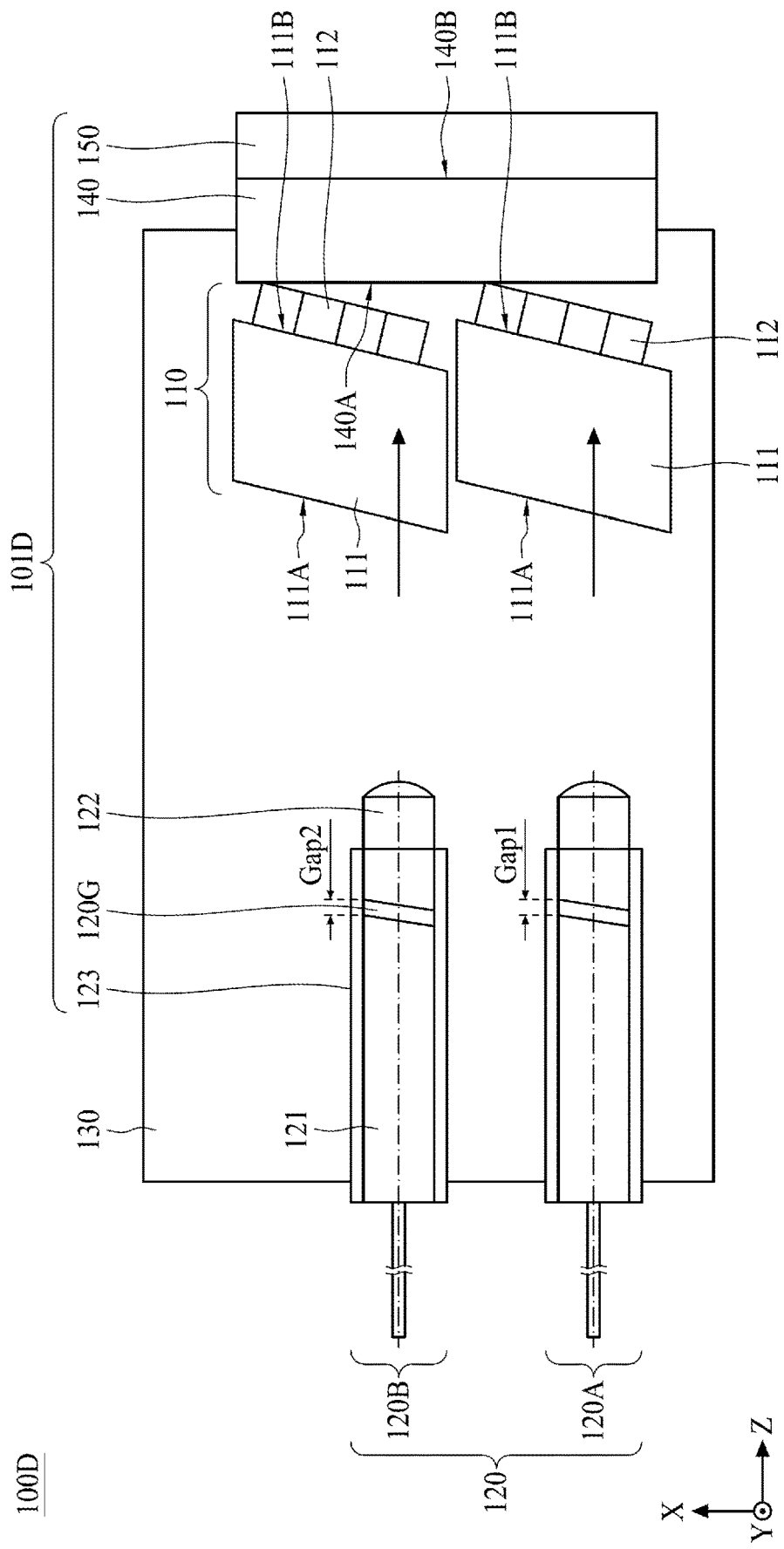
FIG. 11A is a top view perspective of an optical device, according to some embodiments of the present disclosure.
Figure 11B:
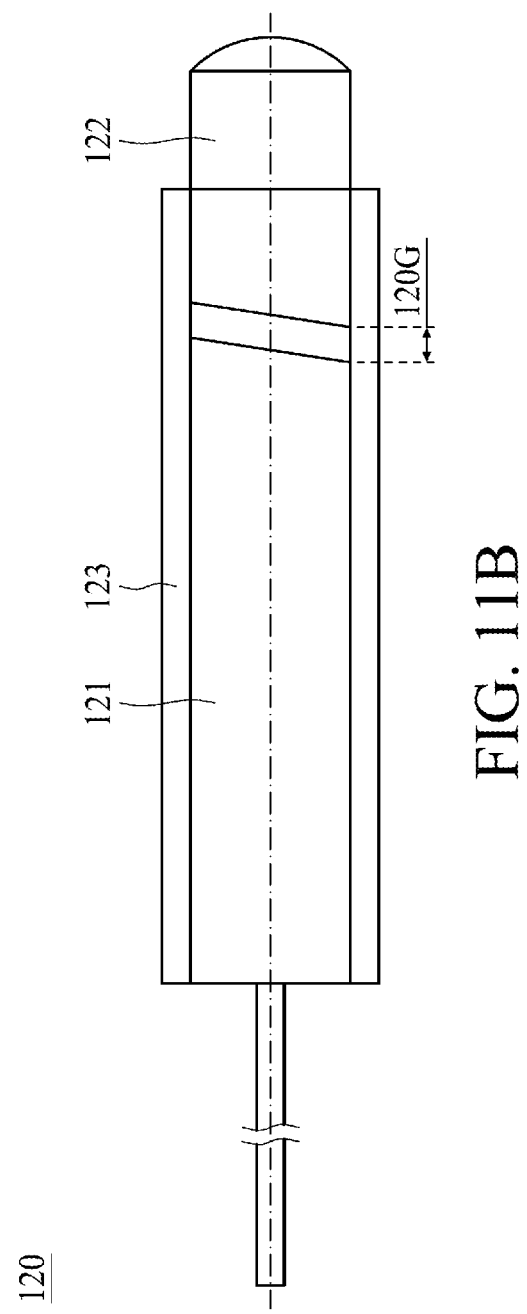
FIG. 11B is an enlarged cross sectional view of a collimator of FIG. 11A, according to some embodiments of the present disclosure.
Figure 11C:
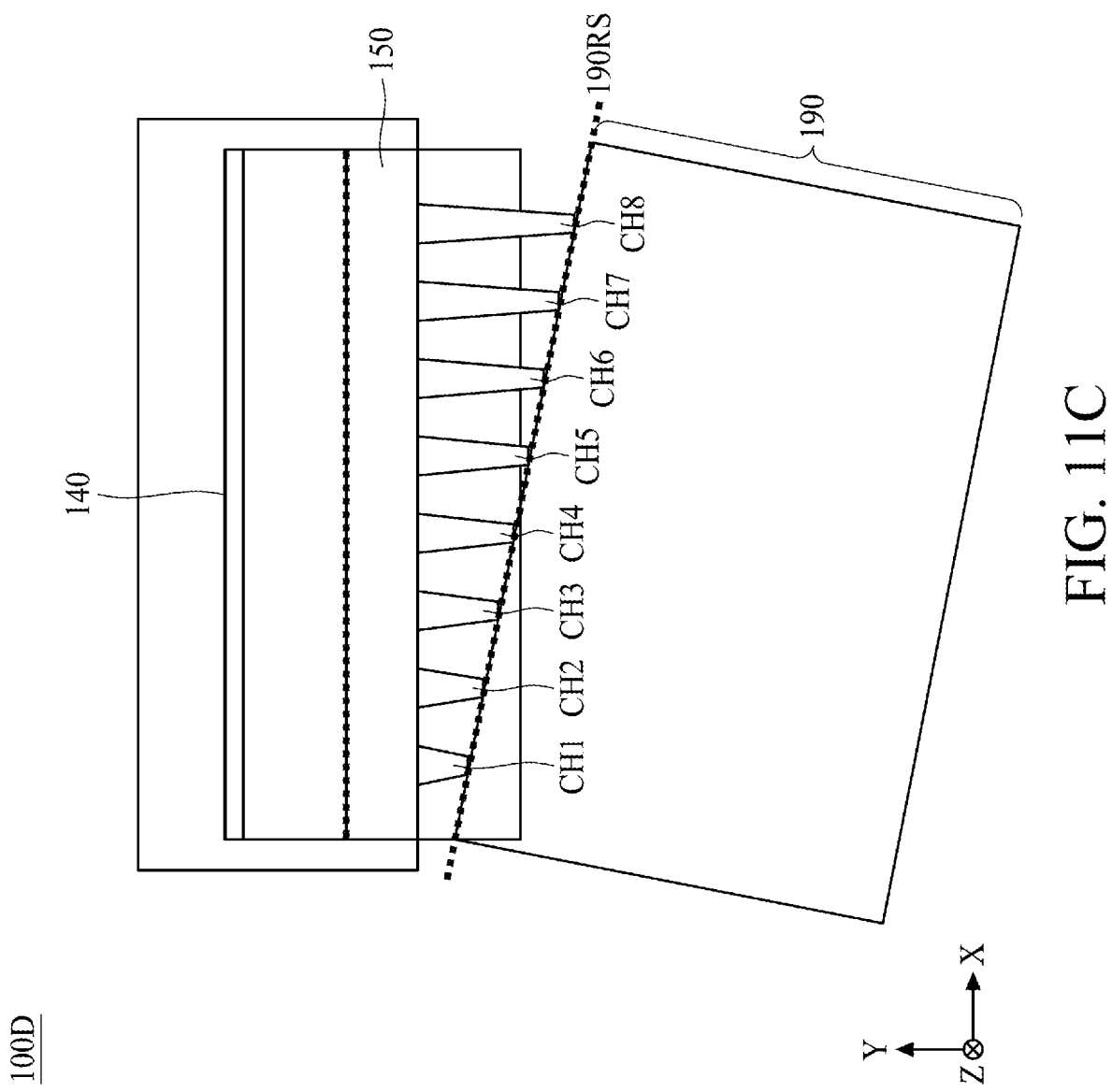
FIG. 11C is a front view perspective of an optical device of FIG. 11A, according to some embodiments of the present disclosure.

Referring to FIG. 11A to FIG. 11C, FIG. 11A is a top view perspective of an optical device, FIG. 11B is an enlarged cross sectional view of a collimator of FIG. 11A, FIG. 11C is a front view perspective of an optical device of FIG. 11A, according to some embodiments of the present disclosure. In some embodiments, an optical device 100D may include a carrier 130, one or more filter module(s) 110 (which can also be referred to as Z-block or thin film filter block) having multi-channel configuration (for example, 8-channel configuration shown in FIG. 11A, or the like) and disposed on the carrier 130 as well as on a predetermined optical path, and a plurality of collimators 120 (for example, a first collimator 120A and a second collimator 120B, on the predetermined optical path but present disclosure is not limited to two collimator configuration). In some embodiments, the first collimator 120A is coupled to N channels of a first filter module 110, and the second collimator 120B is coupled to N channels of a second filter module 110. In some alternative embodiments, the first collimator 120A is coupled to a first N channels of the filter module 110, and the second collimator 120B is coupled to a second N channels of the filter module 110. The filter module 110 includes a body portion 111 and filter elements 112. The body portion has a receiving side 111A faces the collimators 120 and an exit side 111B apart from receiving side 111A, wherein the filter elements 112 are configured on the exit side 111B of the body portion 111. In some embodiments, the body portion 111 is made of glass or other suitable material that allows light or optical signal to propagate therein. The optical signals coming from collimators 120 (for example, the first collimator 120A and the second collimator 120B) may propagate through the through body portion 111 and be de-multiplexed by filter elements 112, thereby turned into multiple (such as 8 in the example shown in FIG. 11A) different optical beams based upon their specific wavelengths.

In some embodiments, the optical device 100D may further include lens module 140. In some embodiments, the lens may be mounted on carrier 130 and has a receiving surface 140A facing the filter module 110 and an exit surface 140B opposite to the receiving surface 140A. The lens module 140 may be utilized to adjust propagation direction of light or optical signal, or adapted to provide focusing function.

In some embodiments, the optical device 100D may further include focal length adjuster 150. Herein the filter module 110, the carrier 130, the lens module 140, and the focal length adjuster 150 are collectively referred to as demultiplexer 101D. The focal length adjuster 150 alters the direction of received light or optical signal, for example, from a direction parallel to X-Z plane to a direction unparalleled to (such as substantially perpendicular to) X-Z plane.

In some embodiments, the focal length adjuster 150 can be a right-angle prism. In some embodiments, the focal length adjuster 150 is attached to the exit surface 140B of the lens module 140. In some of the optional embodiments, the focal length adjuster 150 is free from being in direct contact with the carrier 130. In some of the optional embodiments, the focal length adjuster 150 is free from vertically overlapping the carrier 130. In some alternative embodiments, the focal length adjuster 150 and the lens module 140 can be integrated as an optical device.

As shown in FIG. 11B, in some embodiments, a collimator 120 may include a ferrule 121, an output lens 122, and a protective layer 123 at least partially surround an outer surface of the ferrule 121 and/or an outer surface of the output lens 122. In some embodiments, the ferrule 121 and output lens 122 is spaced by a gap 120G. In some embodiments, the gap 120G is filled with air. In some alternative embodiments, adhesive glue, glass, transmissive medium, or the like, may be filled between the ferrule 121 and output lens 122.

Herein the gap 120G of the first collimator 120A constitutes a first effective optical length, and the gap 120G of the second collimator 120B constitutes a second effective optical length. Having the first effective optical length being different from the second effective optical length may help compensating the difference of original focal lengths of beams exit from each channel. In some embodiments, focal points of at least four beams (such as eight beams) with different wavelengths may land within a thin band.

In some embodiments as shown in FIG. 11A, a dimension Gap1 of the gap 120G of the first collimator 120A is different from a dimension Gap2 of the gap 120G of the second collimator 120B. In some embodiments, a material filled in the gap 120G of the first collimator 120A is identical to a material filled in the gap 120G of the second collimator 120B. In some embodiments, a difference between the dimension Gap1 and the dimension Gap2 is comparable to a difference T1 between the focal length f4 of the beam from channel CH4 and the focal length f5 of the beam from adjacent channel CH5 (which is previously discussed in FIG. 9B, wherein the difference T1 is measured under the condition of two collimators being identical, and the dimension of the gap 120G is also identical), i.e., (|Gap1-Gap2|≈T1). In some embodiments, a difference between the dimension Gap1 and the dimension Gap2 (|Gap1-Gap2|) is less than a Rayleigh distance of certain optical beam. Herein Rayleigh distance is related to a wavelength of a certain optical beam, for example, in an application of single mode fiber having 1310 nm wavelength, a Rayleigh distance would be around 50 µm in the air.

As shown in FIG. 11C, in some embodiments, by having different dimensions of the gap 120G of each collimators, the difference between the focal length f4 of the beam from channel CH4 and the focal length f5 of the beam from adjacent channel CH5 may be compensated. Thereby, the focal points of the beams from each channels may land at positions within a thin band corresponding to an effective sensible range of the receiver extension 190, and the overall insertion loss and the insertion loss of certain signal may be mitigated. In some embodiments, if the difference between the dimension Gap1 and the dimension Gap2 (|Gap1-Gap2|) is greater than a Rayleigh distance of certain optical beam (such as 50 µm in an application of single mode fiber having 1310 nm wavelength), the overall insertion loss and/or the insertion loss of certain signal may not be effectively mitigated. It should be noted that Rayleigh distance depends on the wavelength of certain beams and the application thereof.

Alternatively, the Rayleigh distance may be different in other different configuration of optical devices. In the embodiments that include more than two collimators 120, the dimension of the gap 120G of each collimators 120 can be adjusted respectively.

Figure 11D:
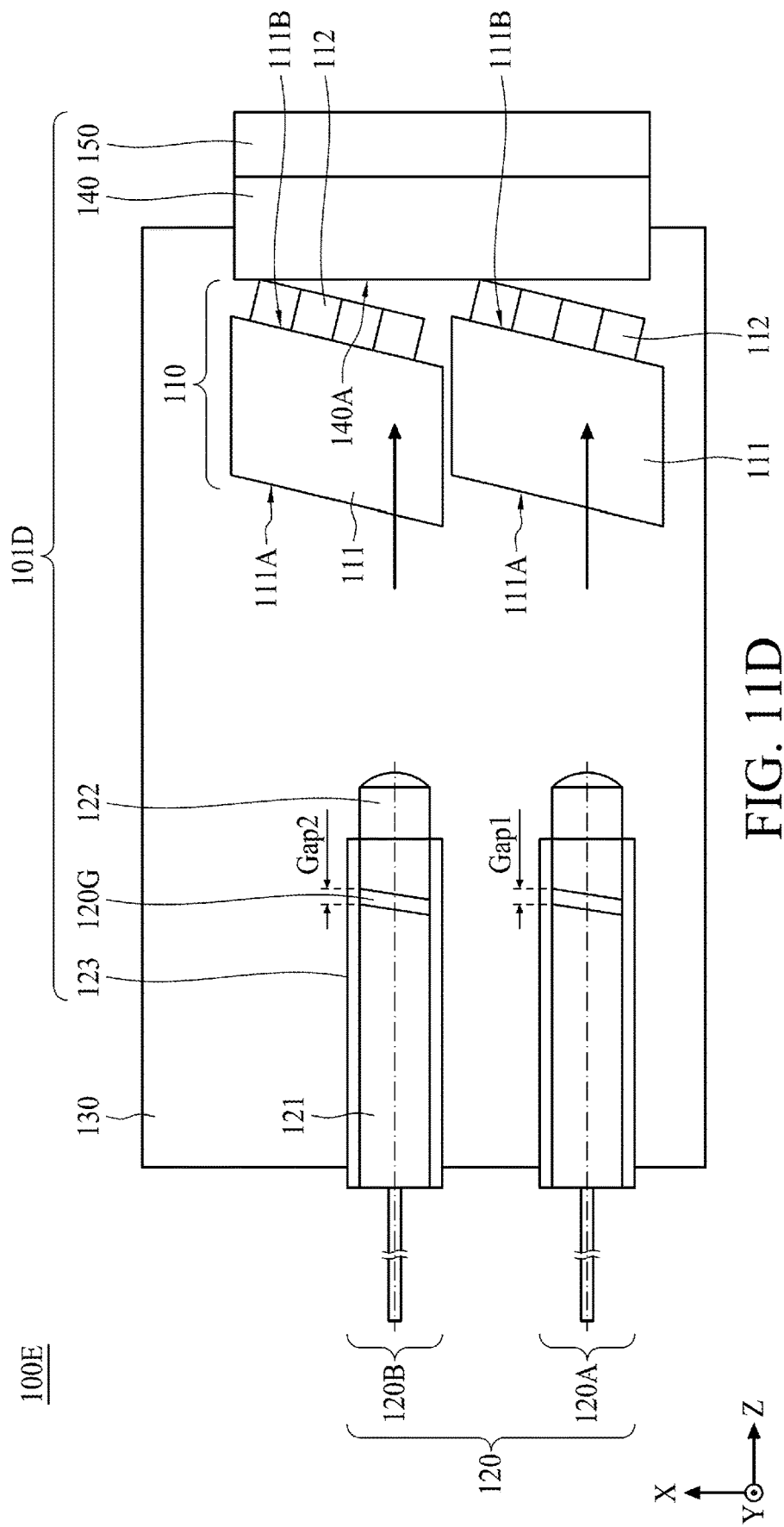
FIG. 11D is a top view perspective of an optical device, according to some embodiments of the present disclosure.

Referring to FIG. 11D, FIG. 11D is a top view perspective of an optical device, according to some embodiments of the present disclosure. FIG. 11D provides embodiments of an optical device 100E using alternative approach that is similar to the optical device 100D discussed in FIG. 11A to FIG. 11C, but the difference resides in that the material filled in the gap 120G of the first collimator 120A is different from a material filled in the gap 120G of the second collimator 120B. For example, the refractive index of such materials may be different. In some embodiments, the material filled in the gap 120G can be selected from air, adhesive glue, glass, transmissive medium, or the like. In some of the embodiments, a dimension Gap1 of the gap 120G of the first collimator 120A is identical to a dimension Gap2 of the gap 120G of the second collimator 120B.

In some alternative embodiments, the lens module 140 may be substituted with a focal length adjuster 160-8 as discussed in FIG. 8H, which can be identical to the focal length adjusters 160-5, 160-6, or 160-7 as discussed in FIG. 8E to FIG. 8G. Similar to the discussion in FIG. 8H, the difference of the focal lengths of the beams can be compensated by the focal length adjuster 160-8, instead of adjusting the orientation of the focal length adjuster 150.

Figure 11E:
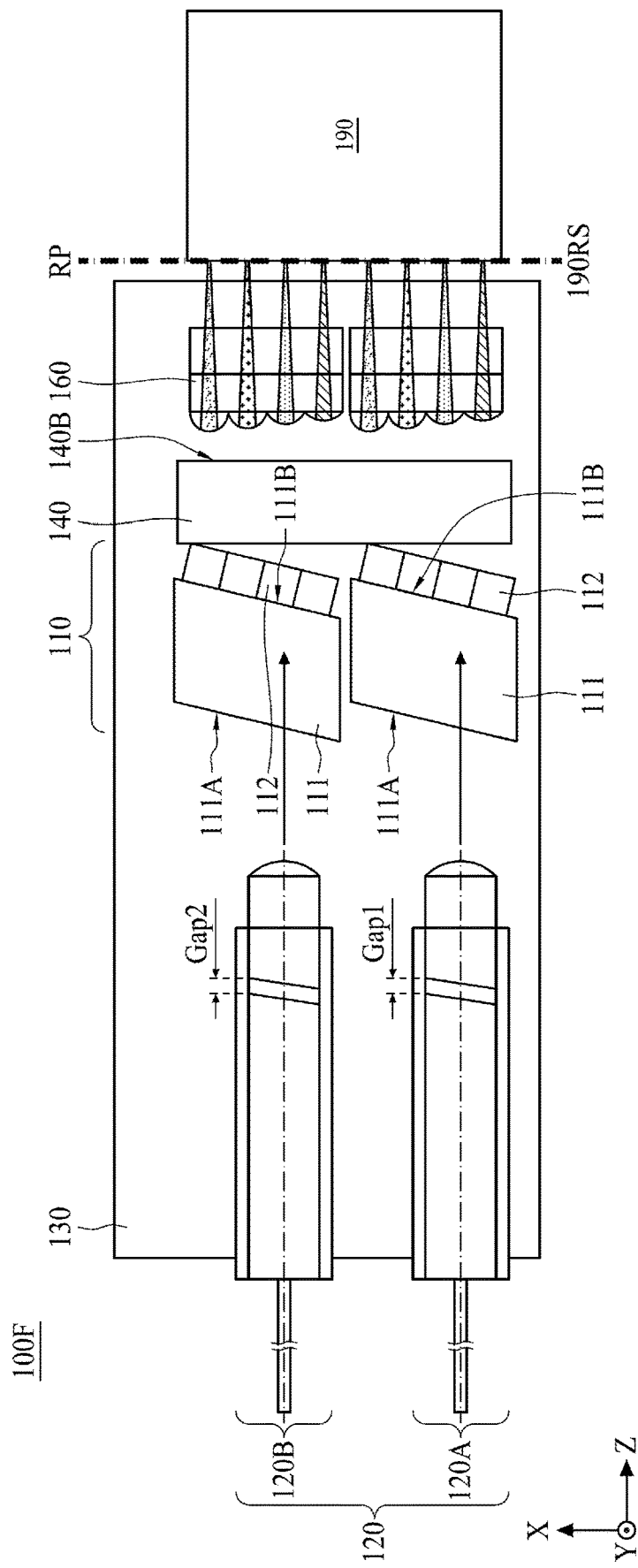
FIG. 11E is a top view perspective of an optical device, according to some embodiments of the present disclosure.

Referring to FIG. 11E, FIG. 11E is a top view perspective of an optical device, according to some embodiments of the present disclosure. FIG. 11E provides embodiments of an optical device 100F similar to the optical device 100D discussed in FIG. 11A to FIG. 11C but using an alternative approach similar to FIG. 8A to FIG. 8G, wherein the receiving surface 190RS of the receiver extension 190 is substantially orthogonal to X-Z plane. In some of the embodiments, the receiving surface 190RS of the receiver extension 190 is parallel to the exit surface 140B of the lens module 140. Specifically, the various types of focal length adjusters positioned between the receiving surface 190RS of the receiver extension 190 and the exit surface 140B of the lens module 140, such as the ones discussed in the FIG. 8A to FIG. 8G. The embodiments of focal length adjusters 160 (such as focal length adjusters 160-1 to 160-7 discussed in FIG. 8A to FIG. 8G) can be utilized to compensate the difference of original focal lengths of beams exit from each channel.

It should be noted that the lengths, numbers of the same focal length adjuster, number of lens thereon, or numbers of each sections focal length adjusters may be adjusted based on the number of channels of the optical device. For example, in the case that each signal is separated into four beams by a demultiplexer and such demultiplexer is adapted to receive two signals, the focal length adjuster may also be configured to receive eight beams (or seven beams in the case of applying FIG. 8B) accordingly. Using the approach discussed in FIG. 8A to FIG. 8D as examples, the numbers of the focal length adjuster can be increased to two when one signal is separated into four beams. Using the approach discussed in FIG. 8E to FIG. 8G for example, the numbers of lens of the focal length adjuster can be increased to eight when one signal is separated into four beams. Similarly, numbers of channels in the embodiments discussed in FIG. 11A to FIG. 11E can also be adjusted based on requirement.

By using the focal length adjuster that complies with specific configuration, the positions of the focal points of the beams from each channels can land at positions within a thin band corresponding to an effective sensible range of the receiver extension 190, thereby mitigating the insertion loss. The detailed discussion can be referred back to FIG. 4A to FIG. 4C, FIG. 8A to FIG. 8G, and FIG. 11A to FIG. 11E.

Similar approaches discussed above can be adjusted and utilized in optical device that includes multiplexer, as discussed in the embodiments in FIG. 12 to FIG. 16. Multiplexer can be utilized to combine a number of optical signals carried by light having different wavelengths into an optical fiber (or other suitable transmission waveguide), and with similar approach utilized in FIG. 2 to FIG. 11E, the insertion loss issue may also be alleviated, e.g. a beam size of beams from each channel may be within an area of effective sensing area of the receiver extension.

Figure 12:
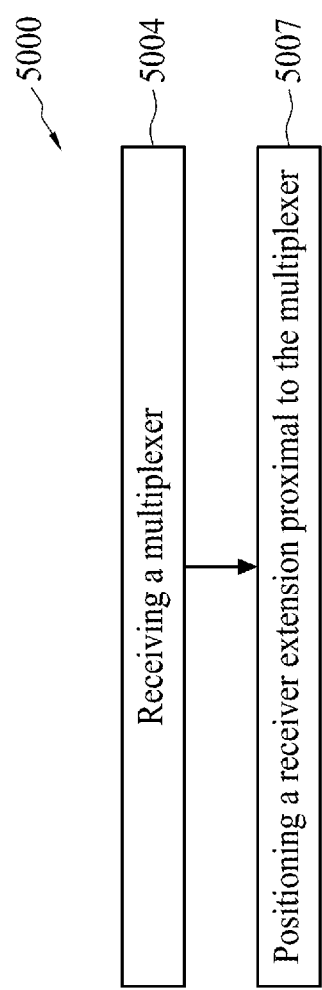
FIG. 12 shows a flow chart representing a method of using an optical device, in accordance with some embodiments of the present disclosure.

Referring to FIG. 12, FIG. 12 shows a flow chart representing a method of using an optical device, in accordance with some embodiments of the present disclosure. The method 5000 for using an optical device includes receiving a multiplexer (operation 5004, which can be referred to FIG. 13B, FIG. 14, FIG. 15A to FIG. 15G, or FIG. 16), and positioning a receiver extension proximal to the multiplexer (operation 5007, which can be referred to FIG. 13B, FIG. 14, FIG. 15A to FIG. 15G, or FIG. 16).

Figure 13A:
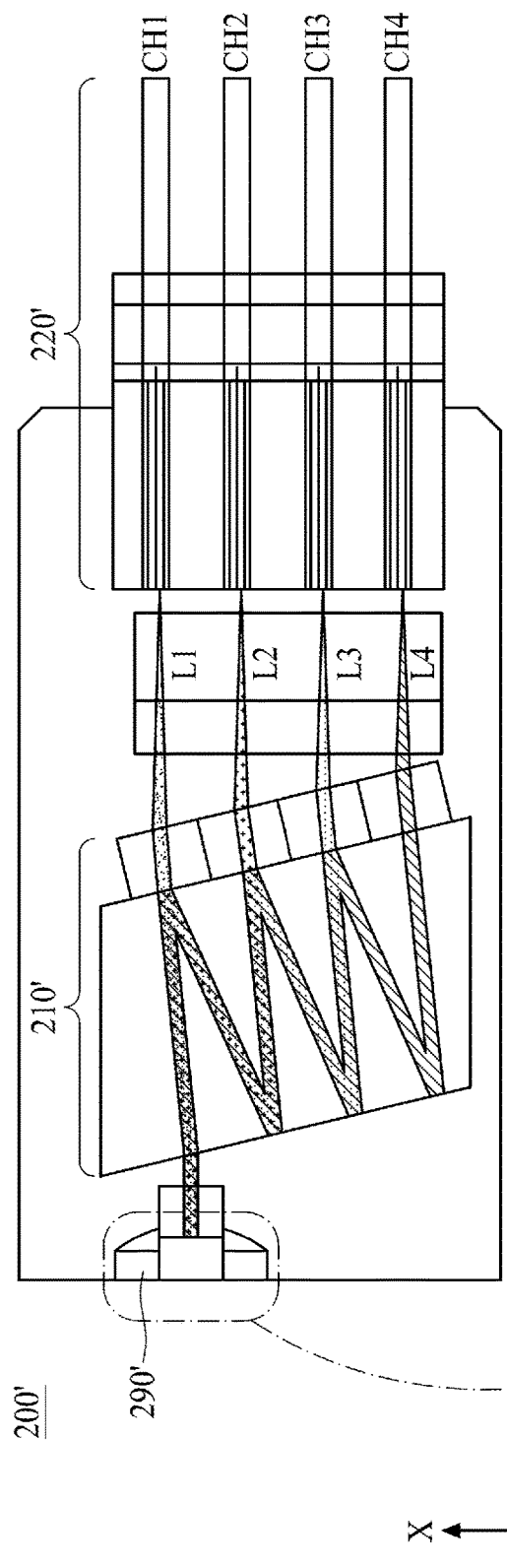
FIG. 13A is a top view perspective of an optical device, according to some comparative embodiments of the present disclosure.
Figure 13A:
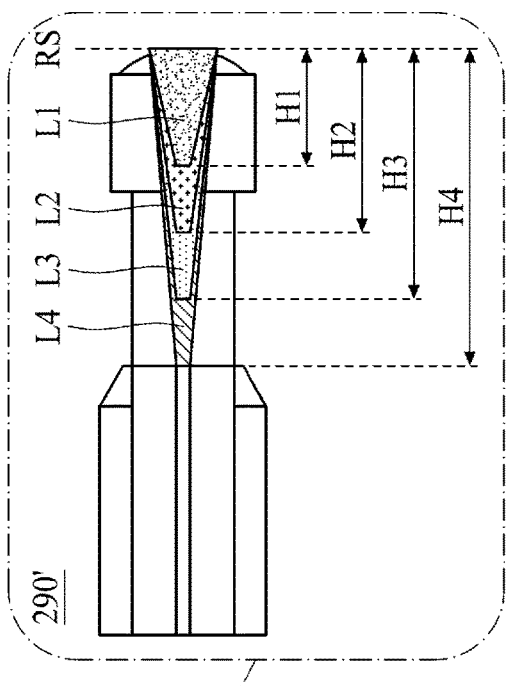

Referring to FIG. 13A and FIG. 13A', FIG. 13A is a top view perspective of an optical device according to some comparative embodiments of the present disclosure, FIG. 13A' is an enlarged cross sectional view of a receiver extension of FIG. 13A and focal lengths of each optical signal according to some comparative embodiments of the present disclosure. An optical device 200' includes an emitter extension 220', for example, a fiber array that coupled to a laser diode, a multiplexer 210', or a receiver extension 290', for example, a collimator coupled to a photo diode or any suitable optical sensor. A number of signals L1, L2, L3, L4 having different wavelengths emit from the emitter extension 220 (which may have multiple channels CH1 to CH4) are combined by the multiplexer 210' and further transmitted to the receiver extension 290'. However, in this comparative embodiment, the focal lengths H1, H2, H3 and H4 of the signals L1, L2, L3, L4 are vastly different from each other and does not converge within a thin band. Accordingly, insertion loss at the receiving end may be incurred and the device performance may not be desired.

Figure 13B:
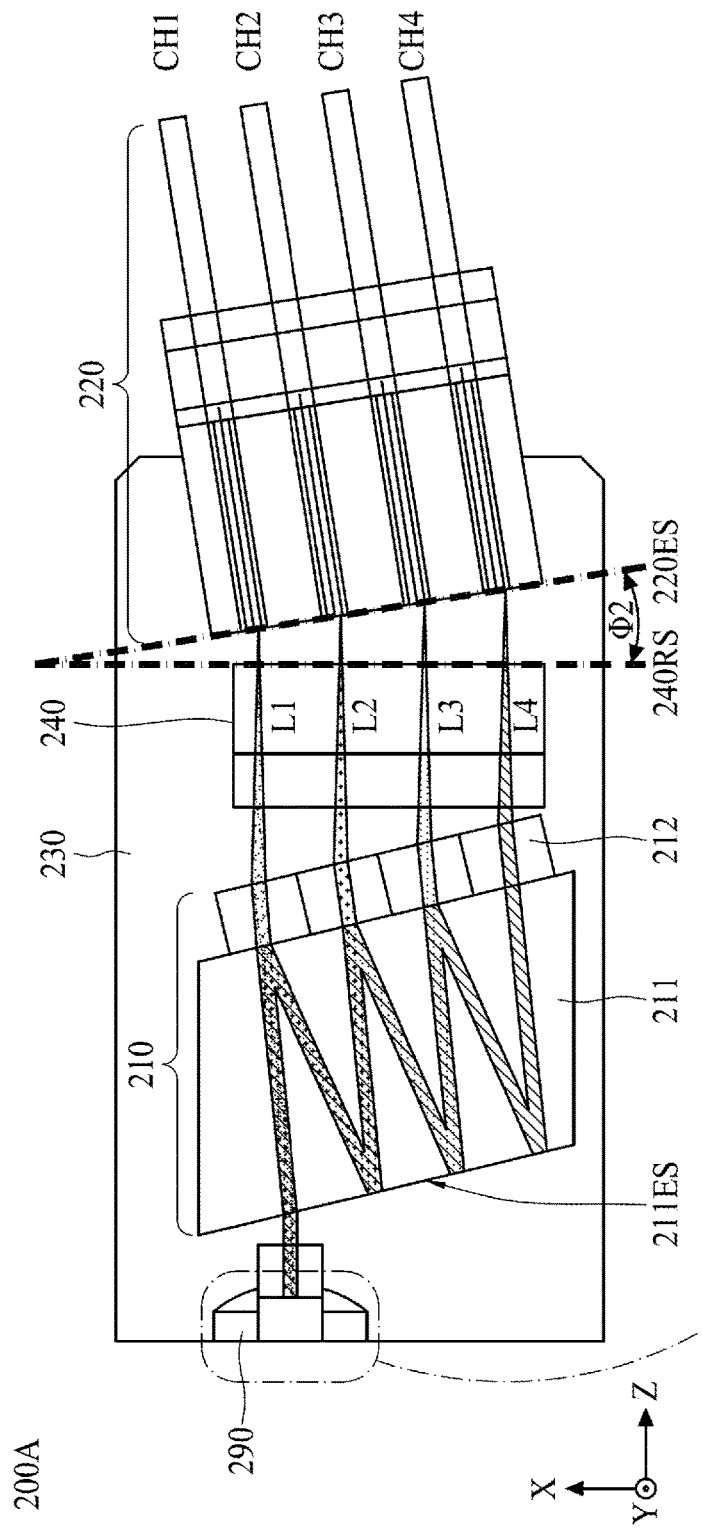
FIG. 13B is a top view perspective of an optical device, in accordance with some embodiments of the present disclosure.
Figure 13B:
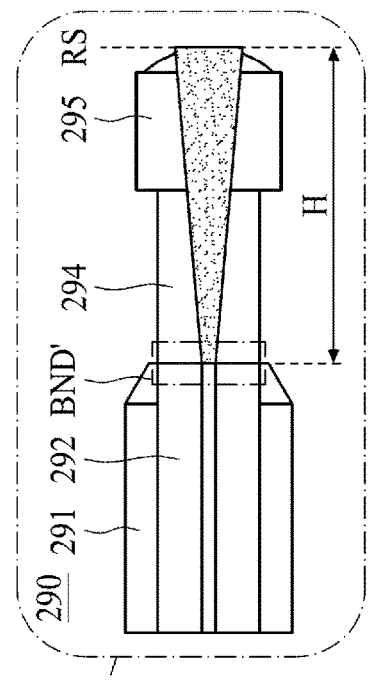

Referring to FIG. 13B and FIG. 13B', FIG. 13B is a top view perspective of an optical device, FIG. 13B' is an enlarged cross sectional view of a receiver extension of FIG. 13B and focal lengths of each optical signal, in accordance with some embodiments of the present disclosure. An optical device 200A may include an emitter extension 220, a carrier 230, a filter module 210 (which can also be referred to as Z-block or thin film filter block) on the carrier 230, a lens module 240 between the emitter extension 220 and the filter module 210, and a receiver extension 290. In some embodiments, the receiver extension 290 can be photodiode, grating coupler, optical fiber array, optical absorber array, or other suitable optical receiving elements. The filter module 210 includes a body portion 211 and filter elements 212, wherein the filter elements are relatively proximal to the emitter extension 220. An exit surface 211ES of the body portion 211 faces toward the receiver extension 290. In some embodiments, the body portion 211 is made of glass or other suitable material that allows light or optical signal to propagate therein. In some embodiments, the number of the filter elements 212 may correspond to a number of channels of the emitter extension 220 (such as four filter elements 212 corresponding to four channels CH1 to CH4). In some embodiments, the emitter extension 220 may be a collimator, fiber, signal provider or other suitable signal emitting device.

In some embodiments, the receiver extension 290 (as shown in FIG. 13W) may include a fiber 292, a lens 295, and a ferrule 291 at least partially surround an outer surface of the fiber 292. In some embodiments, the receiver extension 290 further includes a medium portion 294 between the lens 295 and the fiber 292. In some embodiments, the medium portion 294 may be adhesive layer, such as glue or other suitable material that allows beams to propagate therein. It should be noted that the configuration of receiver extension 290 is not limited thereto. The receiver extension 290 shown in FIG. 13W can also be substituted by various types of suitable receivers.

In some embodiments, the exit surface 240B of the lens module 240 is inclined to a side surface of the carrier 230. The exit surface 220ES of the emitter extension 220 is not parallel to the receiving surface 240B of the lens module 240. In some of the embodiments, the exit surface 220ES of the emitter extension 220 is substantially orthogonal to X-Z plane. In some of the embodiments, the receiving surface 240B of the lens module 240 is substantially orthogonal to X-Z plane. In some embodiments, an angle Φ2 is between the exit surface 220ES of the emitter extension 220 and the receiving surface 240B of the lens module 240, wherein the angle Φ2 may be less than 90 degree. In some embodiments, the angle Φ2 can be in a range from about 0.5 degree to about 3 degree when a difference between the focal length f4 of the beam L4 from fourth channel CH4 and the focal length f1 of the beam L1 from first channel CH1 is less than about 150 μm. If the angle Φ2 is greater than or less than the aforesaid range under the condition of difference between the focal length f4 (or the shortest among all) and focal length f1 (or the longest among all) is less than 150 μm, the position adjustment of each of the focal points may be difficult to be achieved due to the situations where the focal points of some signals may be out of the thin band corresponding to an effective sensible range at the receiver extension. However it should be noted that when a focal length difference between the longest focal length and the shortest focal length has different value, or when there are specific requirement, an acceptable range of the angle Φ2 may also be adjusted.

A plurality of optical signals coming from emitter extension 220 may propagate through the filter elements 212 and the body portion 211, thereby turned into an optical beams based upon their specific wavelengths. The orientation of the exit surface 220ES of the emitter extension 220 may help compensating the difference of focal lengths of beams exit from each channel, thereby each beams L1 to L4 may converge at positions within a thin band BND' having a middle plane apart from the receiving surface RS of the receiver extension 290 by a distance H, as shown in FIG. 13B'. In some of the embodiments, the middle plane of the thin band BND' may be proximal to (or coincide with) a surface the fiber 292 facing toward the medium portion 294, but the present disclosure is not limited thereto.

Figure 14:
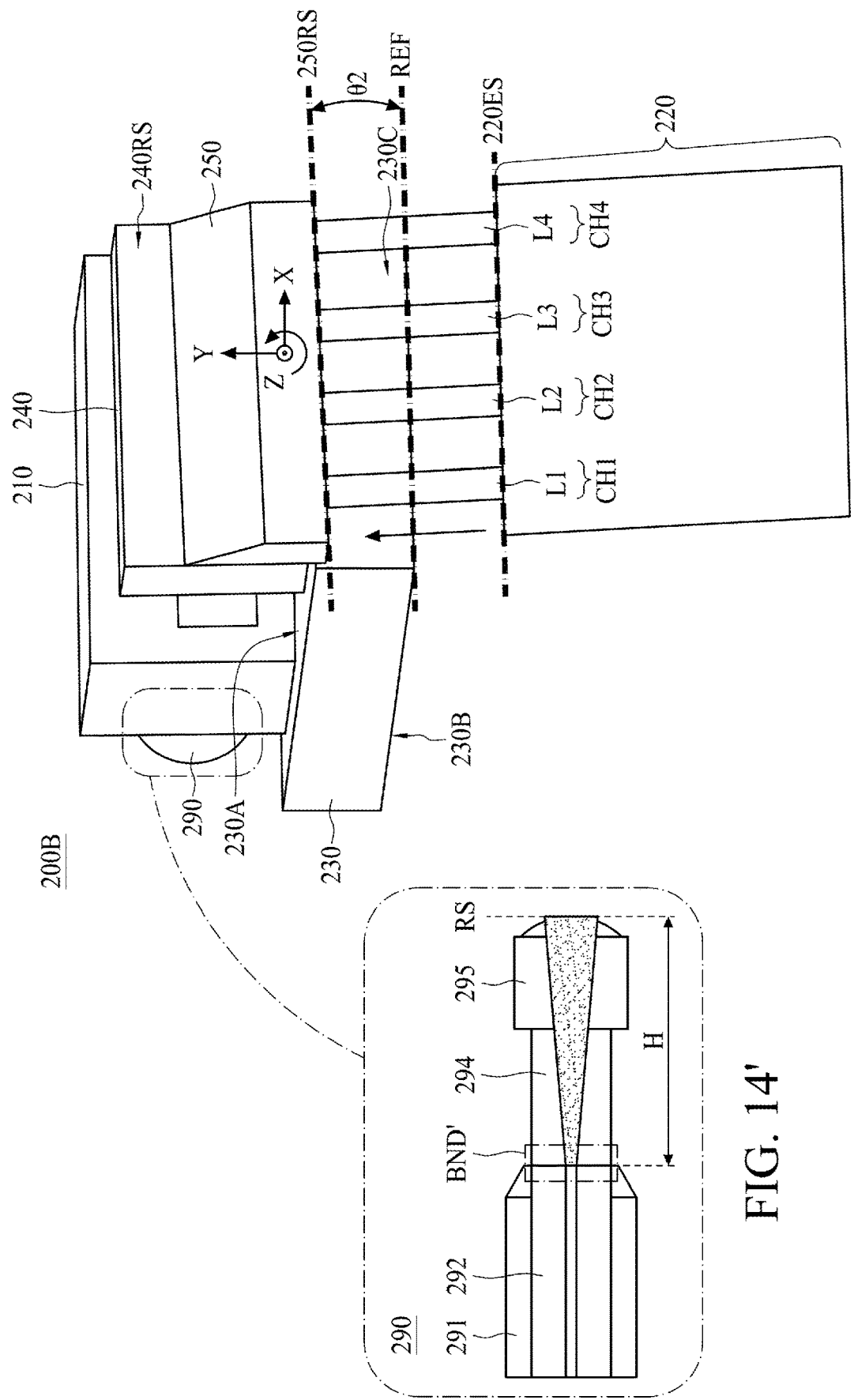
FIG. 14 is a perspective view showing an optical device, according to some embodiments of the present disclosure.

Referring to FIG. 14 and FIG. 14', FIG. 14 is a perspective view showing an optical device, FIG. 14' is an enlarged cross sectional view of a receiver extension of FIG. 14 and focal lengths of each optical signal, in accordance with some embodiments of the present disclosure. In some embodiments, an optical device 200B may include a carrier 230, a filter module 210 (which can also be referred to as Z-block or thin film filter block) on the carrier 230, a lens module 240 between the emitter extension 220 and the filter module 210, and a receiver extension 290. The carrier 230 comprises a primary surface 230A facing secondary direction Y, a secondary surface 230B opposite to the primary surface 230A, and a tertiary surface 230C connecting the secondary surface 230B and the primary surface 230A, wherein the tertiary surface 230C faces tertiary direction Z.

In some embodiments, the optical device 200B may further include lens module 240. In some embodiments, the lens module 240 may be mounted on primary surface 230A and has a receiving surface 240RS facing away from the receiver extension 290. The lens module 240 may be utilized to adjust propagation direction of light or optical signal, or adapted to provide focusing function. In some embodiments, the propagation direction of light/optical signal can be adjusted by rotating the lens module 240 around secondary direction Y.

In some embodiments, the optical device 200B may further include focal length adjuster 250. The focal length adjuster 250 alters the direction of received light or optical signal, for example, from a direction parallel to X-Z plane to a direction unparalleled to X-Z plane. In some embodiments, the focal length adjuster 250 can be a prism, such as a right-angle prism. In some embodiments, the focal length adjuster 250 is attached to the receiving surface 240RS of the lens module 240. In some alternative embodiments, the focal length adjuster 250 and the lens module 240 can be integrated as an optical device. In some of the optional embodiments, the focal length adjuster 250 is free from being in direct contact with the carrier 230. In some of the optional embodiments, the focal length adjuster 250 is free from vertically overlapping the carrier 230. Since focal lengths of each beams L1 to L4 are different from each other, the orientation of the focal length adjuster 250 is configured in a way to compensate thereto, for example, the receiving surface 250RS of the focal length adjuster 250 is free from being parallel to the exit surface 220ES of the emitter extension 220. An angle θ2, defined as an inclined angle between the receiving surface 250RS of the focal length adjuster 250 and a reference plane REF, can be configured in a manner such that the focal point of each beams L1 to L4 can converge at positions within a thin band BND' having a middle plane apart from the receiving surface RS of the receiver extension 290 by a distance H, as shown in FIG. 14'. In some embodiments, the secondary surface 230B of the carrier 230 can be utilized as the reference plane REF. In some alternative embodiments, a plane parallel to the primary surface 230A of the carrier 230, a plane perpendicular to the secondary direction Y, or the like, can be deemed as the reference plane REF. In some embodiments, the exit surface 220ES of the emitter extension 220 is parallel to the reference plane REF. The angle θ2 can be in a range from about 0.5 degree to about 3 degree. If the angle θ2 is greater than or less than the aforesaid range under the condition of difference between the focal length f4 (or the shortest among all) and focal length f1 (or the longest among all) is less than 150 μm, the position adjustment of each of the focal points may be difficult to be achieved due to the situations where the focal points of some signals may be out of the thin band corresponding to an effective sensible range. However it should be noted that when a focal length difference between the longest focal length and the shortest focal length has different value, or when there are specific requirement, an acceptable range of the angle θ2 may also be adjusted.

The optical devices 200C1 to 20007 subsequently discussed in FIG. 15A to FIG. 15G is similar to the optical device 200A discussed in FIG. 13B, but the difference resides in the orientation of the emitter extension 220, and the optical devices 200C1 to 20007 further utilizes the approach of using the various types of focal length adjusters as discussed in FIG. 8A to FIG. 8G, so as to compensate the difference between the focal lengths of each beams such that each beams can substantially converge at positions within a thin band. Particularly, a refractive index n2 of the focal length adjuster (e.g. the focal length adjuster 260-1 to 260-7 discussed in FIG. 15A to FIG. 15G) is different from a refractive index n1 of an optical mediums (such as glass, glue, silicon containing material, silicon-derivative compositions, air, specific gas or composition, or the like) between a lens module 240 and the focal length adjuster. In some embodiments, n2 is greater than n1. In some of the embodiments, the refractive index n1 of the optical mediums between the lens module 240 and the focal length adjuster is in a range from about 1 to about 3.5. In some of the embodiments, the refractive index n2 is in a range from about 1 to about 3.5. The focal length adjusters 260-1 to 260-7 discussed in FIG. 15A to FIG. 15G comprises one or more sections, where each of the plurality of sections allows a beam to pass through and provides different amount of focal length adjustment to respective beams. That is, an extent of focal point adjustment is different in each sections.

Figure 15A:
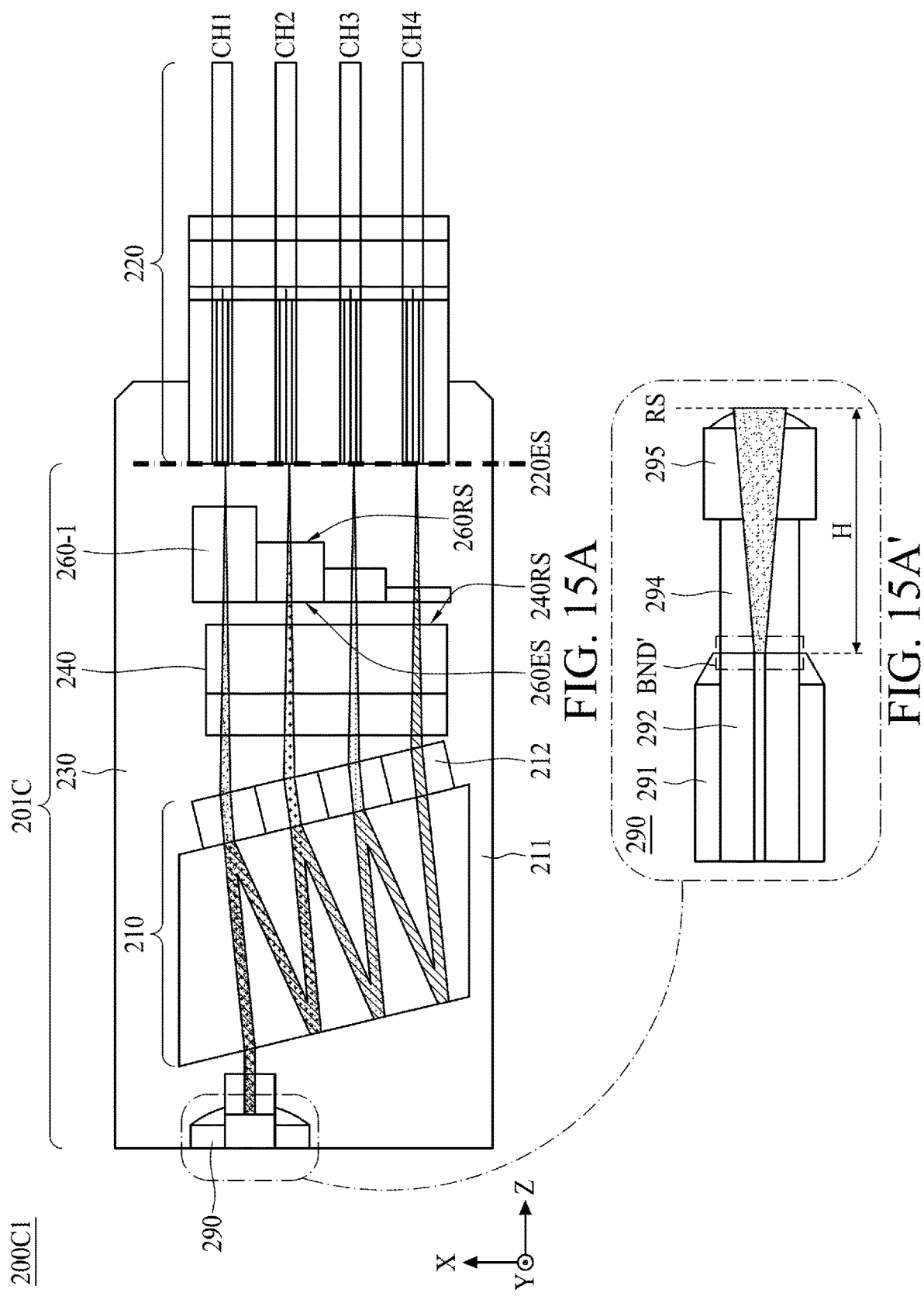
FIG. 15A is a top view perspective of an optical device, according to some embodiments of the present disclosure.

Referring to FIG. 15A and FIG. 15A', FIG. 15A is a top view perspective of an optical device, FIG. 15A' is an enlarged cross sectional view of a receiver extension of FIG. 15A and focal lengths of each optical signal, in accordance with some embodiments of the present disclosure. The multiplexer 201C of the optical device 200C1 includes a focal length adjuster 260-1 positioned between the receiving surface 240RS of the lens module 240 and the exit surface 220ES of the emitter extension 220. The focal length adjuster 260-1 has a non-uniform thickness profile corresponding to each channels. In some of the embodiments, the profile and the configuration of the focal length adjuster 260-1 can be referred to the focal length adjuster 160-1 discussed in FIG. 8A. In some embodiments, the focal length adjuster 260-1 has a receiving surface 260RS facing the emitter extension 220 and an exit surface 260ES facing the lens module 240. In some of the embodiments, the exit surface 260ES of the focal length adjuster 260-1 is a substantially flat surface. However, in some alternative embodiments, the exit surface 260ES of the focal length adjuster 260-1 has a non-uniform surface. In some of the embodiments, the receiving surface 260RS of the focal length adjuster 260-1 has a non-uniform profile, which may have a plurality of sections that are parallel to at least a portion of the exit surface 260ES of the focal length adjuster 260-1.

The focal length adjuster 260-1 can be utilized to compensate the difference of original focal lengths of beams, thereby the focal point of the beams from each channel may be within a thin band BND' in order to mitigate insertion loss.

Figure 15B:
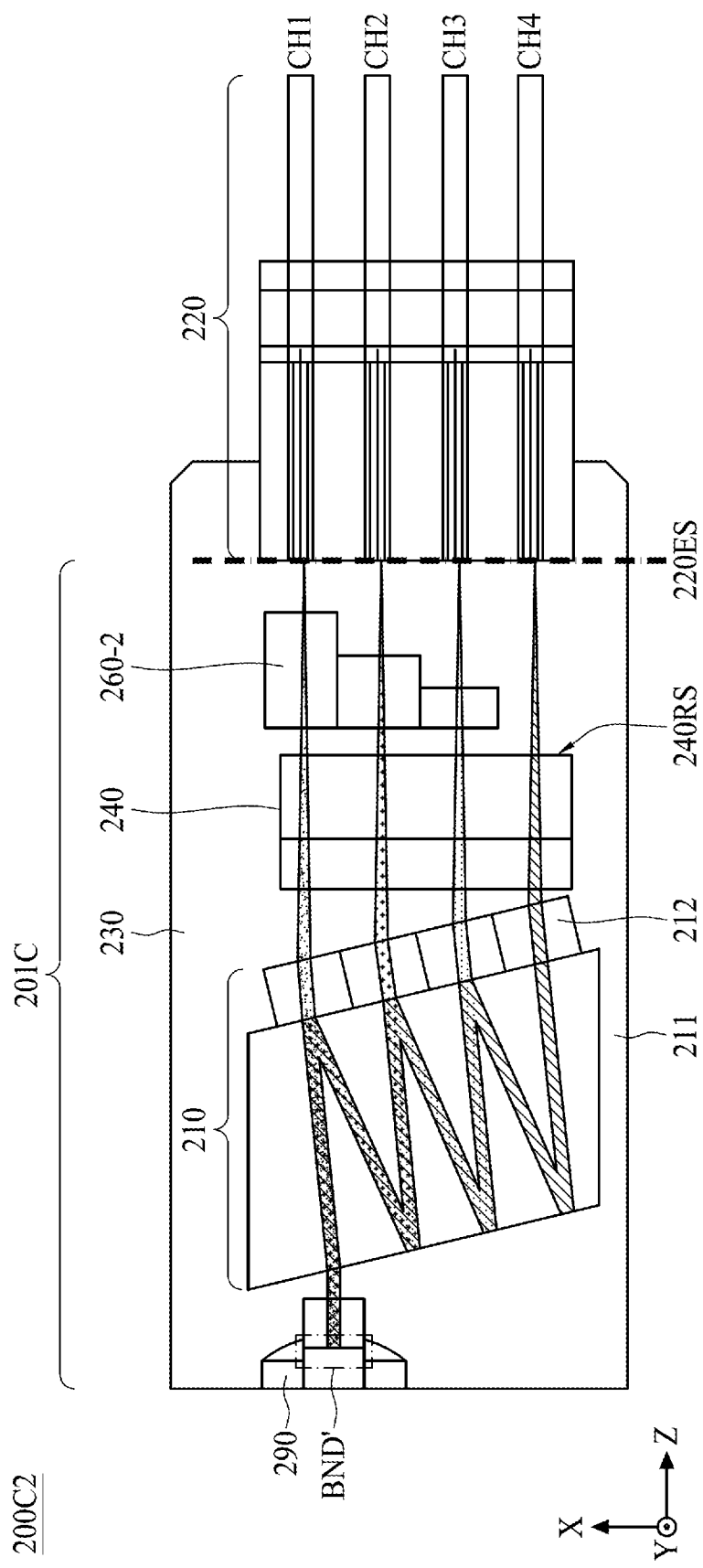
FIG. 15B is a top view perspective of an optical device, according to some embodiments of the present disclosure.

Referring to FIG. 15B, FIG. 15B is a top view perspective of an optical device, according to some embodiments of the present disclosure. The multiplexer 201C of the optical device 200C2 includes a focal length adjuster 260-2 positioned between the receiving surface 240RS of the lens module 240 and the exit surface 220ES of the emitter extension 220. The optical device 200C2 shown in FIG. 15B is similar to the optical device 200C1 discussed in FIG. 15A, wherein the position, profile, thickness of each portions of the focal length adjuster 260-2 can be obtained by the baseline discussed in FIG. 8A or FIG. 15A. However the difference resides in that one of the beams does not pass through the focal length adjuster 260-2. The profile and the configuration of focal length adjuster 260-2 can be referred to the discussion of the focal length adjuster 160-2 in FIG. 8B. The focal length adjuster 260-2 can be utilized to compensate the difference of original focal lengths of beams, thereby the focal point of the beams from each channel may be within a thin band BND' in order to mitigate insertion loss.

Figure 15C:
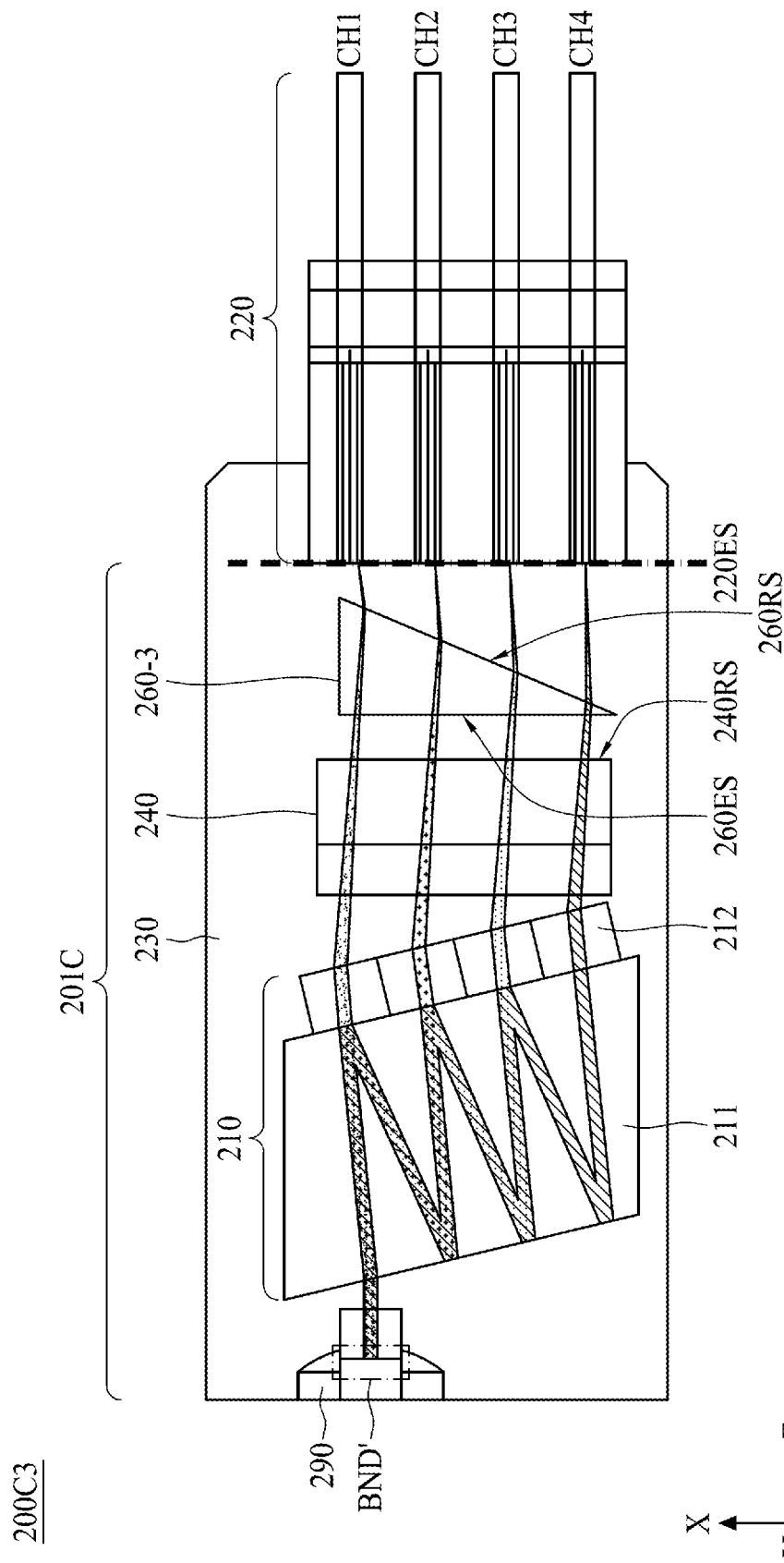
FIG. 15C is a top view perspective of an optical device, according to some embodiments of the present disclosure.

Referring to FIG. 15C, FIG. 15C is a top view perspective of an optical device, according to some embodiments of the present disclosure. The multiplexer 201C of the optical device 200C3 includes a focal length adjuster 260-3 positioned between the receiving surface 240RS of the lens module 240 and the exit surface 220ES of the emitter extension 220. The optical device 200C3 shown in FIG. 15C is similar to the optical device 200C1 discussed in FIG. 15A, but the difference resides in that the focal length adjuster 260-3 is similar to the triangular focal length adjuster 160-3 discussed in FIG. 8C, wherein the discussion on the configuration thereof can be referred to FIG. 8C. The focal length adjuster 260-3 has a receiving surface 260RS facing the emitter extension 220 and an exit surface 260ES facing the lens module 240. In some of the embodiments, the receiving surface 260RS of the focal length adjuster 260-3 is not parallel to the exit surface 220ES of the emitter extension 220. In some of the embodiments, the exit surface 260ES of the focal length adjuster 260-3 is a substantially flat surface. In some embodiments, a surface area of the receiving surface 260RS of the focal length adjuster 260-3 is greater than a surface area of the exit surface 260ES of the focal length adjuster 260-3. The focal length adjuster 260-3 can be utilized to compensate the difference of original focal lengths of beams, thereby the focal point of the beams from each channel may be within a thin band BND' in order to mitigate insertion loss.

Figure 15D:
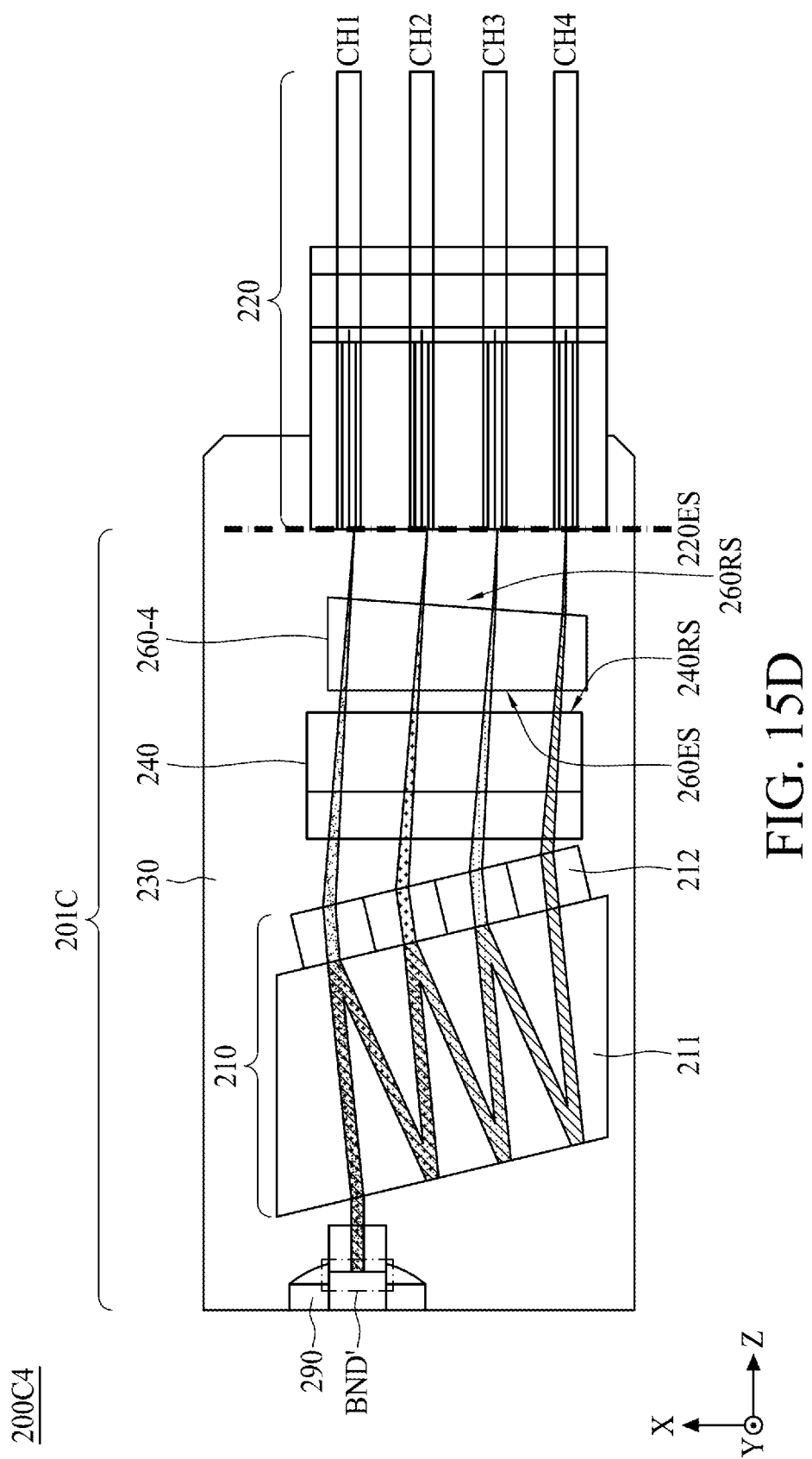
FIG. 15D is a top view perspective of an optical device, according to some embodiments of the present disclosure.

Referring to FIG. 15D, FIG. 15D is a top view perspective of an optical device, according to some embodiments of the present disclosure. The multiplexer 201C of the optical device 200C4 includes a focal length adjuster 260-4 positioned between the receiving surface 240RS of the lens module 240 and the exit surface 220ES of the emitter extension 220. The optical device 200C4 shown in FIG. 15D is similar to the optical device 200C1 discussed in FIG. 15A, but the difference resides in that the focal length adjuster 260-4 is similar to the focal length adjuster 160-4 discussed in FIG. 8D, wherein the discussion on the configuration thereof can be referred to FIG. 8D. The focal length adjuster 260-4 has a receiving surface 260RS facing the emitter extension 220 and an exit surface 260ES facing the lens module 240. In some of the embodiments, the receiving surface 260RS of the focal length adjuster 260-4 is not parallel to the exit surface 240B of the lens module 240. In some of the embodiments, the receiving surface 260RS of the focal length adjuster 260-4 is not parallel to the exit surface 260ES of the focal length adjuster 260-4. In some of the embodiments, the exit surface 260ES of the focal length adjuster 260-4 is a substantially flat surface. In some embodiments, the focal length adjuster 260-4 may have a quadrilateral shape, such as trapezoid. The focal length adjuster 260-4 can be utilized to compensate the difference of original focal lengths of beams, thereby the focal point of the beams from each channel may be within a thin band BND' in order to mitigate insertion loss.

Figure 15E:
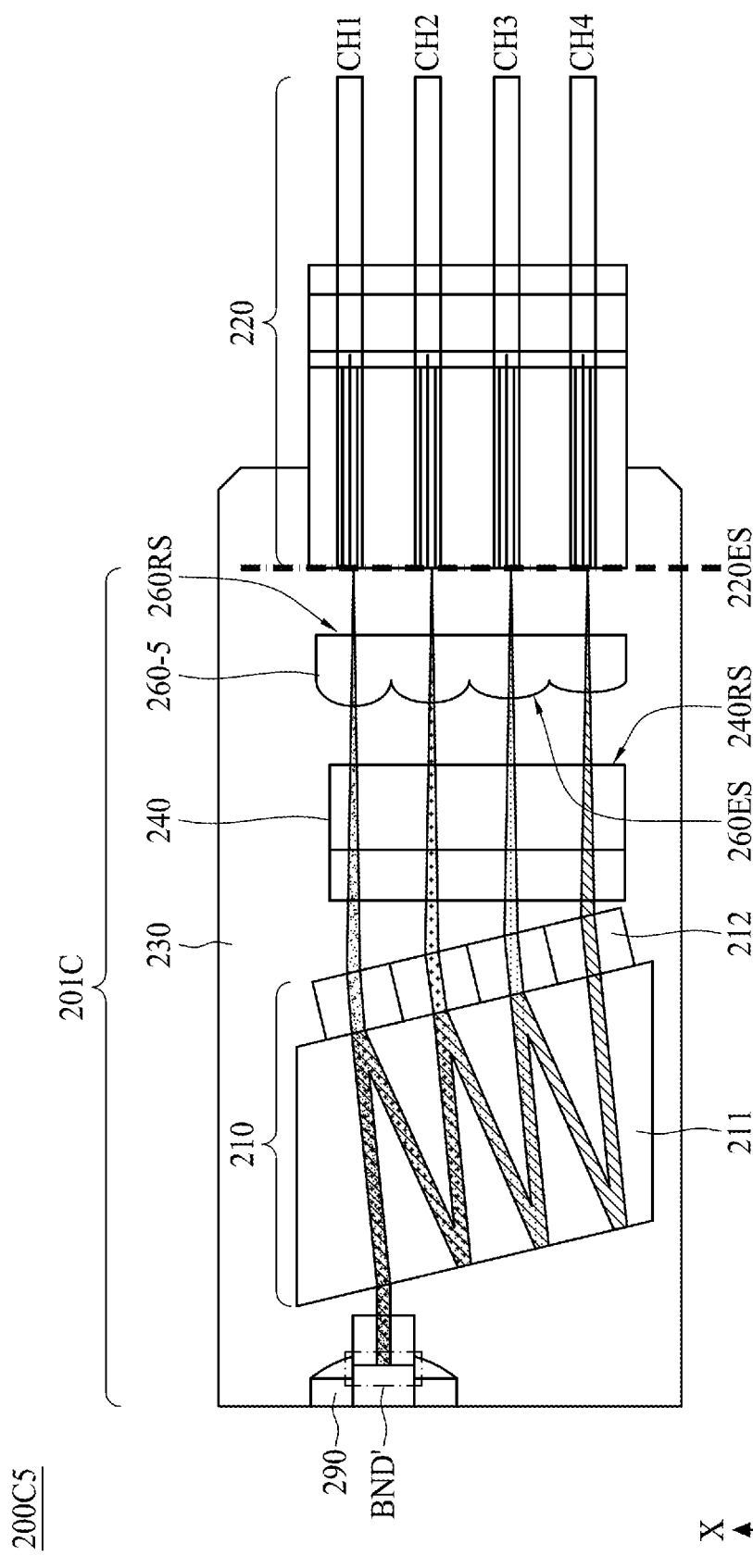
FIG. 15E is a top view perspective of an optical device, according to some embodiments of the present disclosure.
Figure 15E:
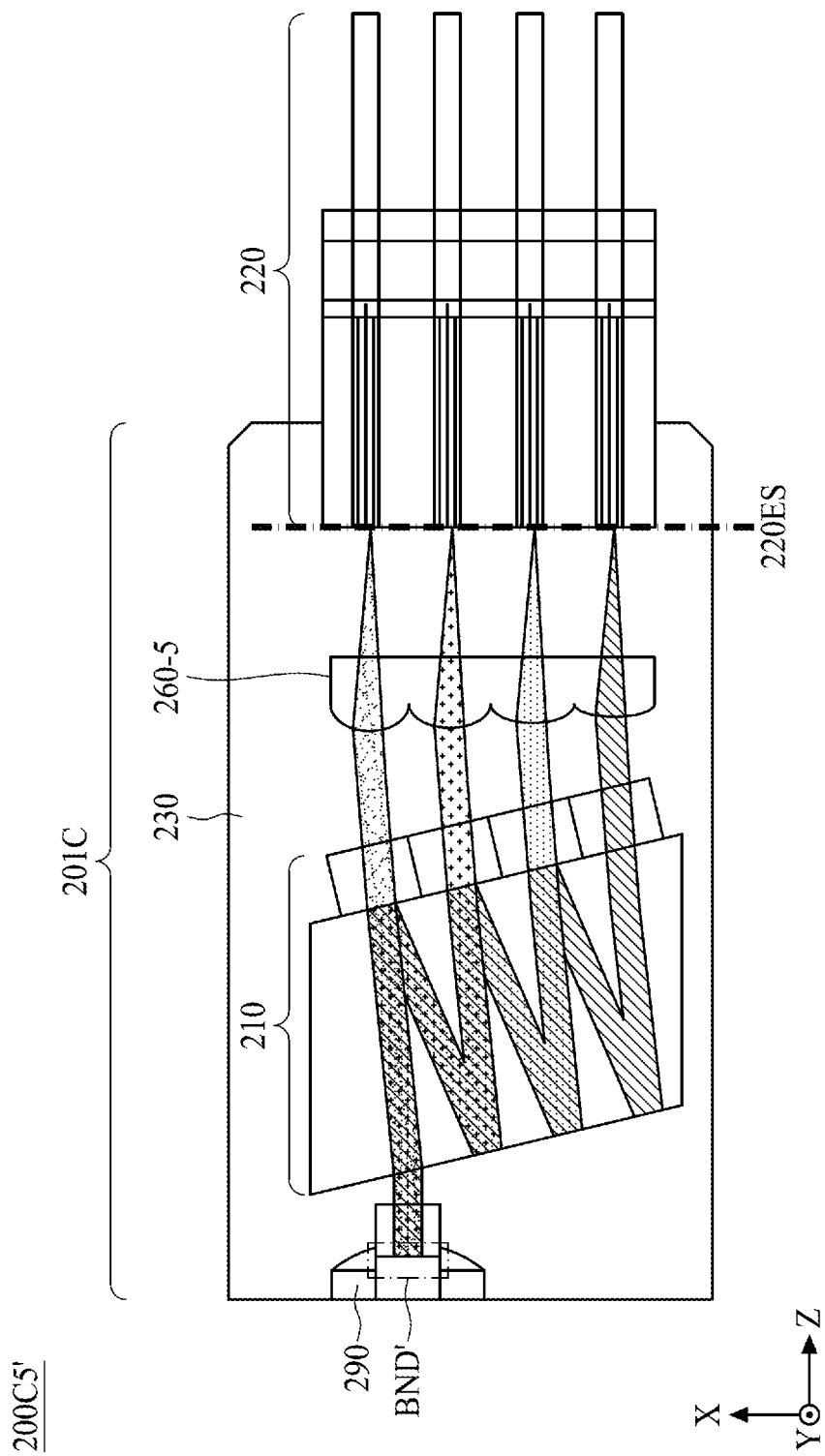

Referring to FIG. 15E, FIG. 15E is a top view perspective of an optical device, according to some embodiments of the present disclosure. The multiplexer 201C of the optical device 20005 includes a focal length adjuster 260-5 positioned between the receiving surface 240RS of the lens module 240 and the exit surface 220ES of the emitter extension 220. The optical device 20005 shown in FIG. 15E is similar to the optical device 200C1 discussed in FIG. 15A, but the difference resides in that the focal length adjuster 260-5 is similar to the lens-array focal length adjuster 160-5 discussed in FIG. 8E, wherein the discussion on the configuration thereof can be referred to FIG. 8E. The focal length adjuster 260-5 includes a plurality of lens, wherein the radius of curvature of each of the lens may be substantially identical, but each of the lens are not aligned along the primary direction X. The focal length adjuster 260-5 can be utilized to compensate the difference of original focal lengths of beams, thereby the focal point of the beams from each channel may be within a thin band BND' in order to mitigate insertion loss.

Referring to FIG. 15E', FIG. 15E' is a top view perspective of an optical device, according to some embodiments of the present disclosure. The optical device 20005' discussed in FIG. 15E' is similar to the optical device 20005 discussed in FIG. 8E, but the difference resides in that the lens module 240 may be omitted in the optical device 20005'. In some cases, the configuration of the optical device 20005' may be adequate to have the focal point of the beams from each channel may be within a thin band BND' corresponding to the effective sensible range of the receiver extension 290.

Figure 15F:
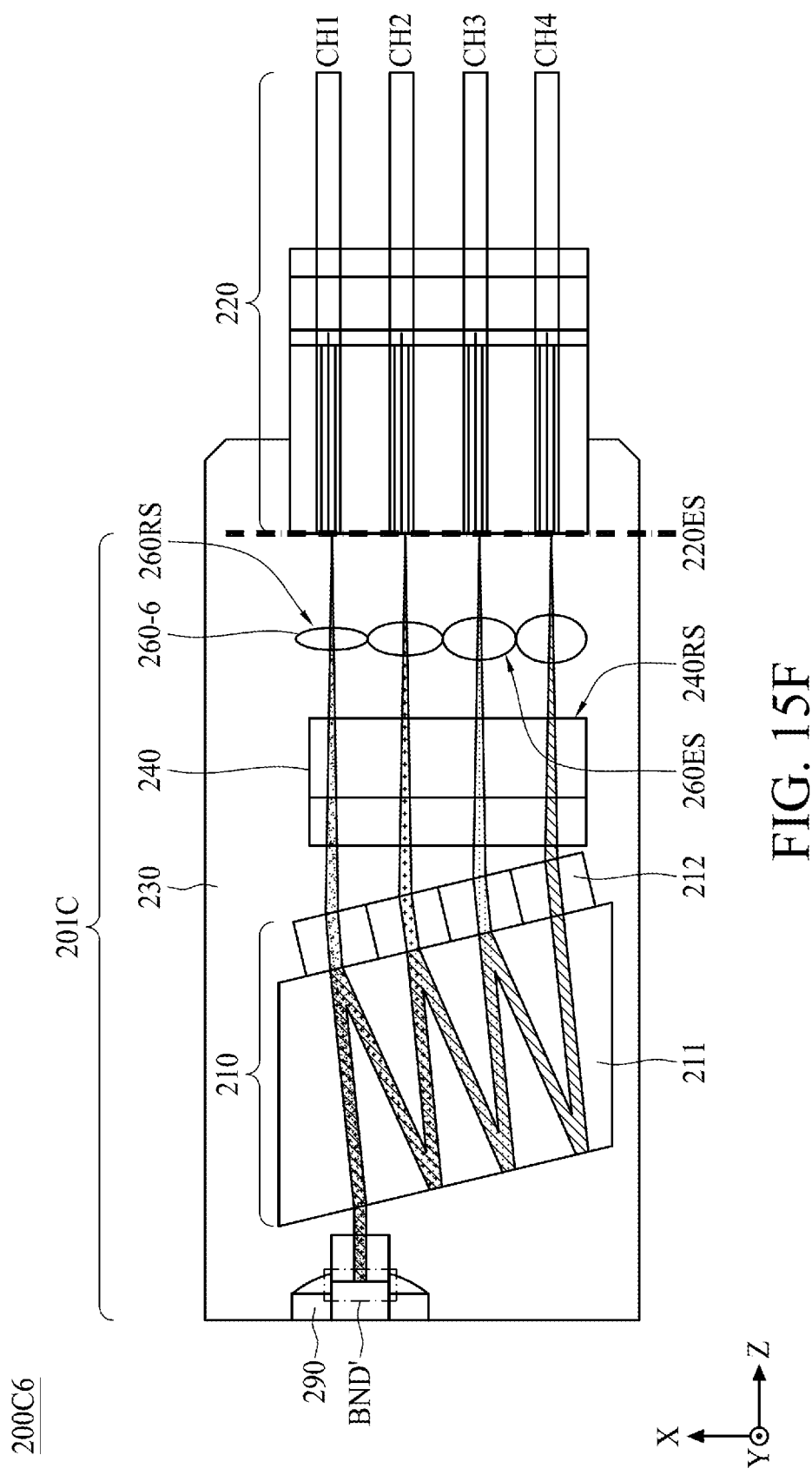
FIG. 15F is a top view perspective of an optical device, according to some embodiments of the present disclosure.
Figure 15F:
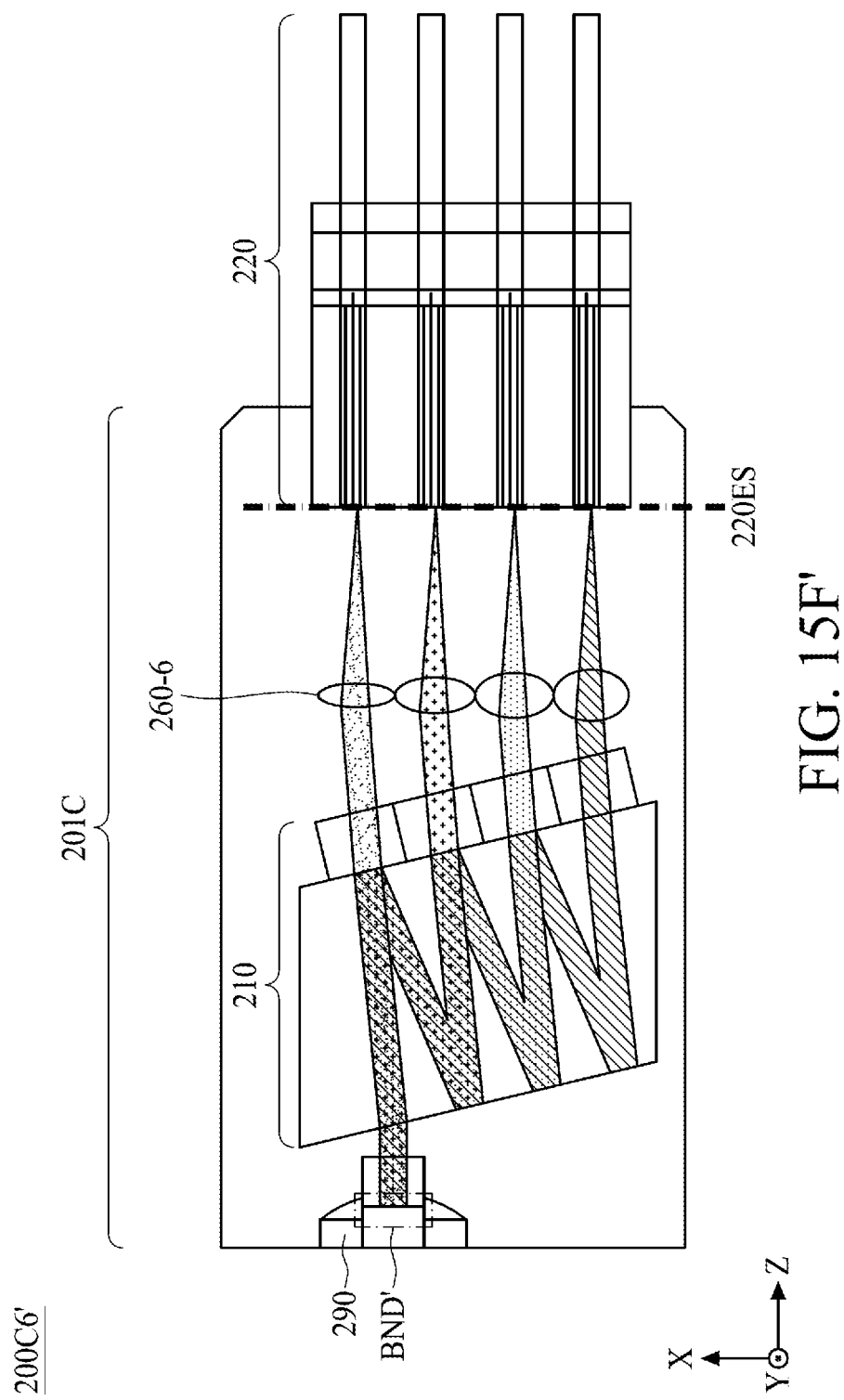

Referring to FIG. 15F, FIG. 15F is a top view perspective of an optical device, according to some embodiments of the present disclosure. The multiplexer 201C of the optical device 20006 includes a focal length adjuster 260-6 positioned between the receiving surface 240RS of the lens module 240 and the exit surface 220ES of the emitter extension 220. The optical device 20006 shown in FIG. 15F is similar to the optical device 200C1 discussed in FIG. 15A, but the difference resides in that the focal length adjuster 260-6 is similar to the lens-array focal length adjuster 160-6 discussed in FIG. 8F, wherein the discussion on the configuration thereof can be referred to FIG. 8F. Each of the lens of focal length adjuster 260-6 are aligned along the primary direction X (e.g. the center thereof is aligned), but the radius of curvature of each of the lens are different. The focal length adjuster 260-6 can be utilized to compensate the difference of original focal lengths of beams, thereby the focal point of the beams from each channel may be within a thin band BND' in order to mitigate insertion loss.

Referring to FIG. 15F', FIG. 15F' is a top view perspective of an optical device, according to some embodiments of the present disclosure. The optical device 20006' discussed in FIG. 15F' is similar to the optical device 20006 discussed in FIG. 8F, but the difference resides in that the lens module 240 may be omitted in the optical device 20006'. In some cases, the configuration of the optical device 20006' may be adequate to have the focal point of the beams from each channel may be within a thin band BND' corresponding to the effective sensible range of the receiver extension 290.

Figure 15G:
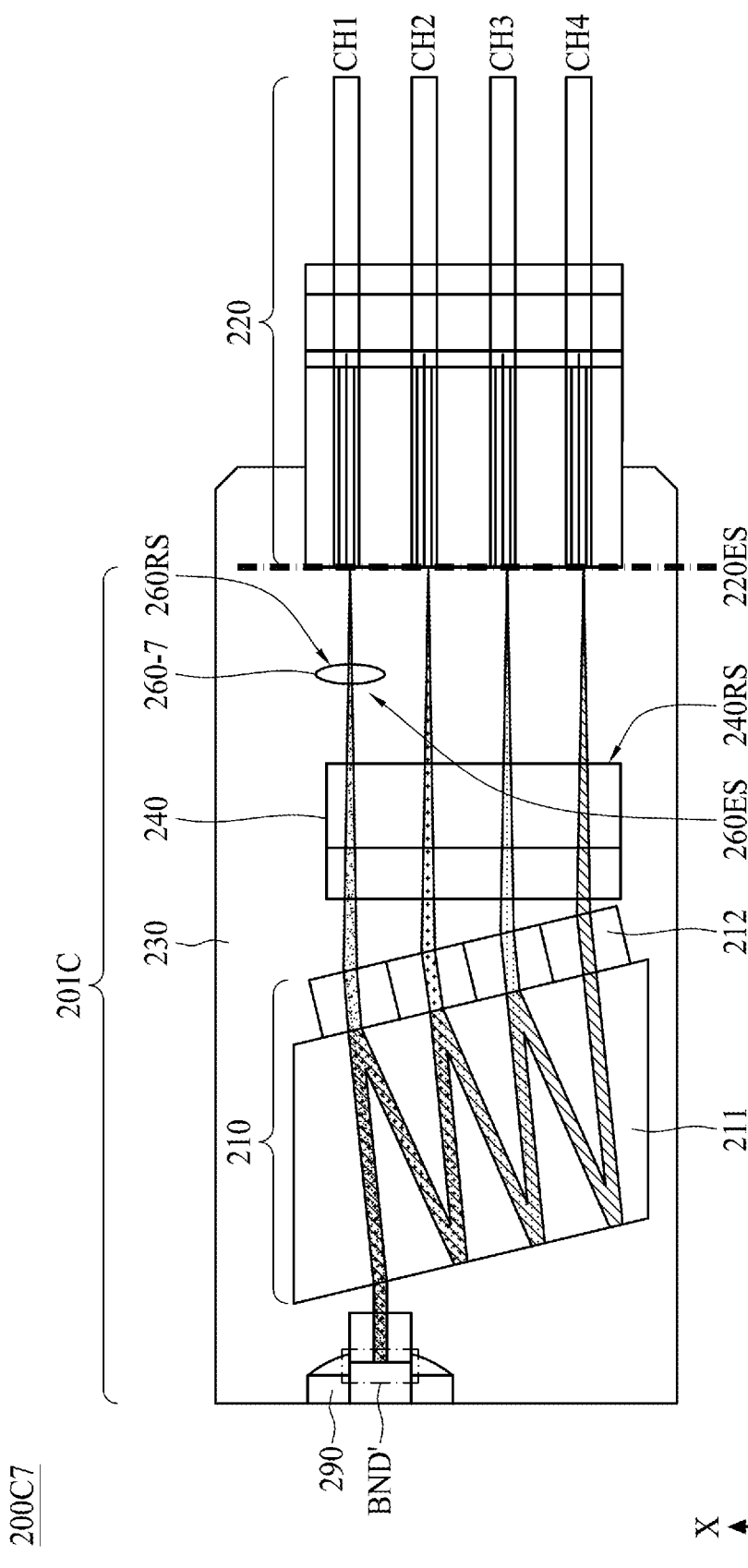
FIG. 15G is a top view perspective of an optical device, according to some embodiments of the present disclosure.
Figure 15H:
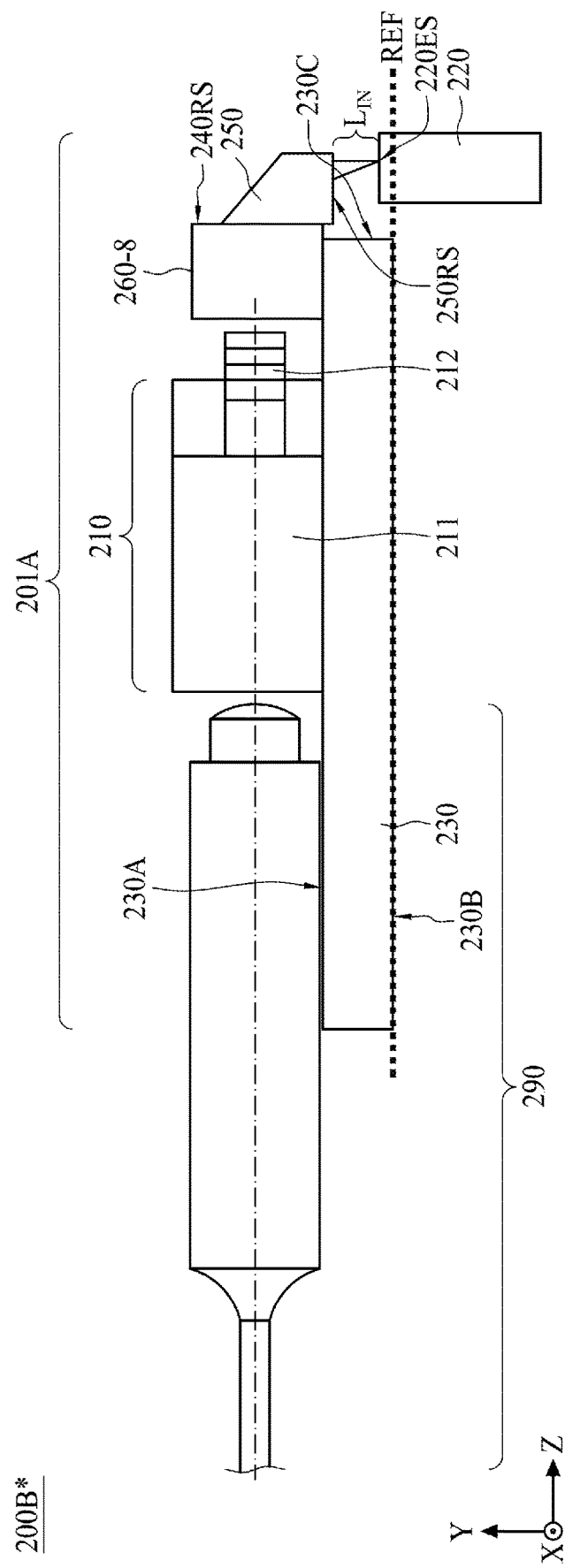
FIG. 15H is a side view perspective of an optical device, according to some embodiments of the present disclosure.

Referring to FIG. 15G, FIG. 15G is a top view perspective of an optical device, according to some embodiments of the present disclosure. The multiplexer 201C of the optical device 20007 includes a focal length adjuster 260-7 positioned between the receiving surface 240RS of the lens module 240 and the exit surface 220ES of the emitter extension 220. The optical device 20007 shown in FIG. 15G is similar to the optical device 20006 discussed in FIG. 15F, but the difference resides in that some of the signals from the channels may not pass through the focal length adjuster 260-7. Alternatively stated, the focal length adjuster 260-7 may only have one lens, or in some cases two or more lens. The number of lens in the focal length adjuster 260-7 may be decided based on the focal lengths of each of the signals from the channels. The focal length adjuster 260-7 can be utilized to compensate the difference of original focal lengths of beams, thereby the focal point of the beams from each channel may be within a thin band BND' corresponding to the effective sensible range of the receiver extension 290.

Referring to FIG. 15I1, FIG. 15I1 is a side view perspective of an optical device, according to some embodiments of the present disclosure. Another group of embodiments of optical device including a multiplexer is discussed in FIG. 15I1. The optical device 200A* shown in FIG. 15I1 is similar to the optical device 200B as shown in FIG. 14, however the difference resides in that the lens module 240 may be substituted with a focal length adjuster 260-8, which can be identical to the focal length adjusters 260-5, 260-6, or 260-7 as discussed in FIG. 15E to FIG. 15G, and the receiving surface 250B of the focal length adjuster 250 is parallel to the reference plane REF. In some embodiments, the secondary surface 230B of the carrier 230 can be utilized as the reference plane REF. In some alternative embodiments, a plane parallel to the primary surface 230A of the carrier 230, a plane perpendicular to the secondary direction Y, or the like, can be deemed as the reference plane REF. In this embodiments, the difference of the focal lengths of the beams can be compensated by the focal length adjuster 260-8, which can be identical to the focal length adjusters 260-5, 260-6, or 260-7, instead of adjusting the orientation of the focal length adjuster 250.

Figure 16:
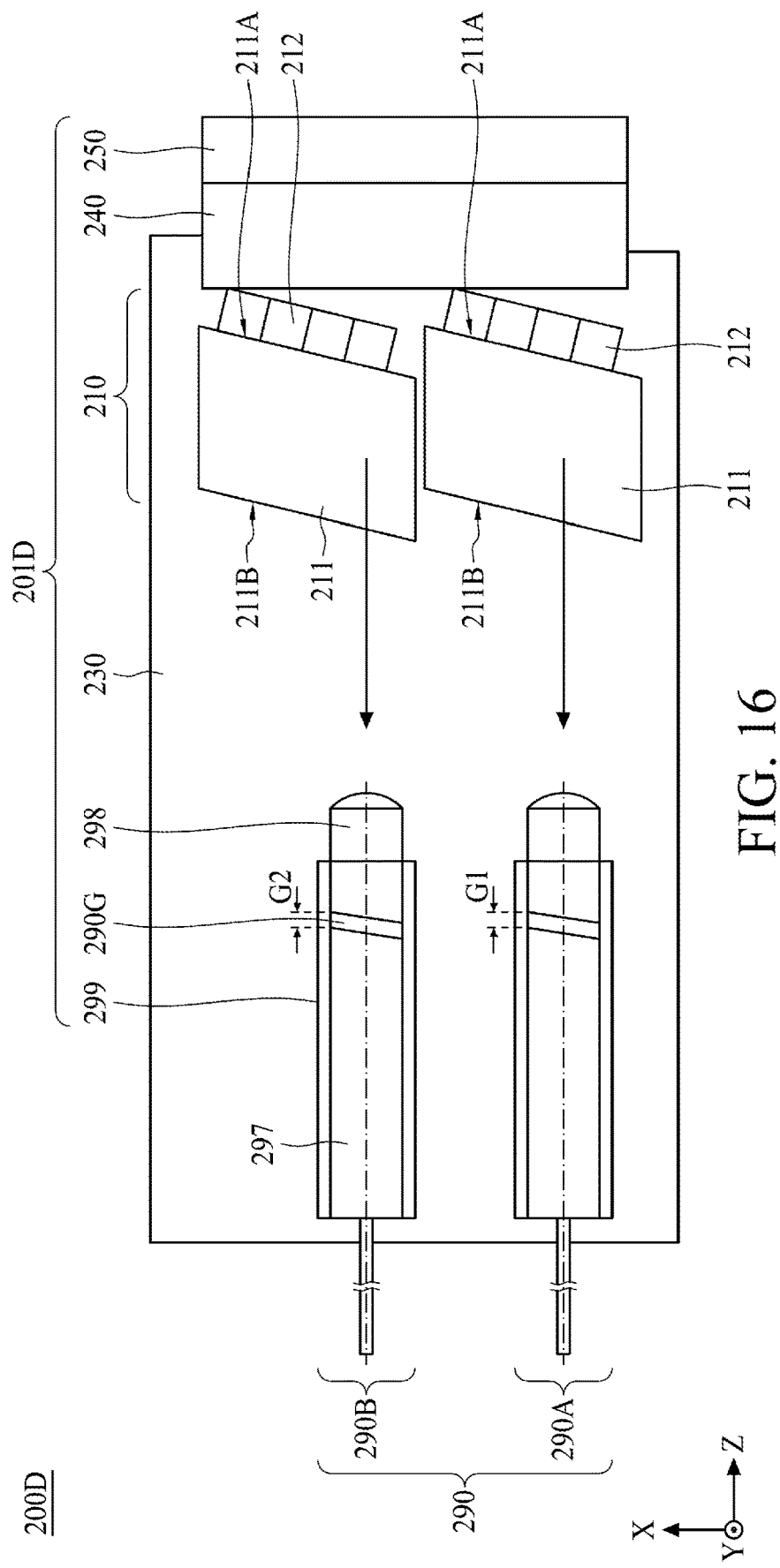
FIG. 16 is a top view perspective of an optical device, according to some embodiments of the present disclosure.

Referring to FIG. 16, FIG. 16 is a top view perspective of an optical device, according to some embodiments of the present disclosure. In some embodiments, an optical device 200D may include a carrier 230, one or more filter module(s) 210 (which can also be referred to as Z-block or thin film filter block) having multi-channel configuration (for example, 8-channel configuration shown in FIG. 16, or the like) and disposed on the carrier 230, and a plurality of receiver extensions 290 (for example, a first receiver extension 290A and a second receiver extension 290B, but present disclosure is not limited to two receiver extensions configuration). In some embodiments, the first receiver extension 290A and the second receiver extension 290B are respectively corresponds to a filter module 110. In some alternative embodiments, the first receiver extension 290A and the second receiver extension 290B correspond to one filter module 110. A filter module 210 includes a body portion 211 and filter elements 212. The body portion 211 has an exit side 211B faces the receiver extensions 290 and a receiving side 211A apart from the exit side 211B, wherein the filter elements 212 are configured on the receiving side 211A of the body portion 211. In some embodiments, the body portion 211 is made of glass or other suitable material that allows light or optical signal to propagate therein. In some embodiments, the optical device 200D may further include lens module 240. In some embodiments, the lens module 240 may be mounted on carrier 230. The lens module 240 may be utilized to adjust propagation direction of light or optical signal, or adapted to provide focusing function. In some embodiments, the optical device 200D may further include focal length adjuster 250. The focal length adjuster 250 alters the direction of received light or optical signal, for example, from a direction parallel to X-Z plane to a direction unparalleled to (such as substantially perpendicular to) X-Z plane. In some embodiments, the focal length adjuster 250 can be a right-angle focal length adjuster. In some embodiments, the focal length adjuster 250 is attached to the lens module 240. In some of the optional embodiments, the focal length adjuster 250 is free from being in direct contact with the carrier 230. In some of the optional embodiments, the focal length adjuster 250 is free from vertically overlapping the carrier 230. In some alternative embodiments, the focal length adjuster 250 and the lens module 240 can be integrated as an optical device.

The optical signals coming from emitter extension (not shown) may sequentially propagate through the focal length adjuster 250 and the lens module 240, and subsequently combined by the filter module 210. In an example of an eight-channel configuration, the optical signals may be combined into two beams, which can be respectively received by two receiver extensions 290 (for example, a first receiver extension 290A and a second receiver extension 290B). However, the numbers of the receiver extensions 290 can be adjusted according to the total number of channels in the optical device 200D.

In some embodiments, each receiver extension 290 may include a fiber portion 297, an output lens 298, and a ferrule 299 at least partially surround an outer surface of the fiber portion 297 and/or an outer surface of the output lens 298. In some embodiments, the fiber portion 297 and output lens 298 is spaced by a gap 290G. In some embodiments, the gap 290G is filled with air. In some alternative embodiments, adhesive glue, glass, transmissive medium, or the like, may be filled between the fiber portion 297 and output lens 298. Herein the gap 290G of the first receiver extension 290A constitutes a first effective optical length, and the gap 290G of the second receiver extension 290B constitutes a second effective optical length. In some embodiments, the first effective optical length is different from the second effective optical length.

In some embodiments, a dimension G1 of the gap 290G of the first receiver extension 290A is different from a dimension G2 of the gap 290G of the second receiver extension 290B, and a material filled in the gap 290G of the first receiver extension 290A is identical to a material filled in the gap 290G of the second receiver extension 290B. In the embodiments that include more than two receiver extensions 290, the dimension of the gap 290G can be incrementally increased or decreased along a direction.

In some alternative embodiments, a dimension G1 of the gap 290G of the first receiver extension 290A is identical to a dimension G2 of the gap 290G of the second receiver extension 290B, but a material filled in the gap 290G of the first receiver extension 290A is different a material filled in the gap 290G of the second receiver extension 290B.

By having different characteristic (e.g. effective optical lengths) of the gap 290G in the receiver extensions 290, the difference of original focal lengths of beams may be compensated, thereby the focal point of the beams from each channel may be within a thin band in order to mitigate insertion loss.

It should be noted that the embodiments discussed above is not limited by specific embodiment shown in the drawings. The approaches discussed above can be applied to various types of multi-channel configuration, including channels aligned along one row (1×N) and channels aligned along multiple rows (n×N). The design of each elements can be adjusted, combined, or partially substituted accordingly to comply with the specific requirement of the optical device. Comparing to comparative embodiments, the optical devices provided by the present disclosure specifically possess the advantage of scaling up the device capability, especially on expanding the number of rows of channels to two or more channels.

In conventional approach, it is often found that the insertion loss of demultiplexer and multiplexer may occur since different beams has different optical characteristics (focal length, wavelength, et cetera), thus a beam size of the beams of some channels may be out of the effective sensing area SA of the receiver extension 190, and accordingly each beams may not converge at positions within a thin band corresponding to the effective sensible range of the receiver extension at the receiving end. As a result, trade-off of insertion loss regarding certain beam or signal may be made, which would sacrifice device performance. Furthermore, when conducting an assembling operation when utilizing a multiplexer or a demultiplexer, it is very time consuming to optimize the location of the receiving side of the receiver extension or decide on insertion loss from which channel would be accepted as trade-off and to what extent.

The present disclosure provides an optical device including a demultiplexer and an optical device including a multiplexer that may help mitigating overall insertion loss and/or insertion loss of certain signal/beam. Furthermore, by using the approaches discussed in present disclosure, the assembling operation and the utilization of the aforesaid optical devices may be simplified.

The embodiments of optical devices including a demultiplexer is discussed in FIG. 1A to FIG. 11E, and the embodiments of optical devices including a multiplexer is discussed in FIG. 12 to FIG. 16. The configurations of embodiments provided by present disclosure can be utilized to compensate the difference of original focal lengths of beams, thereby the focal points of the beams from each channel may be within a thin band proximal to the receiving end, and further mitigating overall insertion loss and/or individual insertion loss for at least some of the channels. As discussed in FIG. 4A to FIG. 4C, by using the relation between beam size (BS1 to BSn) of beams from each channel and corresponding effective sensing area SA of the effective sensible range ESR, a range of the thin band BND can be obtained. The methods 1000, 2000, 3000, 4000 and 5000 for using optical device(s) as discussed in FIG. 2, FIG. 5, FIG. 7, FIG. 10, FIG. 12 simplifies the assembling operation and utilization of such optical devices and may help saving the time for signal optimization as far as the insertion loss is concerned.

In the optical device 100A discussed in FIG. 2 and FIG. 3A to FIG. 4C, the orientation of the focal length adjuster 150 (as well is the exit surface 150B thereof) is configured in a way that the positions where the beams from each channel converges can be within a thin band. Specifically, an angle θ1 is between the exit surface of the focal length adjuster 150 and the reference plane REF parallel to the receiving side 190RS of the receiver extension 190, wherein the angle θ1 is less than 90 degree.

In the optical device 100B discussed in FIG. 5 to FIG. 6, the orientation of the receiving surface 190RS of the receiver extension 190 is configured in a way that the positions where the beams from each channel converges can be within a thin band. Specifically, an angle Φ1 is between the receiving surface 190RS of the receiver extension 190 and the exit surface 140B of the lens module 140, wherein the angle Φ1 may be less than 90 degree.

In the optical device 100C1 to 10007 discussed in FIG. 7 to FIG. 8G, the embodiments of focal length adjusters 160-1 to 160-7 discussed in FIG. 8A to FIG. 8G can be utilized to compensate the difference of original focal lengths of beams exit from each channel. The shape of each types of focal length adjusters may be decided based on refractive index n1 and n2, wavelengths and/or focal lengths of beams from each channels. By using the focal length adjuster with specific configuration, the positions of the focal points of the beams from each channels can land within a thin band, such as the receiving surface 190RS of the receiver extension 190, thereby mitigating the insertion loss. The optical device 100A* discussed in FIG. 8H combines the optical device 100A discussed in FIG. 2 and FIG. 3A to FIG. 4C and the focal length adjuster 160-8 (the focal length adjusters 160-5, 160-6, or 160-7 as discussed in FIG. 8E to FIG. 8G), wherein the difference of the focal lengths of the beams can be compensated by the focal length adjuster 160-8 without adjusting the orientation of the focal length adjuster 150.

In the optical device 100D discussed in FIG. 10 to FIG. 11C, by having different dimensions of the gap 120G of each collimators 120, the focal point of the beams from each channel may substantially land within a thin band. In the optical device 100E discussed in FIG. 10 and FIG. 11D, the material filled in the gap 120G of the each of the collimators can be different or having different refractive indices so that the effective optical length can be adjusted and serve the purpose of focal point adjustment. In the optical device 100F discussed in FIG. 10 and FIG. 11E, the embodiments of focal length adjusters 160 (such as focal length adjusters 160-1 to 160-7 discussed in FIG. 8A to FIG. 8G) can be utilized to compensate the difference of original focal lengths of beams exit from each channel.

In the optical device 200A discussed in FIG. 13B to FIG. 13W, an angle Φ2 is between the exit surface 220ES of the emitter extension 220 and the receiving surface 240RS of the lens module 240, wherein the angle Φ2 may be less than 90 degree. By such configuration, the difference of original focal lengths of beams may be compensated, thereby the focal point of the beams from each channel may be within a thin band.

In the optical device 200B discussed in FIG. 14 to FIG. 14', an angle θ2 is between the receiving surface 250RS of the focal length adjuster 250 and a reference plane parallel to the exit surface 220ES of the emitter extension 220, such that the focal point of each beams can converge at positions within a thin band, wherein the angle θ2 may be less than 90 degree.

In the optical device 200C1 to 20007 discussed in FIG. 15A to FIG. 15G, various types of focal length adjusters 260-1 to 260-7 discussed in FIG. 15A to FIG. 15G can be utilized to compensate the difference of original focal lengths of beams exit from each channel. Thereby, the positions of the focal points of the beams from each channels can substantially land at positions within a thin band. The optical device 200B* discussed in FIG. 1511 combines the optical device 200B discussed in FIG. 14 and the focal length adjuster 260-8 (focal length adjusters 260-5, 260-6, or 260-7 as discussed in FIG. 15E to FIG. 15G), wherein the difference of the focal lengths of the beams can be compensated by the focal length adjuster 260-8 without adjusting the orientation of the focal length adjuster 250.

In the optical device 200D discussed in FIG. 16, by having different characteristic (e.g. effective optical lengths) of the gap 290G in the receiver extensions 290 (e.g. dimension of the gap 290G or the material filled therein), the difference of original focal lengths of beams may be compensated, thereby the focal point of the beams from each channel may be within a thin band.

Some embodiments of the present disclosure provide an optical assembly, including a carrier, a filter module on a primary surface of the carrier and disposed on a predetermined optical path, wherein the filter module includes a plurality of filter elements corresponding to a plurality of beams of different channels, a focal length adjuster disposed on the predetermined optical path, wherein at least a focal length of one of the plurality of beams is altered by the focal length adjuster, and a receiver extension configured to receive the plurality of beams via a plurality of sensing areas respectively at a receiving surface, wherein a beam size of each beams at the receiving surface is less than an area of each of the corresponding sensing areas.

Some embodiments of the present disclosure provide an optical assembly, including a carrier, a filter module on a primary surface of the carrier and disposed on a predetermined optical path, wherein the filter module includes a plurality of filter elements corresponding to a plurality of beams of different channels, an optical fiber array configured to receive the plurality of beams of different channels via a plurality of sensing areas, and means for altering at least a focal length of at least one of the plurality of beams at a position between a receiving surface of the optical fiber array and the filter module, so that a beam size of each beams at the receiving surface is less than an area of each of the corresponding sensing areas.

Some embodiments of the present disclosure provide an optical assembly, including a carrier, a filter module disposed on the carrier and disposed on a predetermined optical path, wherein the filter module includes a plurality of filter elements corresponding to a plurality of beams of different channels, an optical fiber array configured to receive the plurality of beams, including a first surface facing toward the filter module, and a lens structure between the optical fiber and the filter module, including a second surface facing toward the first surface of the optical fiber array, wherein an angle between the first surface and the second surface is in a range of from 0.5 degree to 3 degree.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical assembly, comprising:
    a carrier;
    a filter module on a primary surface of the carrier and disposed on a predetermined optical path, wherein the filter module comprises a plurality of filter elements corresponding to a plurality of beams of different channels;

a focal length adjuster disposed on the predetermined optical path, wherein at least a focal length of one of the plurality of beams is altered by the focal length adjuster; and a receiver extension configured to receive the plurality of beams via a plurality of sensing areas respectively at a receiving surface, wherein a beam size of each beam at the receiving surface is less than an area of each of the corresponding sensing areas.

2. The optical assembly of claim 1, wherein focal points of the beams from different channels land within a thin band at the receiver extension.

3. The optical assembly of claim 1, wherein the receiver extension comprises one of photodiode, fiber array, or grating couplers.

4. The optical assembly of claim 1, wherein the focal length adjuster comprises a prism.

5. The optical assembly of claim 4, wherein the carrier comprises a secondary surface opposite to the primary surface, and an exit surface of the prism faces toward the receiver extension.

6. The optical assembly of claim 5, wherein the exit surface is free from being parallel to the receiving surface of the receiver extension.

7. The optical assembly of claim 5, wherein an angle between the exit surface and the secondary surface is in a range of from 0.5 degree to 3 degree.

8. The optical assembly of claim 1, wherein the focal length adjuster comprises at least one of a lens or a prism.

9. The optical assembly of claim 8, wherein the lens has a plurality of sections corresponding to each beam from different channels, and an extent of focal point adjustment is different in each sections.

10. The optical assembly of claim 1, further comprising a lens module between the focal length adjuster and the filter module.

11. The optical assembly of claim 1, further comprising a first collimator on the predetermined optical path and facing the filter module.

12. The optical assembly of claim 11, further comprising a second collimator apart from the first collimator, wherein the first collimator comprises a first gap forming a first effective optical length, and the second collimator comprises a second gap forming a second effective optical length, the first effective optical length being different from the second effective optical length.

13. An optical assembly, comprising:
a carrier;
a filter module on a primary surface of the carrier and disposed on a predetermined optical path, wherein the filter module comprises a plurality of filter elements corresponding to a plurality of beams of different channels;

an optical fiber array configured to receive the plurality of beams of different channels via a plurality of sensing areas; and means for altering at least a focal length of at least one of the plurality of beams at a position between a receiving surface of the optical fiber array and the filter module, so that a beam size of each beams at the receiving surface is less than an area of each of the corresponding sensing areas.

14. The optical assembly of claim 13, wherein the optical fiber array comprises a plurality of single mode fibers or a plurality of multi-mode fibers.

15. The optical assembly of claim 13, further comprising:
a first collimator coupled to a first N channels of the filter module; and
a second collimator coupled to a second N channels of the filter module.

16. The optical assembly of claim 15, wherein the first collimator comprises a first gap forming a first effective optical length, and the second collimator comprises a second gap forming a second effective optical length, the first effective optical length being different from the second effective optical length.

17. The optical assembly of claim 13, wherein means for altering at least a focal length of at least one of the plurality of beams comprises: a lens modules between the filter module and the optical fiber array.

18. The optical assembly of claim 13, wherein means for altering at least a focal length of at least one of the plurality of beams comprises: a lens on the predetermined optical path, comprising a plurality of sections corresponding to one or more beams of different channels.

19. An optical assembly, comprising:
a carrier;
a filter module disposed on the carrier and disposed on a predetermined optical path, wherein the filter module comprises a plurality of filter elements corresponding to a plurality of beams of different channels;
an optical fiber array configured to receive the plurality of beams, comprising a first surface facing toward the filter module; and
a lens structure between the optical fiber and the filter module, comprising a second surface facing toward the first surface of the optical fiber array, wherein an angle between the first surface and the second surface is in a range of from 0.5 degree to 3 degree.

20. The optical assembly of claim 19, wherein the lens structure comprises a lens, a lens module, or a combination thereof.

* * * * *